(12) United States Patent
Patrudu

(10) Patent No.: US 7,890,928 B2
(45) Date of Patent: Feb. 15, 2011

(54) MECHANISM AND SYSTEM FOR REPRESENTING AND PROCESSING RULES

(76) Inventor: Pilla Gurumurty Patrudu, Plot-130, Sector-8, M.V.P. Colony, Visakhapatnam, Andhra Pradesh (IN) 530017

( * ) Notice: Subject to any disclaimer, the term of this patent is extended or adjusted under 35 U.S.C. 154(b) by 1971 days.

(21) Appl. No.: 10/895,166

(22) Filed: Jul. 20, 2004

(65) Prior Publication Data

US 2005/0027507 A1    Feb. 3, 2005

Related U.S. Application Data

(60) Provisional application No. 60/490,108, filed on Jul. 26, 2003.

(51) Int. Cl.
G06F 9/44 (2006.01)
G06F 17/30 (2006.01)

(52) U.S. Cl. .................. 717/114; 717/104; 717/106; 707/802; 707/822

(58) Field of Classification Search .................. None
See application file for complete search history.

(56) References Cited

U.S. PATENT DOCUMENTS 6,850,959 B1 * 2/2005 Golds .................. 707/822

| | | | |
|---|---|---|---|
| 2003/0167277 A1 * | 9/2003 | Hejlsberg et al. | 707/102 |
| 2003/0212954 A1 | 11/2003 | Patrudu | |
| 2004/0172617 A1 * | 9/2004 | Ramani et al. | 717/114 |
| 2005/0114832 A1 * | 5/2005 | Manu | 717/106 |

OTHER PUBLICATIONS

"Reveal: a tool to reverse engineer class diagrams", Matzko et al., Feb. 2002, pp. 13-21, <http://delivery.acm.org/10.1145/570000/564095/p13-matzko.pdf>.*

"A library of generic concepts for composing knowledge bases", Barker et al., Oct. 2001, pp. 14-21, <http://delivery.acm.org/10.1145/510000/500744/p14-barker.pdf>.*

* cited by examiner

Primary Examiner—Thuy Dao

(57) ABSTRACT

This invention utilizes a concept called color, which implies a variation, and applies it to natural language attributes like verbs and nouns. The verb color is defined as a role or operation in which the field participates. The noun color is defined as a form of the field. The auxiliary verb color is defined as a path to the field from a known object reference. The noun color may be defined by the user or may be determined, based on the object state in which the field resides. Rules are defined by adorning the fields with one or more colors. Several types of rules are invented based on transformational properties of colors. Methods can be equated to rules, and invoked as rules. Thus, complex processes may be reduced to a set of rules, using the above mechanisms.

12 Claims, 17 Drawing Sheets

The KB System.

| Class name of the object 0101 | Field name of the object 0102 | State 0103 | Sub-state 0104 | Noun 0105 | Absolute Level number of noun 0106 |
|---|---|---|---|---|---|
| | | | | | |
| | | | | | |
| | | | | | |
| | | | | | |
| | | | | | |
| | | | | | |

Figure - 01 : State-Noun Mapping table.

| Indirect Conceptual class name<br>0201 | Group of Conceptual class names (Regular Expression)<br>0202 |
|---|---|
| | |
| | |
| | |
| | |
| | |
| | |

Figure - 02 : Mapping of Indirect Conceptual class to Conceptual classes.

| Class name 0301 | Auxiliary verb name 0302 | Navigation path 0303 | DFT sequence number array 0304 |
|---|---|---|---|
|  |  |  |  |
|  |  |  |  |
|  |  |  |  |
|  |  |  |  |
|  |  |  |  |
|  |  |  |  |

Figure - 03 : Mapping of auxiliary verbs to the navigation paths.

| Field name<br>0401 | Collaboration<br>Object id<br>0402 | Collaboration<br>Object id<br>0403 |
|---|---|---|
|  |  |  |
|  |  |  |
|  |  |  |
|  |  |  |
|  |  |  |
|  |  |  |

Figure - 04 : Symbol Table.

| Field value 0501 | Noun container reference 0502 | Noun Value 0503 | Absolute level number of the Noun 0504 | Type of applicable Noun 0505 | Field Name 0506 | Class name of the noun container 0507 |
|---|---|---|---|---|---|---|
| | | | | | | |
| | | | | | | |
| | | | | | | |
| | | | | | | |
| | | | | | | |
| | | | | | | |

Figure - 05 : Value Table.

```
<CDESC CDESC_ID = "ZZZZZ">

<APPL NAME = "ZZZZZ" PKG = "ZZZZZ">
        --- text description of application
    </APPL>

<COBJ NAME = "ZZZZZ">
        <METHOD NAME = "ZZZZZ" CYCLE_NUM = num  ORDER_NUM = num>
            <COBJ_SEQ> dd.dd.dd.dd.dd </COBJ_SEQ>
            <ICOBJ_SEQ> dd.dd.dd.dd.dd </ICOBJ_SEQ >
        </METHOD>

<METHOD NAME = "ZZZZZ" CYCLE_NUM = num  ORDER_NUM = num>
            <COBJ_SEQ> dd.dd.dd.dd.dd </COBJ_SEQ>
            <ICOBJ_SEQ> dd.dd.dd.dd.dd </ICOBJ_SEQ >
        </METHOD>
    </COBJ>
        .
        .
    <COBJ NAME = "ZZZZZ">
        <METHOD NAME = "ZZZZZ" CYCLE_NUM = num  ORDER_NUM = num>
            <COBJ_SEQ> dd.dd.dd.dd.dd </COBJ_SEQ>
            <ICOBJ_SEQ> dd.dd.dd.dd.dd </ICOBJ_SEQ >
        </METHOD>
          .
          .
        <METHOD NAME = "ZZZZZ" CYCLE_NUM = num  ORDER_NUM = num>
            <COBJ_SEQ> dd.dd.dd.dd.dd </COBJ_SEQ>
            <ICOBJ_SEQ> dd.dd.dd.dd.dd </ICOBJ_SEQ >
        </METHOD>
    </COBJ>

<STRUC_RULES>
            <CYCLE NUM = num>   - structural rule -    </CYCLE>
              .
              .
            <CYCLE NUM = num>   - structural rule -    </CYCLE>
        </STRUC_RULES>

</CDESC>
```

Figure – 06 : Sample Collaboration Descriptor.

```
<!ELEMENT CDESC        ( APPL, COBJ *, STRUC_RULE ) >
<!ELEMENT COBJ         ( METHOD * ) >
<!ELEMENT STRUC_RULES  ( CYCLE * ) >
<!ELEMENT METHOD       ( COBJ_SEQ, ICOBJ_SEQ ) >
<!ELEMENT COBJ_SEQ     ( #PCDATA ) >
<!ELEMENT ICOBJ_SEQ    ( #PCDATA ) >
<!ELEMENT CYCLE        ( #PCDATA ) >

<!ATTLIST CDESC   CDESC_ID    NMTOKEN  #REQUIRED >
<!ATTLIST APPL    NAME        NMTOKEN  #REQUIRED >
<!ATTLIST APPL    PKG         NMTOKEN  #REQUIRED >
<!ATTLIST COBJ    NAME        ID       #REQUIRED >
<!ATTLIST METHOD  NAME        NMTOKEN  #REQUIRED >
<!ATTLIST METHOD  CYCLE_NUM   CDATA    #REQUIRED >
<!ATTLIST METHOD  ORDER_NUM   CDATA    #REQUIRED >
<!ATTLIST CYCLE   NUM         CDATA    #REQUIRED >
```

Patent Figure - 06A - DTD for Collaboration Descriptor document

| Field Name with verb and optional Operational colors<br>0701 | Concatenation of Verbs<br>0702 |
|---|---|
|  |  |
|  |  |
|  |  |
|  |  |
|  |  |
|  |  |

Figure - 07 : Verb distribution table.

| Special Color Name 0801 | Object Name 0802 | Method Name 0803 | Static Method Flag 0804 | Return Type 0805 |
|---|---|---|---|---|
| | | | | |
| | | | | |
| | | | | |
| | | | | |
| | | | | |

Figure – 08 : Special Color Table.

| Constant color function name 0901 | Constant color value 0902 | Target constant color value 0903 |
|---|---|---|
| | | |
| | | |
| | | |
| | | |
| | | |
| | | |

Figure - 09 : Constant color mapping table.

| Constant source function name 1001 | Constant source value 1002 | Target constant source value 1003 |
|---|---|---|
|  |  |  |
|  |  |  |
|  |  |  |
|  |  |  |
|  |  |  |
|  |  |  |

Figure - 10 : Constant source mapping table.

| Field | Exp | Type | Cond | Label |
|---|---|---|---|---|
| 1101 | 1102 | 1103 | 1104 | 1105 |
| | | | | |
| | | | | |
| | | | | |
| | | | | |
| | | | | |
| | | | | |

Figure – 11 : The Rules Table.

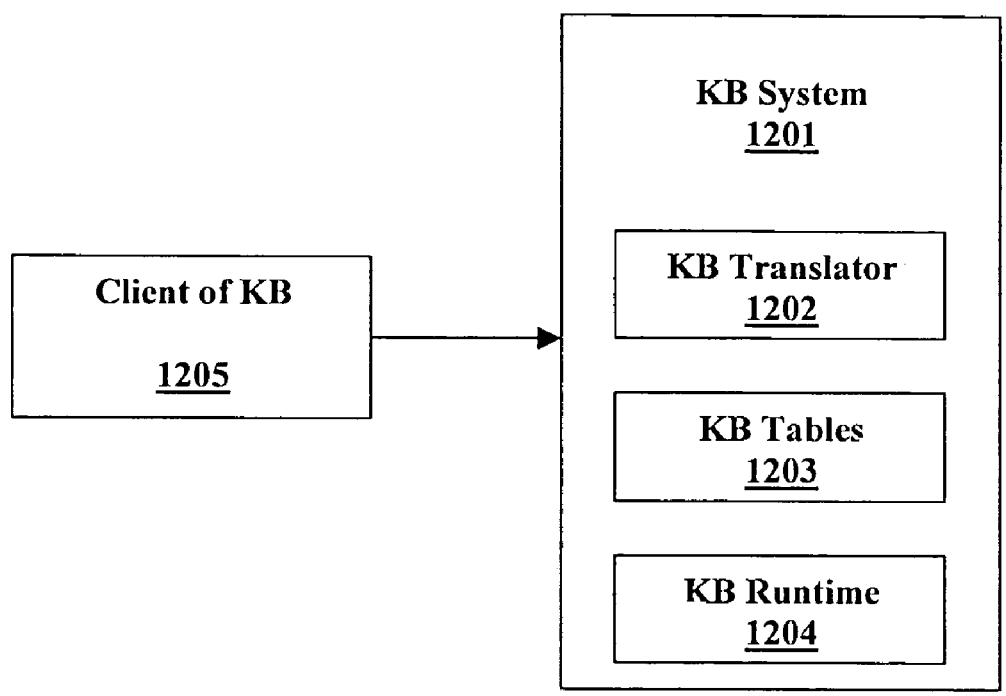
Figure – 12 : The KB System.

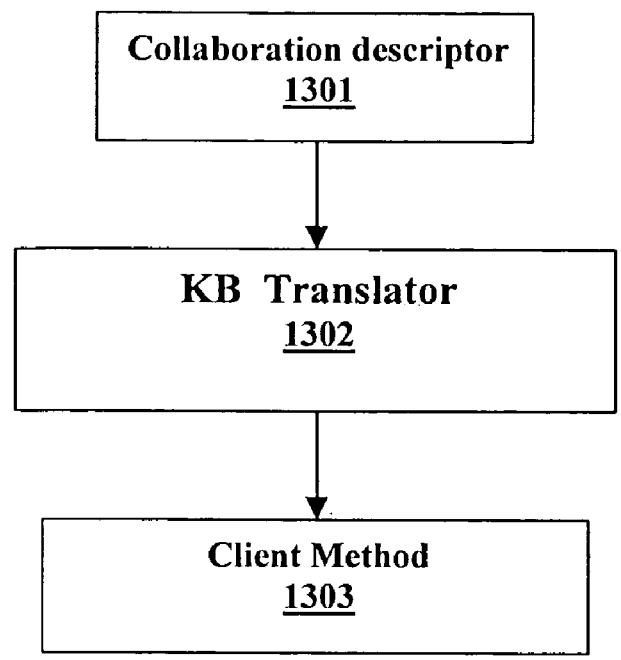
Figure - 13: KB Translator (Client Generation).

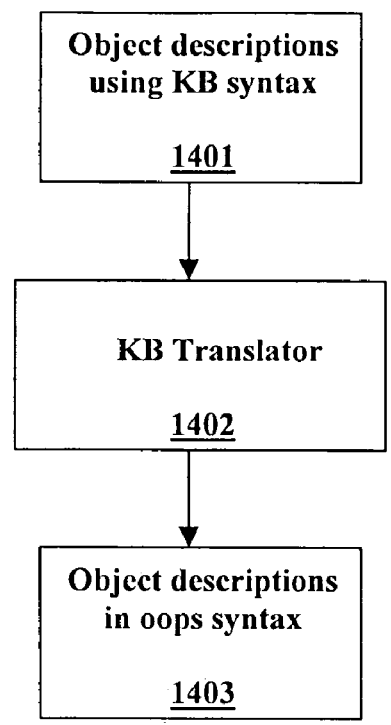
Figure - 14 : KB Translator (Translation of Object Descriptions).

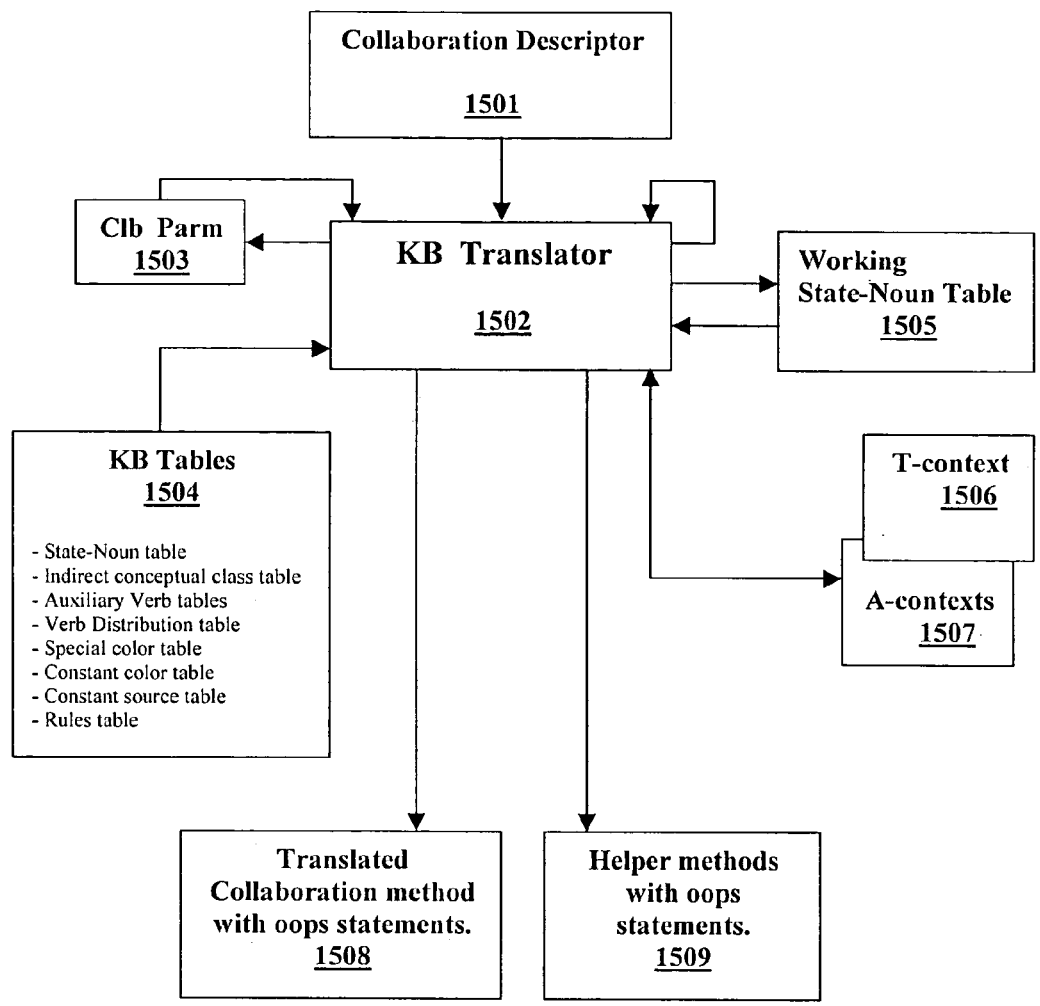
Figure - 15 : KB Translator (Translation of Collaboration Method).

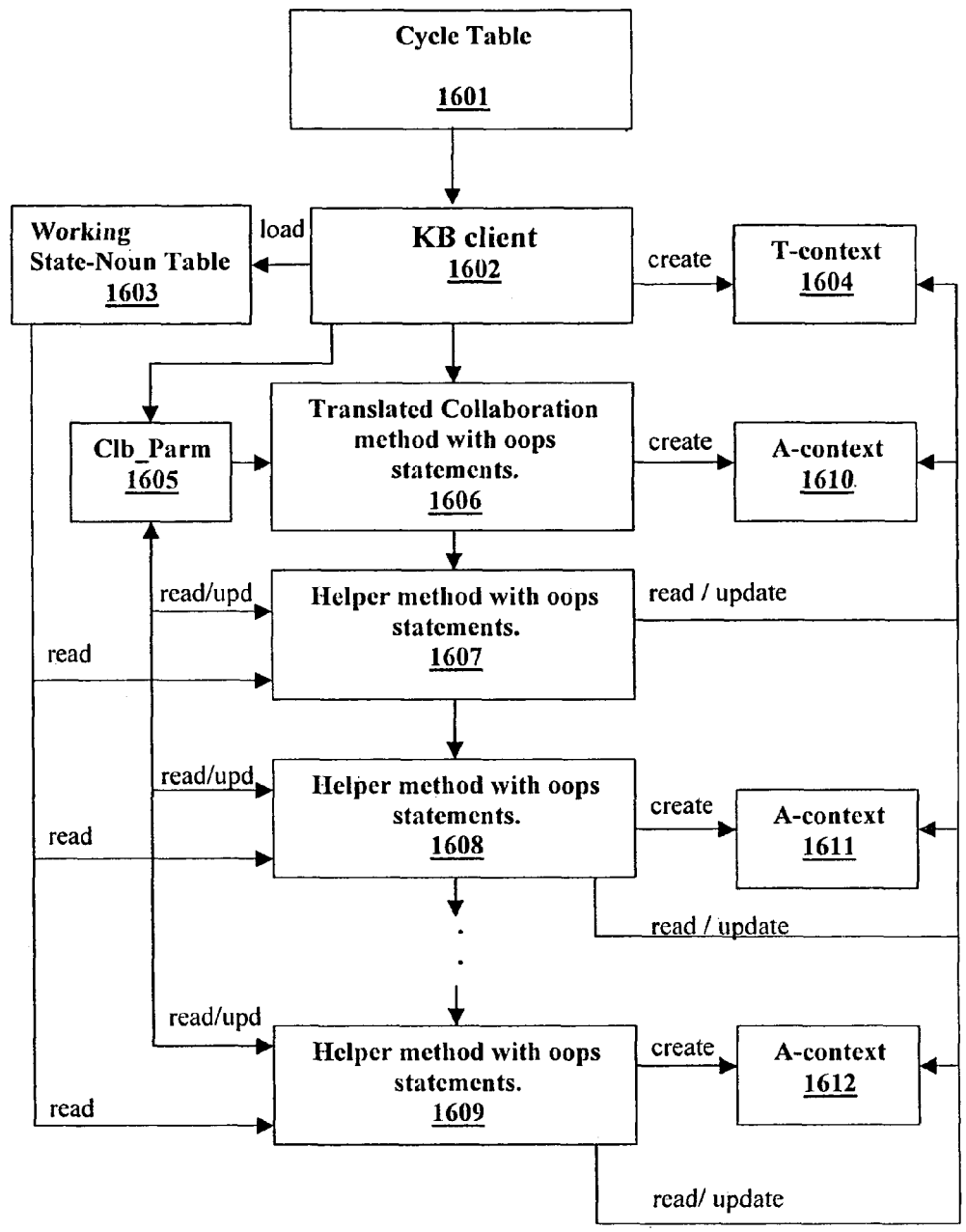
Figure - 16 : Execution of KB Client.

MECHANISM AND SYSTEM FOR REPRESENTING AND PROCESSING RULES

CROSS-REFERENCE TO RELATED APPLICATIONS

This application is entitled to the benefit of provisional patent application No. 60/490,108, filed on Jul. 26, 2003.

BACKGROUND—FIELD OF INVENTION

This invention is related to computer programming, specifically to information/rule representation and processing.

BACKGROUND—DESCRIPTION OF PRIOR ART

Representing and processing information is of paramount importance in the field of computing. Despite great efforts, and contributions from many sources, the mechanisms for representing information have not broken the barrier of conceptual or human thinking.

For the past several decades, there has been only a little change in the information representation mechanisms. For example, the temporary storage layout of assembler or machine languages has too many similarities with the structure representations of "C" languages. Similarly, it may be said, that the object representations (class descriptions), of the ultra modern object oriented (OOPS) technologies too, have many similarities with the erstwhile block of temporary storage. Since the mechanisms for processing information are directly dependent upon the representation techniques, these techniques have grown in a singular or vertical manner.

The object-oriented technology in its current form, is by no means a small effort. However, as said above, much of the energies of the software industry are directed towards improving the processing techniques, and very little was done to improve the representation techniques.

The richness and intelligence of human thought is reflected in human languages, nevertheless the software industry seems to ignore this simple reality, and never utilized the rich natural language attributes in its representation techniques. Surprisingly, this same industry, built the most complex grammars and parsers, and today it is trying to gear up for natural language processing.

To bring my comments into proper perspective, I would like to illustrate, what any developer or I would have to do to represent a field called "part quantity ordered". In the latest and greatest software technology, all that anybody or I could do is, add a few underscore characters to the field name, as in "part_quantity_ordered", so that it is more readable, or more accurately, parsable as a token. The fact that the field is connected to an action called "ordered", cannot be captured by the current information representation mechanisms. Thus, during my research, I have observed that the above problem and similar problems encountered in representing knowledge, have dampened the prospects of conceptual processing. Hence, rule description and processing, which is an important sub-branch of conceptual processing, was equally affected by the above problems.

A rule is defined in the Oxford English dictionary as a "compulsory principle governing action". Since processing is nothing but action, we can define several types of rules, which may be classified as
1) Deductive Rules (logical, empirical, heuristic).
2) Computation Rules.
3) Structural Rules.
4) Storage/Access Rules.

Deductive rules are the topic of expert systems (logical rules), data mining systems (empirical rules), and fuzzy systems (heuristic rules), and have no relevance to the current invention. The later three types of rules namely, computation rules, structural rules and storage/access rules are the topic of this invention.

SUMMARY

The present invention aims at—
1) Representing information, using the rich attributes of natural languages.
2) Processing rules, described using the rich attributes of natural languages.

OBJECTIVES AND ADVANTAGES

Several objectives and advantages of the present invention are:
1. A mechanism for representing information, and rules, which make use of natural language aspects.
2. A system for processing information and rules, described using the above scheme.
3. Reduction of development, and maintenance effort.

DRAWING FIGURES

In the drawings, closely related figures have the same number but different alphabetic suffix.
FIG. 1 describes the State-Noun Mapping table.
FIG. 2 describes the Mapping of Indirect Conceptual class to Conceptual classes.
FIG. 3 describes the Mapping of the navigation paths to the auxiliary verbs.
FIG. 4 describes the Symbol Table.
FIG. 5 describes the Value Table.
FIG. 6 describes the Collaboration Description document.
FIG. 6A describes the DTD for the Collaboration description document.
FIG. 7 describes the Verb distribution table.
FIG. 8 describes the Special color table.
FIG. 9 describes the Constant color mapping table.
FIG. 10 describes the Constant source mapping table.
FIG. 11 describes the layout of the KB Rules table.
FIG. 12 describes the KB System.
FIG. 13 describes the KB Translator (Client Generation).
FIG. 14 describes the KB Translator (Translation of Object Descriptions).
FIG. 15 describes the KB Translator (Translation of Collaboration Method).
FIG. 16 describes the KB Client (Execution of KB Client).

DESCRIPTION—FIGS. 1 THRU 15—PREFERRED EMBODIMENT

A preferred embodiment of the present invention is illustrated below with the help of FIGS. 1 thru 15.

The current invention describes a mechanism and system, called KB, which attempts to overcome the limitations cited above in the prior art. The invention is presented in several small sections, to improve readability. The document assumes nothing more than a basic understanding of object oriented technology, commonly referred to as OOPS technology.
1) Basic KB Concepts: The design of KB is based on several novel concepts, and a basic understanding of these concepts is required before advanced concepts can be understood. The basic concepts are illustrated below.

1.1) Properties of Information: The real physical world, in which we live, has a set of properties, and quite similarly, the information that is processed in computing, is a world by itself, and has several important properties. Besides, properties of information world created by human beings are several times less complex than the properties of real physical world created by god. Thus, by making use of the properties of the information world, and limiting our scope to just "data processing", we may be able to build a less complex, and more generic (or reusable) information systems.

During my research, I have identified a few important properties of information, which are described below.

Information is usually represented as structures (or classes), and fields, and several structures may participate in processing. This simple fact has a wide implication, and is recited below as the fundamental property of information.

The First Property: The fundamental property of information is that the fields of the various different structures, which participate in processing, are related to each other.

For example, we may describe ordered quantity and invoiced quantity of a sales order and invoice as—

Salesorder_Header.Partqty; // total qty ordered in sales order header

Invoice_Header.Partqty; // total qty invoiced in invoice header

Essentially, we are asserting that the ordered qty and invoiced qty, are nothing but part qty, and hence they may be compared, added, subtracted, and in general, processed by some function. In other words, we cannot add apples to oranges or compare them, similarly we cannot add part qty to part weight or part weight to part price.

All programs or methods follow this norm implicitly, with the developer bearing the responsibility to ensure that this property is not broken. Irrespective of the field names used in structures, and names used to hold temporary variables, developers sort out related pieces and construct expressions from these related pieces of information, when they construct an arithmetic or relational expression. Thus, the different names used by developers to describe the same type of information are akin to colors, and the difference is only superficial.

The Second Property: Expressions formed from underlying entities, obey the physical laws of the underlying entities. This property is known as the conservation property.

The second property, states that if the underlying entity (field) is a weight or a number, then expressions formed out of the usages of the entity (field), obey the physical law for weight or number, which is law of conservation of mass.

1.2) Fields: A field exists in an object, and may be specified as— class-name.field-name.

To avoid collisions, a prefix called package name or path name is appended in front of the class name, as shown below.

pkg-name.class-name.field-name.

This scheme is widely employed in prior art (see reference 1, The Java Language), and is detailed here merely for completeness.

A field may be of a primitive data type like integer, float, char etc., or a user defined data type.

1.3) Colors: In oops a field name is usually referred to as an attribute of an object. However, there may be several attributes, which are closely related. For example, a field may just hold an unqualified entity such as "part quantity", or may hold an entity such as "part quantity ordered", or "part quantity invoiced". It may be noted that the first unqualified entity lacks verbs, whereas the subsequent entities are specified with a verb. Traditional programming languages failed to take advantage of the verb forms of the entity stored in an attribute or field, of an object.

The dissimilarity of similar fields is called a color of the field. A color may be further classified as a verb color or noun color. The color is appended to the field name, with a prefix to distinguish the type of color. Verb colors are appended to the field name with prefix "%v-", whereas noun colors are appended to the field name with "%n-" prefix.

Color as a representation of a variation, is not my invention, and belongs to prior art. I read an article on Internet, in 2002, on colors. Unfortunately, I did not save the article, and an extensive search for the article later, proved that the subject matter could be, "Colored Petri Nets". Reference 7, provides a good insight into "Colored Petri Nets".

It may be noted that only the abstract color concept of Petri Nets, which implies "variation", was taken from prior art, and the color concept in my invention differs in many ways from prior art. For example, color is a not a type in my invention, as it can be in Petri Nets. The application of the color concept, to natural language attributes, like verbs and nouns, described above, is completely my own invention.

A formal definition of the verb, and noun colors may be given as described below.

A verb color represents an action or operation in which the field participates. A verb color may also represent a role in which the field participates. A noun color represents a form of the "field+verb" combine.

Thus, if we have an unqualified field name defined as— int part_qty;

We can write field names with verbs as— int part_qty.%v-ordered; or int part_qty.%v-invoiced;

The verb specification of a field need not always imply an English language verb. The verb specification may act as an adjective and may further qualify the entity stored in the field.

For example, a discount field may be qualified as "regular discount" or "special discount". These may be described as— float discount;

float discount.%v-special;

float discount.%v-regular;

In addition to verbs, a field may also take nouns. Nouns may be used to describe the state of the object, when the field is created or modified. Nouns may also be used to describe the event, which caused the field to be created or modified. The former type of nouns are known as state based nouns, and the latter type of nouns are known as user defined nouns.

User defined nouns are always specified manually, and accessed manually. These nouns are described with "%u-" prefix.

State based nouns are never specified manually and seldom accessed manually. State based nouns are represented with the "%n-" prefix. It may be noted that in the case of state based nouns, the system determines the applicable noun, based on the state of the object, and a mapping table (explained in later sections), called the State-Noun mapping table.

Both, user defined nouns created by the user with the "%u-" prefix, and state based nouns created by the system with the "%n-" prefix, may be accessed with "%n-" prefix.

The thumb rule for using verbs or nouns is based on whether the representations share the same physical location in memory (slot), or have independent slots. In KB, a "field name+verb", takes up a slot, and is equivalent to a field name in oops. All nouns of the "filed name+verb", share the same slot, within an object. It is possible, for a "field name+verb" to be present in several objects, and in this case, the nouns may exist in several locations.

Colors defined above, may be applied to all types of fields (primitive or user defined data types). Thus, an object (defined as a field), may be assigned a user defined noun color, or may acquire state based noun from its parent object (container). Since objects are independent entities, an object may define its own noun, based on its state, rather than receiving a noun from its container.

Besides, the verb and noun colors, several other colors exist and these are described in later sections.

1.4) Translation Support: It may be obvious by this time, that the KB scheme for specifying fields needs translation support. The KB system provides a tool called KB translator, for translating KB descriptions to oops descriptions, and to implement the KB framework. The KB translator is described in detail in a later section.

1.5) State-Noun Mapping Table: A field of an object may be specified as a recipient of state based nouns, whereby, the noun is determined at run time, depending on the state of the object.

An object may go through a set of states during its lifetime, and for each for the states, there may be several sub states. The noun color of a field may be dependent upon on the state and sub-state of the object. This dependency may be described as a table called the State-Noun mapping table. FIG. 1 describes the State-noun mapping table, where, column 0101, contains the class name of the object,
column 0102, contains the field name of the object,
column 0103, contains the state of the object,
column 0104, contains the sub-state of the object,
column 0105, contains the noun color of the field,
column 0106, contains the absolute level number of the noun color.

An object may provide and utilize the State-Noun mappings for some or all fields, or may ignore them altogether. If an object utilizes this feature, it has to implement a predefined OOPS interface called "IState". The IState oops interface may be described in a language like java as—

```
interface IState
{
    string getState( );
    string getSubstate( );
}
```

Objects are independent entities, hence they may determine their noun forms, all by themselves. In this case, the object's class name is entered into the State-Noun mapping table, as both the class name, and the field name, against its states, to describe the nouns.

Searching the State-Noun mappings at run-time may be an overhead. In order to reduce this overhead, the KB Translator performs an optimization, which is described below.

It may be noted that since we are interested in only some of the object's fields, the translator copies these entries from the State-Noun mapping table to a working State-Noun mapping table, as this would reduce the run-time overhead of searching a large table. At the end of the translation, the working State-Noun mapping table will contain only the fields referenced, and may be of reasonable size, and may be loaded into memory. Typically, the translator encapsulates the working State-Noun mapping table in an object, which provides the necessary support to search the table.

User defined nouns may also be stored in the State-Noun mapping table, with state and sub-state set to nulls. This scheme allows us to assign an absolute level number for user defined nouns.

1.6) Operational colors: Operational colors are mainly used for identifying, specific forms of rules or equations.

Typically, the operational colors are specified with just the '%' sign as the prefix, and such operational colors merely identify one rule or equation from another.

For example, Part_price.%abc implies that part price is computed by a specific form of an equation, which is identified by the operational color %abc. This paves the way for the co-existence of two or more forms of equations, for the same field as, Part_price.%abc, and Part_price.%xyz.

1.7) Compound verbs & Verb Concatenations: A verb may be simple, or may be a combination of several other verbs. A combination of verbs is called a compound verb. In this case, the individual verbs are concatenated using the double underscore "_" characters.

Verbs or compound verbs may be concatenated, using the dot '.' character. As we will see later, verb concatenations are quite useful for evaluating expressions.

1.8) Conceptual Entities—Prior art vs. Current Invention: In this section, 1 would like to touch prior art, regarding the description of fields. Before designing KB, I have invented a mechanism called containment, which was described in one of my previous patent applications called "Conceptual Process Redactor" or CPR (reference 2).

The principle of containment is simple, and lets us include a field defined elsewhere into the current class description. The previous definition may belong to another valid class description or may simply reside in a class called "Logical_Fields", which merely acts as a place holder, for logical field definitions.

In CPR, field names are elevated to the role of data types, and their oops data types are stored in a library, called type translation library.

Combining CPR data types, and containment, we could define a field called "part.qty", and later define another field with the same type.

For example, sales order quantity is nothing but part quantity, and we may represent this in CPR as—
$Sales.order.$qty/$Part.$qty;
where, the character '/', is called the containment operator, and implies that $Part.$qty, is contained in $Sales.order.$qty.

The idea of equating a field to a conceptual field was captured very well in CPR. However, since CPR differs from OOPS in a lot of ways, they could not be mixed easily.

In the current invention, I have redesigned the representation mechanism, and at the same time retained the oops flavor, for easy mix/matching with popular languages like C++, java. Specifically, containment of CPR is regarded as an indirect approach to link fields to a conceptual field.

A simpler mechanism to equate fields is to assign an alias name in front of the field. If two fields happen to have the same alias name, then they are considered as equal. The alias name may be referred to as a shared field definition, or shared field tag. However, for reasons which will become clear later, the alias name is called a conceptual class.

For example, in the new approach, sales order quantity may be prefixed with a conceptual class as shown below.
<$Part.$qty> int qty; // order qty in sales order class definition It may be noted that the current approach has the same effect as containment of CPR, however, we need not maintain a separate class called "Logical_fields" class, to link fields to a conceptual field.

One of the biggest differences between CPR and the current approach is that in CPR the conceptual entity is a field, whereas in the current invention it is considered as a conceptual class.

The idea of conceptual class will be explained in detail in the next several sections.

1.9) Conceptual Classes: In this section, I will describe the properties of the conceptual classes, described above. Please note that in the previous section, I have said, that a field can be prefixed with a conceptual class. Thus, by choosing several fields of interest from an object, and prefixing these fields with a conceptual class tag, we can arrive at what is called a conceptual class description. A conceptual class may also be defined as a projection of certain fields of an object.

A conceptual class may be specified in the class definition as—
<$kb:$conceptual-class> oops-dt field-name.%v-optional-verb;

In a top-level object, which may have several objects, a conceptual class may contain several fields from several different objects, which have the same conceptual class tag. From the above, it may be noted that the definition of the conceptual class has an in-built additive property.

Another wonderful property of the conceptual class is that two different top-level objects may contain a conceptual class, but the fields in the conceptual classes need not be the same.

In comparison with CPR, the prior art, it may be stated that in CPR, a conceptual class is a rewrite of an oops class, using CPR notation. In the current invention, a conceptual class is only a projection of certain fields of a class.

1.10) Conceptual subclasses: The conceptual class described above, may contain many parts or individual tags. The first tag is prefixed with '$', to identify conceptual classes from regular class names.

Incidentally, the first tag, and all subsequent tags, until another tag with a '$' prefix or end of string is considered as a conceptual class. Similarly, the second tag with a '$' prefix, and all subsequent tags till another tag with a '$' prefix, or end of string, may be considered as a conceptual subclass.

The notion of conceptual sub-classes, may be extended to any number of levels. The last tag, of the last conceptual (sub) class, is prefixed with a sentinel character '/', to signal the end of the conceptual class.

A '*' character in any part of the conceptual class means all possible values. However, a '*' character may not be used as the first part.

Conceptual sub classes, are sub sets of conceptual classes, and are more useful than conceptual classes.

Let us assume, that a discount field is shared between, part object, sales order object, and customer master object. The description of the discount field in each of the objects may be given as,

| | | |
|---|---|---|
| <$Part.$Part.$/discount> | float discount; | // part object |
| <$Part.$Order.$/discount> | float discount; | // order object |
| <$Part.$Customer.$/discount> | float discount; | // customer object |

By referring to the discount field with the conceptual class name as in, $Part.*.$/discount, we can refer to any of the definitions given above. In order to refer to a particular definition given above, we can use the appropriate conceptual sub-class as in, $Part.$Order.$/discount;

It is also possible to select only a few conceptual sub-classes, and group them by borrowing regular expression syntax, as given below. $Part.[$Part|$Order].$/discount;

Since, such a syntax could lead to lengthy references, a mapping table is provided, where a conceptual class and related sub classes may be associated with a group of conceptual classes, and sub classes. $Part.$AAA.$/discount→$Part.[$Part|$Order].$/discount;

A conceptual class, or subclass, which is mapped to a group of conceptual classes or subclasses, is referred to as an indirect conceptual class or sub class.

The grouping of objects described above actually solves two problems. On one hand, it solves the problem of logical grouping of objects, on the other hand it also solves the problem of individual object order specification for the fields. The later part is described below in greater detail.

Continuing, with our example, we could group just the Part and Order discount as—
$Part.$AAA.$/discount→$Part.[$Part|$Order].$/discount;

However, a moment of reflection tells us, we could as well write the regular expression on the right hand side as—
$Part.$ABC.$/discount→$Part.[$Order|$Part].$/discount;

In other words, the order of the objects in the logical grouping may be used as the order in which the objects are traversed during context search, for the field.

Grouping of conceptual sub classes may be performed on any level, and there are no hard rules, on which level may store the object name.

It may be noted that conceptual (sub) classes are quite useful, and provide a pseudo object like status to primitive data types. Besides, they also enhance the capabilities of the custom data types.

FIG. 2 describes the mapping table, where an indirect conceptual class with optional sub classes (field 0201) is mapped to a group of conceptual classes with sub classes (field 0202), which are defined using the regular expression syntax.

Before ending the discussion on conceptual subclasses, I would like to point out that a conceptual class or conceptual sob class may not be specified in expressions as they are projections of certain fields of an oops class. A conceptual sub class or in some trivial cases, the conceptual class itself may be specified in expressions only, if all the fields on which it was specified have the same oops data type.

The above restriction is still loose, since it can include many different fields, which have the same oops data type. Hence, the designer must exercise proper care while defining conceptual sub classes.

The definition of a conceptual sub class supports the idea of a set of fields, rather than a single field. The reason behind this design is that, in KB, a field is not unique, and a verb makes it unique. In essence, a conceptual sub class, which may be used in equations, is nothing but a redefinition of a field without verbs. Conceptual sub classes may carry out further finer divisions of a field's verb set, without any restrictions. However, to include other fields with the same oops data type into a conceptual sub class, it is necessary that the verb sets of the fields are disjoint.

In general, a conceptual sub class+field's verb, must be unique, among all representations of the conceptual sub class, in an object, if it were to be used in an equation. In other words, the conceptual sub class+field's verb must uniquely identify a field in a class definition.

1.11) Shared fields and Nouns: A field may exist in more than one object, and such fields are called shared fields. When a field is shared by more than one object, each object may hold a different value or form, called the noun form, for the same field.

The following example illustrates shared fields.

Discount may be specified at the part level.

Discount may also be specified in Customer master, based on amount of orders placed by that customer, in that year.

Discount may also be specified on the sales order.

Typically the discount on sales order overrides all other discounts. However, if the part is on promotion, its discount may override the discount on sales order. Thus, it is clearly visible that the discount field has several forms, and we may actually write an ordering relation upon these forms, as given below.

Normal<Business<Sales_order<Promotional.

In the above ordering, "Normal" and "Promotional" are due to the part object or record. "Business" is due to customer master object or record, and is based on amount of orders placed. "Sales_order" is due to the discount given by sales representative, in sales order object or record.

From the above, we may conclude that a "field name+verb" may be stored in several objects, and nouns may be used to identify the form of the field in each of the objects.

In the previous section on "colors", I have said, that discount may be represented by verbs. In this section, I have said, that discount may be represented as nouns. This brings a very important question on how to use verbs and nouns. The choice of verbs and nouns is illustrated below with the ongoing "discount" example.

Let us assume that there are two types of discounts. As said before in the "colors" section, we call the first type of discount as regular, and the second type as special. The representation as given in the "colors" sub-section (1.3) is — float discount.%v-special;

float discount.%v-regular;

Let us further assume that, both these discounts may be present in the sales order, and if special discount is greater than zero, then it is applicable to the sales order, and overrides the regular discount, else the regular discount holds. This assumption makes the role of verbs clear.

Now, if we assume that the field "discount.%v-regular" is present in the part object, customer master object and the sales order object, and each of these fields may take up forms such as "Normal; Promotional, Business, Sales_order", then the role played by the nouns becomes evident.

Thus, it may be noted that the illustrations given here merely serve as guidelines for usage, and it is the primary responsibility of the designer of an application to choose the applicable mechanism.

1.12) Parametric Nouns: In the previous section on "shared fields", it was said that a shared field can have several forms in several objects, and nouns of the field may be used to identify the individual forms. It was also said an ordering may be defined on the nouns.

In addition, multiple forms are also possible for unshared fields, due to the temporary variables created during the processing. Each temporary variable may define its own noun, thus paving the way for the presence of multiple nouns.

It may be noted that every noun of a field, may be assigned an absolute level number. Hence an ordering of the nouns is possible. Please refer to sub-section 1.5 on State-Noun mapping table.

If an ordering on the nouns is available, then clearly the first (lowest), or last (highest) are accessible. Besides, the first and the last, all other levels of the ordering may also be accessed using a relative level number. These relative level numbers are referred to as the parametric nouns.

The parametric nouns are specified with the prefix "%p-". The nouns in the ordering may be referred to as "%p-nnn", where "nnn" is the digit sequence of the relative level number. If the maximum number of parametric nouns are restricted to 255, by the implementer, and if the parametric noun is specified as "%p-255", then it would roll back to the actual last level, which could for example be just 4 or 5, or 255 itself.

It may be noted, that any noun in an ordering may be referred to by its actual name, and the scheme given above is an extra feature, whereby a noun in an ordering may be accessed by relative level number.

1.13) Helper Fields: A field representing an equation may be considered as a logical field of an object, in certain cases. The restriction is that the object must supply all the fields of the equation, which require state based nouns. It may be noted that if the object is supplying all the fields, which have state based nouns, then it can directly specify the state-noun mapping of the helper field.

The ownership of the helper field is identified via the State-Noun mapping table. Thus, if an entry is found in the State-Noun mapping table for the helper field name, with the class name and package name, then the helper field is said to be owned by the object, even though it is not contained in the object.

In case, if the object is supplying only a few or none of the fields which take nouns, then the state noun mapping will become slightly complicated, and may be specified as the mapping given below.

(state of the object, and nouns of fields not contained in the object)→target noun of the helper field.

Conversely, the noun of the helper field is a composition of the nouns of the individual fields, and may be specified as—

(nouns of the fields)→target noun of the helper field.

In the current design, I have chosen the restriction, that all fields (constituents), of a helper field must be determined by the owning object. The main reason was to avoid composition of nouns of individual fields to arrive at the final noun. This reduces a lot of complexity, as well as leaves the run-time speed unaffected.

While there are many powerful schemes to form compositions of nouns, they are quite complicated, and their inclusion into this document, may make the subject matter of this document many times more complex to understand, and appreciate. This is another compelling reason to leave out composition of nouns.

1.14) Navigation Paths: A field resides in an object, however, it need not reside in a top level object. In other words, a field may be buried under a hierarchy, and to access such a field, the entire hierarchy must be traversed. A hierarchy of objects, which must be traversed from a given top-level object, in order to reach a field of concern, is called a navigational path or path for short.

A top-level object may contain several paths, which may lead to the field of concern. In addition, the intermediate objects in a path may be of array type. Hence it may not be known in advance or until run-time, how to traverse the top-level object, to reach the field of concern.

In order to address the above problem, every top-level object must provide two vectors called Navigation node vector, and navigation index vector. The first vector stores the dft-seq-num of nodes, and contains the depth first traversal sequence numbers of the class names, which are defined as arrays or iteratable structures in the object. The second vector stores the index values, which indicate the current or applicable array index, of the arrays or iteratable structures in the object.

The navigation vectors are created along with a top-level object, in its constructor or initialization methods, and are maintained during the traversal of a top-level object. In addition, the top-level object must provide the reference of the navigation vectors when demanded. Hence, every top-level object must implement an oops interface called INvidx. The definition of the INvidx interface is quite simple, and is given below.

```
interface INvidx
{
    Vector getNvnodeVector( );
    Vector getNvidxVector( );
}
```

The methods of the INvidx interface, retrieve the navigation vectors contained within the top-level object.

It is extremely important to note that navigation vectors merely resolve arrays in a path, but they do not select any particular path. Despite the knowledge of the navigation vector, several paths may exist, for a field of concern.

The next section describes how to select a particular path from a plurality of paths.

1.15) Auxiliary Verbs: A field may be defined in an object several times, and each definition may be made unique by including a unique verb. However, if this object is included in a top-level object several times, then the "field+verb" combine will be duplicated, and hence the verb alone is insufficient to identify the path to the field.

For example, Sales_order object may contain Shipping and handling information (SH_Info), at header level as well as at detail level. The header level contains the totals, whereas the detail level contains the item wise details.

Let us further assume that SH_Info has two fields named—

"Sales_Tax.%v-state", and

"Sales_Tax.%v-federal", then we cannot directly refer to these fields, without mentioning the navigation path. The verbs of the fields can only help us in choosing one from the other, but cannot help us in choosing the instance of the field, say "Sales_Tax.%v-state" in the header over the instance of the same field in the detail, or vice versa.

In view of the above, we need a new mechanism to identify the different instances of a field, and this new mechanism is called "Auxiliary Verbs". An auxiliary verb may be formally defined as a representation of "the usage of the field", where the usage is specified by means of the navigation path to the "field+verb" combine. An auxiliary verb is specified by means of "%a-" prefix.

Two top-level objects may contain a "field+verb" combine using different navigation paths. The "field+verb" may be considered as a similar entity or a different entity, by these objects. If the two objects prefer to see the "field+verb" combine as a similar entity, then they may assign the same auxiliary verb to the "field+verb" combine. In other words, the auxiliary verb may be defined as a mapping of a concept or verb tag to a navigation path. The above is equally applicable to multiple objects contained with in a top-level object. Thus, a top-level object such as the above mentioned Sales_order, may include SH_Info object twice, with two different auxiliary verbs.

Although, we have been using the term "field" singularly, a field has no individual existence, and must be qualified by an object (class) name. This does not restrict the use of auxiliary verbs to just objects, since, conceptual classes can elevate a primitive to the status of an object.

When two different objects are contained in an outer object, they may specify the same auxiliary verb. Since, the class-names (types) are different, these will be seen differently. However, if the two different objects, support a common oops interface, then the interface cannot be identified singularly, if the auxiliary verbs are identical. Hence, such objects must specify different auxiliary verbs, if they may be accessed via their common oops interfaces.

The mapping of the navigation path to the auxiliary verb is stored in a table called the auxiliary verb table, which is described in FIG. 3. In the figure, the field 0301, contains the class name of the object, for which the auxiliary verb is being defined. The field 0302, contains the auxiliary verb. The field 0303, contains the navigation path, from a known object reference. Incidentally, the known object reference is nothing but a top-level (or a prominent intermediate) object, for which this auxiliary table is being defined. The field 0304, contains the DFT sequence numbers of the nodes, which exist in the navigation path 0303.

With regard to implementation, each class may define its own auxiliary verb table. The name of the auxiliary verb table is determined from the class name by appending the suffix "_auxTable". The auxiliary verb table is stored in the same package (directory), as that of the class name.

1.16) Auxiliary verbs & Navigation paths: In the discussion given above on navigation paths, it was made evident, that when a node or class name within a path is specified as an array, or iteratable structure, then an index is required, to access the node.

A navigation path may contain several such nodes or classes which are arrays or iteratable structures. Hence, for every navigation path, an array of dft-seq-numbers of the nodes is stored, in field 0304, of the auxiliary verb table, such that the following conditions are satisfied.

For every class name in the navigation path, a dft-seq-number is stored in the dft-seq-number array.

If the class name or node is not an array or iteratable structure, then the dft-seq-number is set to −1 (−ve number). This helps to quickly identify the array nodes, just by looking at the dft-seq-number array.

If the class name or node is an array or iteratable structure, then the dft-seq-number of the node is stored in the dft-seq-number array.

Thus, at run-time, when it is required to identify the indexes, the dft-seq-number array of the auxiliary verb, may be read in order, and each valid dft-seq-number (>=0), can be located in the navigation index vector contained in the collaboration object.

The dft-seq-number array of the auxiliary verb is considered as an important mechanism, as it reduces the processing time required to locate the index of an array or iteratable structure to an acceptable level.

1.17) Helper Verb: This sub-section may be omitted on first reading, and it makes more sense, when read along with the next sub section 1.18, which is "KB Field Specification".

As explained above, an auxiliary verb identifies the path to a field, or more specifically, a path from a known top-level object reference, to the field. The field may be a primitive or an object.

Typically, we may want to specify an auxiliary verb for an object, and then refer a field within the object. In such a case, the object is called a container. The container object is also a field, and may have several verbs, hence an exact specification of the container object, consists of the auxiliary verb and the verb of the container. It may be noted that this would allow us to refer the field holding the container reference, as a class name plus the verbs.

We could also specify a conceptual class, with an auxiliary verb, where the conceptual class is associated with a primitive field. In this case, the second verb merely identifies the field. It may be noted that even in this case, we can refer to the field, by using a class name, plus the verbs.

In cases, where the conceptual class maps to a primitive, the container exists in the navigation path. This concept is explained in detail in a later section.

As a result of the above discussion, we may conclude that a class, irrespective of whether it is a real physical class or conceptual class, needs two verbs to full identify the field associated with the class.

For ease of use, these two verbs are concatenated together, and the concatenated verb is referred to as the helper verb. In other words, helper verb is equal to the auxiliary verb plus the field's verb. The field's verb is commonly referred to as class verb, since helper verb is specified along with class names.

The helper verb is represented with the prefix "%h-". The relation between auxiliary verbs and helper verbs is quite simple and is as shown below.

Assume a class "c1", containing field a "f1", is specified with an auxiliary verb "X", and a class verb "Y", then, c1.%h-X_Y.f1≡c1.%a-X_Y.f1;

c1.%h-X.f1≡c1.%a-X_null.f1;.

Thus, the presence of the "%h-" prefix implies that the field represented by the class and the helper verb is fully specified, whereas the presence of the "%a-", implies that a verb is required to identify the field represented by the class.

1.18) KB Field Specification: The formal definition of a field in KB was deliberately postponed until all sub parts are introduced.

A field may be defined in KB as—

$kb.pkg-name.class-name.%h-helper-verb.field-name.%v-verb.%u-noun; or as, $kb.pkg-name.class-name.%h-helper-verb.$$method-id; or as, $kb.pkg-name.class-name.%h-helper-verb.field-name.%v-verb. %u-noun.$$method-id;

where, class-name may be a oops class or a conceptual class.

The package name is optional, and may be identified using the auxiliary verb (navigation path), and by navigating the class descriptions.

The $kb prefix, informs the KB translator that KB Translator attention is required.

The full form of the KB field given above, has several color tags, and all of them, may be omitted, depending upon necessity. When all the color tags are omitted, the KB field will be reduced to the following form, $kb.pkg-name.class-name.field-name; It may be noted that the above form is quite similar to the oops field specification.

One of the biggest differences between KB and prior art, with regard to field specification is that KB uses two distinct entities called, class name and field name, in the specification. Since, class name is an abstract description, a field of type described by the class name is implied, but not directly specified, and is indirectly specified by the combination of the class name, and the helper verb.

Typically, the class verb (contained in the helper verb), the field's verb and noun are omitted, and the resulting forms are called parametric specifications of the KB field.

The parametric forms of the KB field are as shown below.

$kb.pkg-name.class-name.%a-aux-verb.field-name; or,
$kb.pkg-name.class-name.%a-aux-verb.$$method-id; or,
$kb.pkg-name.class-name.%a-aux-verb.field-name.$$method-id;

The above forms of the KB field are referred to as default forms, and are individually identified as "form-1", "form-2", and "form-3". Unless otherwise specified, a KB field is assumed to be in one of these forms.

The form-2 of the KB field specification is slightly different from the other two forms, since the container of the field is not explicitly specified, and is hidden within the navigation path of the object.

As a variant of form-2 of the KB field specification, the method identifier may be omitted. The result would be an object if real or physical oops classes were used, and the result could be an object or primitive field, if conceptual classes were used. Another variant of form-2 may include more than one method identifier.

The KB field specification may be easily extended as—
class-name1.%a-aux-verb1.class-name2.%a-aux-verb2.field-name; or
class-name.%a-aux-verb.field-name1.field-name2;

However, for simplicity we assume only the three parametric forms given above, and their variants, as KB field specifications.

Since, KB fields are frequently referred, I will use the abbreviation $kb-field-spec, to refer to the above parametric specifications or any of their possible variations.

1.19) Container Reference: The term container reference is quite important and is described below, in greater detail.

In form-1, and form-3 of the KB field specification, the container is an object of type class name, specified in the KB field. In form-2 of the KB field specification, the container is not explicit, and is hidden in the navigation path of the class name.

In form-1, and form-3, the field name could be an object, and determine its own state based nouns, or, it could rely upon its container for state based nouns.

In form-2, the field represented by the class name could be an object, and determine its own state based nouns, or it could be an object or primitive field (due to conceptual classes), and rely upon its container hidden in the navigation path, for state based nouns.

In view of the above, the term container is expanded to represent the concepts, "container of the field", or "container of the noun". The former is the default, and the latter is always referred to as "noun container".

1.20) KB Helper Tag: The tag "$kb", which usually appears in front of the KB field names, and other kb entities is called the KB tag. The KB tag may have a suffix, and may be specified as "$kb-helper-tag".

The KB tag "$kb" gives clue to the KB Translator, that KB attention is required. In case of KB tags, with a helper suffix, the suffix informs the KB translator, that a KB statement with the name "helper-tag" is defined.

The $kb prefix may be omitted for fields, which are contained in a KB rule or equation.

1.21) Typecasting: A field or variable or value or return value may be typecasted to another field. Typecasting may be as given below—
<$kb-field-spec> field-name;
<$kb-field-spec> var-name;
<$kb-field-spec> value;
<$kb-field-spec> method( );

where, <$kb-field-spec> is the KB field specification as described in the previous sub-section (1.18).

1.22) Method Identifiers: Often it is necessary to access a method uniquely. Unfortunately oops technology employs a technique called method overloading, whereby a method name may be reused several times. Although this scheme is quite useful, it destroyed the ability to refer to a method uniquely, just by its name.

KB provides a simple mechanism called method identifiers, which can identify a method uniquely. A method identifier is nothing but a sequence of tags, just like a conceptual class, except that the first tag of a method identifier is prefixed with '$$' (double dollar sign).

A method identifier is unique within a class description and is specified in front of the method definition as—

```
<$kb.$$method-id> return-type method-name ( parm-1, ...., parm-n)
{
    - - - method body - - -
}
```

Since a method identifier identifies a method uniquely, within a class description, a method may be invoked as described below.

$kb-field-spec.$$method-id;

where, $kb-field-spec identifies the object.

A method identifier may be used, only when all the parameters of a method signature are described in terms of the KB field specification. It may be noted that the generic or parametric nature of the KB field specification, allows us to use KB fields as method parameters.

If a method has no parameters, then the method name is unique, and in this case, the method identifier is redundant. In such a case, the method name prefixed with "$$", may be considered as method identifier.

Method identifiers serve an important purpose in equating methods with rules or equations, and this will be explored in a later section.

1.23) Example: The following example illustrates most the concepts explained above.

Let us assume we have a sales order, which in turn has a header, which in turn has warehouse information from where the order will be allocated. We will further assume, that the order header also contains the supplier information.

For the sake of illustration, I have utilized conceptual classes for describing supplier fields, and real or physical oops classes for describing warehouse fields.

```
class SALES_ORDER
{
    HEADER hdr;
    DETAIL dtl;
}
class HEADER
{
    ---
    ---
    <$Order.$/sup>  string  supplier.%v-primary;
    <$Order.$/sup>  string  supplier.%v-secondary;
                    WH      wh.%v-primary;
                    WH      wh.%v-secondary;
    ---
    ---
}
```

Due to the custom type "WH", and the presence of the verbs in the field "wh", the field name is more or less redundant. The custom type and the verb are sufficient to identify the field.

It may be noted that conceptual sub classes impose a rule, whereby the conceptual sub class and a field's verb must uniquely identify the field name. Please refer to the sub section on "Conceptual sub classes".

Hence, in both cases, the class name (real or conceptual), and the field's verb name are sufficient to identify the field name.

Let us assume that the auxiliary verb "%a-first", is mapped to the navigation path, SALES_ORDER.HEADER, for both the oops class "WH", and the conceptual class "$Order.$/sup"

Now, we could invoke the allocate method on the primary and secondary warehouses as—
WH.%h-first_primary.$$allocate( );
WH.%h-first_secondary.$$allocate( );
The supplier information may be accessed in a similar fashion, as—
$Order.$/sup.%h-first_primary;
$Order.$/sup.%h-first_secondary;

1.24) Objects & Interfaces: The verb and noun colors of an object may be attributed to its interfaces. Please note that, I have made it apparent in the color sub section (1.3), described above, that both primitive and non-primitive fields may take colors.

Although this is a very useful scheme, care must be exercised in choosing verbs for objects, as they are transferred to the interfaces implemented by the object, and may collide with other interfaces of other objects.

1.25) "this" Keyword: Oops uses a special keyword called "this", which implies current object. KB provides access to "this" object, via a special conceptual class called "$this".

2) Object Interaction Framework: Processing in OOPS is often described or modeled by an object interaction framework, and such frameworks come in varying degrees of complexity. For example, UML (prior art), provides an object interaction framework.

I have invented a collaboration framework before, which was described in a previous invention called "Conceptual Process Redactor" or CPR (reference 2).

The current invention (KB), provides an object interaction framework called KB Collaboration Framework, which is more powerful than the CPR collaboration framework of my previous invention.

The KB Collaboration Framework is described below.

2.1) Collaboration: A group of objects collaborate to achieve a goal, or a purpose. In the simplest form of collaboration, each object of the collaboration group is traversed in order, and each object executes a method. The object, which has the focus, is called the client, and all processing is described with respect to a client. In other words, when an equation is evaluated, it is assumed that the equation is in the client object's method.

The sequence, in which the collaboration objects are specified, is called the default collaboration sequence. Incidentally, the default collaboration sequence is a complete collaboration sequence, since all collaboration objects are covered by it. The index of the object, in the default collaboration sequence, is called the collaboration object id.

It is important to note that two concepts called "collaboration sequence" and "collaboration order" are intertwined in the above description. In the later sections, these concepts are segregated and dealt with in great detail.

2.2) Active/Passive Collaboration Sequences: The default collaboration sequence described above is a static sequence. However, since objects are dependent upon each other in some unknown random order, a static sequence such as the default collaboration sequence is of little use.

In order to address complex dependencies, two new types of sequences called active and passive collaboration sequences are defined and used. The active collaboration sequence is a sub-set of the collaboration sequence. Passive collaboration sequence is a subset of the complement of the active collaboration sequence.

Let X=set of collaborating objects; Y=active collaboration sequence.

Then, the passive collaboration sequence may be specified as a subset of—
Z=X-Y.

The example given below illustrates active/passive collaboration sequences more vividly.

Let X={A, B, C, D, E} be the collaboration sequence.
Let us choose the active collaboration sequence as—
Y={A, C, D, B}.
The passive collaboration sequence may now be given as a subset of—
Z=X-Y={E}

Typically, the active/passive traversal sequence is more important, than the active/passive collaboration sequence, and it is the reverse of the active/passive collaboration sequence.

Thus, if A, B, C is the active/passive collaboration sequence, then the active/passive traversal sequence is C, B, A. Since the active/passive traversal sequence, can be obtained from the active/passive collaboration sequence, it need not be specified explicitly, and is implied when the active/passive collaboration sequence is specified.

Both the active and passive collaboration sequences are represented as sequences of hex digits, where each hex digit pair identifies the index of the collaboration object in the default collaboration sequence. Valid values of hex digit pairs are 00 thru FF. The scheme may be extended, to include more hex digits, to identify the index of a collaboration object.

2.3) Collaboration sequence: The active/passive collaboration sequences described above, may be combined as shown below, to form a new sequence.

Passive collaboration sequence+Active collaboration sequence.

The above is referred to as the collaboration sequence, and has great importance in processing. It may be noted that this sequence is already adjusted for traversal in reverse order.

2.4) Collaboration Object View: A field may be found (contained or owned), in a subset of the collaborating objects. This subset is referred to as the collaboration object view.

For example, let A, B, C, D, E, F be a collaboration sequence. If a field f1, is contained or owned in only A, C, E, then the collaboration view, as seen from a method of object 'C' would be—E, C, A.

The translator determines the collaboration object view, when a field is referred, and this part is largely invisible to the end user.

2.5) Invisible collaboration objects: The default collaboration sequence, minus the objects in the collaboration sequence gives the invisible collaboration objects.

2.6) Temporary Variables—Introduction: Temporary variables created in a method during processing, usually reside on a stack, and are called automatic variables.

A temporary variable may have a constant value, or may change dynamically. The value of a temporary variable at a particular instance, is called a noun form of the temporary variable. In KB, an instance of a temporary variable may be stored in special arrays called Temporary Variable arrays.

The life-time of a temporary variable may also be controlled, by the developer. A particular instance of a temporary variable, which is stored in the temporary variable array, may be limited to the lifetime of the method, or may exist, during the entire lifetime of the application. The former type of temporary variables are called automatic temporary variables, and the later type are called global temporary variables.

Global temporary variables have special importance, since they have a longer lifetime, and retain their value until the same statement, which created them, overwrites their value. The global temporary variables array acts like a global registry, where objects collaborating can store important values and retrieve them later.

As per the convention adopted in KB, automatic temporary variables are referred to as A-context, and global temporary variables are referred to as T-context. It may be noted that both A-context and T-context is processed in exactly the same way, except that A-context has higher precedence than T-context, in the default scheme of processing.

The temporary variables of KB have an unusual property not found in regular languages like java, C, C++ etc. The unusual property is that a temporary variable stored in either A-context or T-context may be associated with a field of an object (not necessarily a collaboration object).

The temporary variable definition may be viewed as a special type of "Assignment Rule", where the value is not assigned to the KB field, but is assigned to a representation of the KB field.

Besides, the temporary variables described above, typecast operation creates another type of context called E-context, which works just like A-context. The only difference between A-context and E-context, is that E-context is limited to the lifetime of a rule or equation, which is invoked in a method. For all practical purposes, E-context is considered to be same as, but another instance of A-context.

2.7) Temporary Variables—Specification: In popular programming languages like C, C++, and java, temporary variables are created as— oops-dt var-name=value;

The temporary variable creation in KB may be given as—

<$kb-field-spec.@kb-command>oops-dt var-name=value;

Several equivalent forms are possible, which may be given as—

<$kb-field-spec.@kb-command> value;
<$kb-field-spec.@kb-command> field-name;
<$kb-field-spec.@kb-command> method( );

All these forms are considered as Temporary variable creation via Typecast mechanism.

The "$kb-field-spec" specifies the object and field name with which the temporary variable is associated.

The KB commands for Temporary variable creation may be given as—

@eval_avar;@eval_tvar and @reval_avar;@reval_tvar.

The first command set, creates a temporary variable in the Temporary variable array. Typically, a temporary variable is rewritten by the same statement, which created it. Sometimes it may be necessary to rewrite a temporary variable from a different place (statement), in such a case, the second command set may be used to rewrite the value.

It may be noted that the commands, @eval_avar, and @reval_avar operate upon the A-context, whereas @eval_tvar, and @reval_tvar operate upon the T-context.

A typecast operation within a rule is equivalent to @eval_evar command. In other words, within a rule, <$kb-field-spec> value; is same as—

<$kb-field-spec.@eval_evar> value;

A temporary variable may also be created, along with a setXXX method. This variation will be referred to in future as set method variation, and is described below.

$kb-field-spec.setXXX(value).@kb-command;

The automatic variable context (A-context), needs special mention, as an automatic temporary variable is created, when an @eval_eqt command (explained later), is invoked on a field. In addition the parameters received by a method, are also considered as a part of the A-context, if the parameters are specified using KB field syntax.

A few important issues, that may arise in Temporary variable creation are described below.

An unconditional statement must create a global Temporary variable. This is a reasonable request, since I have said above that the global temporary variable array is shared by all objects.

Typically, only non-abstract or specific Fields are associated with Temporary variables. In other words, a helper verb is specified for the KB field, associated with the temporary variable. Similarly, grouping of conceptual classes is avoided.

Object references may be stored in temporary variable array.

When the container is assigning the state based noun colors, then the object stored in Temporary variable array (0501), as a reference, may not be updated arbitrarily, and whenever the object changes, its noun color has to be re-determined, by making use of @reval_xxxx command. When the noun color is re-determined, then all temporary variables, which are associated with the same KB field specification, will be assigned the new value. It is important to note, that the contents of the object stored in Temporary variable array as value can change, and the object representing the KB field with which the value is associated can also change. Section 2.17 describes the later condition in greater detail.

When the object is assigning the state based nouns, by itself, then the KB Translator builds the tables using the KB field spec, as a template, and hence, at run time, the object reference supplied, as value (0501) will be used, instead of the noun container (0502), built by the KB translator.

2.8) Temporary Variables—Storage: Both the A-context and T-context contain two sub-objects. The first sub-object is a symbol table, which holds the field names of the temporary variables. It may be noted that the symbol table is built during translation of the source code. The second sub-object is an array or vector of temporary variables, called value table, and holds the values of the temporary variables. The value table is built by the Translator, and is loaded and updated at runtime.

The symbol table is depicted in FIG. 4: The field 0401 contains the KB field name. The field 0402 contains the collaboration object id of the object, in whose method the temporary variable is created. The field 0403 contains the collaboration object id of the object, whose field is associated with the temporary variable.

Informally, the usage of fields 0402 and 0403, may be described as if, an object is saying, one of my methods have created the temporary variable (0402), or, I contain the field, with which the temporary variable is associated (0403).

The value table is depicted in FIG. 5, and contains columns for storing the value 0501, the reference of the noun container 0502, the noun value 0503, and the absolute level number of the noun 0504, the type of the applicable noun 0505, the name of the field 0506, and the class name of the noun container 0507.

2.9) Scope Rules for Context Searching: The context for KB fields is the Temporary variables created during processing, and the Object context.

The default order for context searching may be given as—
  Automatic Temporary variables (E-context)
  Automatic Temporary variables (A-context)
  Global Temporary variable array (T-context)
  Object context (O-context)

2.10) Reordering the Context Search: Several other variants of context searching may be specified by defining a new color called, "%z-context-order".

To simplify the reordering (of the default context), the letters, 'E', 'A', 'T' and 'O' are used for specifying the E-context, A-context, T-context, and object context. Any permutation of some or all these letters may be used as a valid context order.

In view of the above, the default context order may be given as
"%z-EATO".

The T-context, itself has several alternate representations, and may be specified by the following letters, and their meanings are as follows
U: search Temporary variable array, using the collaboration object id (0402), in whose method the temporary variable is created.
V: search Temporary variable array, using the collaboration object id (0403), whose field is associated with the temporary variable.
X: search Temporary variable array in collaboration order (bottom to top of array, using just the field name).

Finally, it may be noted that describing the invention with all these variants will complicate the description many folds, hence only the default context is assumed in the description. An implementation may provide all these flavors for greater applicability.

2.11) Collaboration Cycles & Collaboration Order: The sequence in which the collaboration objects are traversed to execute methods on the collaboration objects, is called a cycle. A collaboration may consist of several such cycles.

Each method, in a collaboration cycle, may be assigned a number, which is called the collaboration order number, of the cycle. In other words, a collaboration cycle defines an order on the collaboration methods, called collaboration order or cycle order.

A collaboration cycle need not cover all objects in the collaboration. It may visit a collaboration object any number of times in the cycle.

2.12) Collaboration Sequence and Collaboration Order: In the previous section called "Collaboration", I have written, that two concepts were intertwined in the definition of collaboration.

Although both concepts are already presented, I felt that there is a need to highlight the differences, as these concepts will be used several times in later sections.

Collaboration order: The order in which the collaboration objects are traversed, to execute the collaboration methods.

Collaboration sequence: The sequence in which collaboration objects are presented to the collaboration method, for viewing the data contained in the collaboration objects.

2.13) Collaboration Descriptor: The collaboration details described above may be described by an XML document, called the collaboration descriptor document. A sample document is depicted in FIG. 6. The DTD describing the structure of the collaboration descriptor document is provided in FIG. 6A.

As can be seen in the FIGS. 06/06A, the collaboration descriptor document, is a simple document and is identified by an attribute called "CDESC_ID", and contains, an "APPL" tag, and a "COBJ" tag (which can repeat any number of times).

The "APPL" tag, describes the client method name, and the package, as attributes. The package attribute describes the path, where the tables generated during translation are stored.

The "COBJ" tag describes a collaboration object name as an attribute, and contains a sub tag called "METHOD". The "METHOD" tag, describes a collaboration method of the collaboration object, and its cycle number and cycle order, as attributes. It may be noted that the "METHOD" tag, may be repeated any number of times.

The "METHOD" tag, in turn consists of "COBJ_SEQ", and "ICOBJ_SEQ" tags, which contain a subsequence of collaboration object id's, and represent the collaboration sequence, and invisible collaboration sequence.

The document also contains a "STRUC_RULES" tag, which in turn contains a plurality of "CYCLE" tags. Each "CYCLE" tag describes the cycle number, as an attribute, and contains the applicable structural rule, for the cycle.

It may be noted that the collaboration descriptor document (CDESC), which contains the descriptions of the collaboration objects, may be compared to a class description. In essence, the collaboration objects may be described as, pkg-name.class-name.%h-helper-verb.%u-noun, which is almost like a KB field specification. The only limitation is that collaboration objects may not be assigned state based nouns, since the "collaboration descriptor" is a document, and not a true object.

It may be noted that, whenever the class name of a KB field matches the class name of the collaboration object, and the helper verb of the KB field matches the helper verb of the collaboration object, the top-level collaboration object will be chosen as a match for the KB field. In this case, the navigation path would be null. Since, rules may already exist, and different rules may have referred to a top-level object using different auxiliary verbs, a few modifications to the above scheme may become necessary. The scheme described above may be easily extended, and whenever, the specified helper verb could not be located in any of the collaboration objects, the auxiliary verb within the helper verb, may be converted to "default", and the search may be performed again.

2.14) Pre-Initialized Collaboration Objects: Collaboration objects may be pre-initialized, by an external method. This may lead to interesting phenomena, which is described below.

Let us assume that cycle-0 is meant for initializing objects. If some objects are pre-initialized, then the cycle-0 collaboration order will obviously skip these objects. The initialization methods in the cycle-0 collaboration order will specify their active/passive collaboration sequence in such a way as to cover the pre-initialized objects, and already initialized objects, before un-initialized objects.

Typically, it is the client, which creates the collaboration objects and initializes them. In case of pre-initialized objects, the client merely receives them from its client (client's client). In order to describe the client exactly, the order of the parameters received by the client must be known. Since, we have already identified that the client will be receiving pre-initialized objects, as parameters, describing the client exactly, implies describing the order of the pre-initialized objects received by the client.

In view of the above, pre-initialized objects, which are not required to be initialized by the client, specify their cycle order number as −ve numbers.

For example, assume that we have 5 collaboration objects A, B, C, D, E. We further assume that A, and C are pre-initialized, where as B. D, and E require initialization by the client. In cycle-0, we can assign the cycle order for A, B, C, D, E as: −2, 3, −1, 5, 4.

It may be noted that the pre-initialized objects A, C were assigned cycle orders as −2, −1. This implies that the client will receive these objects from its client, and the order of parameters is C, A. The −ve order implies the objects are pre-initialized, and hence these objects will be skipped from processing in cycle-0. The other three objects B, D, E were assigned cycle orders as 3, 5, 4. Hence initialization of these objects will be carried out in the order B, E, D.

2.15) Collaboration methods vs Non Collaboration Methods: Methods may be broadly classified as of three types—

1) Collaboration methods, which participate fully in collaboration. These methods read/write from T-context. Context searching is possible from these methods. Can update collaboration objects.
2) Collaboration methods, which participate partially in collaboration. These methods read from T-context. Context searching is possible from these methods. Can update collaboration objects.
3) Methods which do not participate in collaboration. These methods cannot read from T-context. Context searching is not possible from these methods. Can read/update collaboration objects independently outside of collaboration framework.

It may be noted that, the access to a field can change, when collaboration sequence changes, and a collaboration sequence may be specified for a combination of collaboration descriptor, cycle number, and cycle order number. Hence, full and partial collaboration methods are specific to a collaboration descriptor, cycle and cycle order number, and must be regenerated, if any of these changes.

Context searching and other mechanism covered in later sections, allow us to invoke a method automatically, just by the method identifier.

It is important to note that participation in collaboration is different from automatic invocation, in the sense that even non-collaboration methods may also be invoked automatically. The requirement for automatic invocation, is the presence of a "Method identifier" for the method, which in turn implies, that all parameters of the must be specified using KB field syntax. An important corollary, of the above is that, a constructor can be invoked automatically, just like any other method.

2.16) Collaboration Parameter: A collaboration method invoked by the client or another collaboration method receives a special parameter called the collaboration parameter. Helper methods created to support collaboration methods, also receive this parameter.

The collaboration parameter is an object, and may be identified by the oops type Clb_Parm. It consists of the following fields, which are arranged in related groups, for easy reading. The code given in appendix-15 contains the Clb_Parm class description.

The collaboration descriptor id.

The collaboration cycle number, and the collaboration cycle order number, the collaboration object name, and the method name.

The reference of the vector containing the A-context/T-context vectors, the reference of the working State-Noun table, and the reference of the collaboration objects vector (in default collaboration sequence).

The collaboration sequence and the invisible collaboration sequence.

The collaboration object id, of the client.

Since, collaboration parameter is a special parameter, it is searched differently than other method parameters.

Specifically, the collaboration parameter in the calling method's signature is sent to the called method.

It may be noted that the KB Translator, creates the Clb_Parm structure during translation, and passes this structure to itself during recursive invocations. The collaboration parameter at translation time contains the symbol tables and value tables of A/T-contexts, whereas the collaboration parameter at run time contains the value tables of A/T-contexts.

2.17) A-context/T-context—State Based Nouns: The A-context/T-context needs special mention as they are involved in some special processing, when fields have state based nouns. More specifically, the A/T-contexts maintain the last value, a field took, while it has a particular color. Once a field, which has state based nouns, is stored in A/T-context, the A/T-context begins to listen to the updates to that field. If the color of the field in the object matches the color of the field in the A/T-Context, then the update is also applied to the field in the A/T-Context.

The above implies, that fields, which have state based nouns, must notify of any changes to the A/T-context. The KB translator generates necessary code to notify the A/T-contexts, which update their respective stores.

2.18) Set Methods: When an update to a field is required, a corresponding method called setXXX method, of the object is invoked. However, KB will remain in dark, when an object is directly updated, using native oops methods. As mentioned in the above section, the A/T-context must listen to this update, if the field has state based nouns. Hence, it is strongly recommended to use KB notation to update fields, which have state based nouns.

When a field is updated via KB, it pulls off the field name and generates code to pass a list of entries and the new value of the field, to the A/T-contexts, after the call to the setXXX method of the object. This would allow the A/T-contexts to refresh the corresponding entries, with the new value.

It may be noted that the list of entries contains the temporary variables, which are associated with the field's object. This list may be obtained by searching the Symbol Table fields (0401), and (0403), of the Temporary variable array, with the field name and object id (being updated). The list is further searched at runtime, to select only those entries, which have the same noun color, as that of the field contained in the object, which is being updated.

3) Intermediate KB Concepts (Transformational Mechanics of Colors): The basic KB concepts described above may be extended, and the next level of KB concepts, are referred to as intermediate KB concepts. The intermediate KB concepts play a crucial role in conceptualizing the expression specification and evaluation, and are referred to as the "Transformational Mechanics of Colors".

During my research, I have observed, that while color description is an important step towards identifying, dissimilarities among similar fields, it is barely adequate for describing results of complex processing. For example, a simple question that arises when colors are used, can be phrased as—what would be the color of the result, if we multiply two fields, which have colors? The search for answers of similar questions, led to the development of "Transformational Mechanics of Colors".

The transformational mechanics of colors is a very complex subject, and a formal description of the result of an operation is crucial for the description of the transformational mechanics of colors. Since, arithmetic, relational, and logical operations may be described in a formal way, the transformational mechanics of colors, for these operations may be given as described below.

It may be noted that arithmetic, relational and logical operations form expressions, and when equated to a result field they form equations. In the following description, and in the algorithms given in appendixes, the abbreviation LHS means left hand side of an equation, and the abbreviation RHS means right hand side of an equation (just as in high school arithmetic). The LHS field name is considered as a representation of the equation.

Equations or rules are specified in a table called Rules Table, which is explained in a later section. The evaluation of an equation is accomplished by a KB command, called "@eval_eqt", which is specified after the LHS field name.

3.1) Type-1 Equations: Equations comprising of only addition and subtraction are considered as Type-1 equations. This type of equation is specified in terms of verb colors and/or operational colors of a field, which are transformed into a verb color and/or operational color of the same field (result).

For example, we can describe a Type-1 equation as—
Part_qty.%v-unshipped=Part_qty.%v-ordered–Part_qty.%v-invoiced;

Typically, the right hand side of the equation is specified in terms of the verbs, and may optionally include operational colors. The left hand side of the equation may optionally specify operational colors. It is possible for the fields on LHS/RHS to omit the verb colors.

For a Type-1 equation, the operational color and the verb color of the LHS field, together determine the form of the RHS expression.

3.2) Type-2 Equations: Equations comprising of only multiplication are considered as Type-2 equations. This type of equation is specified in terms of field names alone, and two or more fields are transformed into a new result field.

Typically, the right hand side of the equation is specified in terms of the field names, and may optionally include operational colors. The left hand side of the equation may optionally specify operational colors. It is possible for the fields on the LHS RHS to specify fixed verbs.

For example, we may compute the price of a part as—
Part_price=Part_qty*Part_unitprice;

The same rule holds good for computing, the price of ordered parts, invoice parts, and shipped parts, and we may evaluate various prices by specifying verb colors for the result (or LHS field).

The verb concatenation for evaluating an equation is specified with a "%V-" prefix, so that it can be distinguished from the LHS field verb, which is specified with a "%v-" prefix (if it exists).

For example, evaluating the price with a verb %V-ordered, will be translated to an equivalent expression of the right hand side, where the verb color "%v-ordered" of the result is assigned to the first field Part_qty. The subsequent fields receive a null verb color.

Part_price.%V-ordered.@eval_eqt=
Part_qty.%v-ordered*Part_unitprice;

Similarly we may have,
Part_price.%V-invoiced.@eval_eqt=
Part_qty.%v-invoiced*Part_unitprice;

For a Type-2 equation, the operational color of the LHS field alone, determines the form of the RHS expression form. The absence of an operational color implies the presence of a null operational color.

The verb of the LHS field (if present), determines the verbs the RHS expression may take, and does not in any way influence the form of the RHS expression.

3.3) Type-3 Equations: Equations comprising of only division are considered as Type-3 equations. This type of equation is specified in terms of field names alone, and two or more fields are transformed into a new result field.

Typically, the right hand side of the equation is specified in terms of the field names, and may optionally include operational colors. The left hand side of the equation may optionally specify operational colors. It is possible for the fields on the LHS/RHS to specify fixed verbs.

For example, let us assume that it is required to compute the unit price, which may be written in a generic form as—
Part_unitprice=Part_price/Part_qty;

For example, evaluating the unit price with a verb %V-ordered, will be translated to an equivalent expression of the right hand side, where the verb color "%v-ordered" of the result is assigned to the first field Part_price. The subsequent fields receive a null verb color.
Part_unitprice.%V-ordered.@eval_eqt=
Part_price.%v-ordered/Part_qty;
Similarly we may have,
Part_unitprice.%V-invoiced.@eval_eqt=
Part_price.%v-invoiced/Part_qty;

For a Type-3 equation, the operational color of the LHS field alone, determines the form of the RHS expression form. The absence of an operational color implies the presence of a null operational color.

The verb of the LHS field (if present), determines the verbs the RHS expression may take, and does not in any way influence the form of the RHS expression.

3.4) Type-4 Equations: Equations comprising of relational and/or logical operations are considered as Type-4 equations. This type of equation is specified in terms of verb colors and/or operational colors of a field, which are transformed into a verb color and/or operational color of the same field (result). For example,
Part_qty.%order.fully.processed=
(Part_qty.%v-ordered=Part_qty.%v-invoiced);

Typically, the right hand side of the equation is specified in terms of the verbs, and may optionally include operational colors. The left hand side of the equation may optionally specify operational colors. It is possible for the fields on LHS/RHS to omit the verb colors.

For a Type-4 equation, the operational color and the verb color of the LHS field, together determine the form of the RHS expression.

It may be noted that a Type-4 equation may be evaluated individually, or may be used in combination with another equation, where the Type-4 equation acts as a guard of the other equation.

3.5) Type-5 Equations: These equations are a generalization of the Type-4 equations, and are specified in terms of logical operators alone. Unlike Type-4 equations, which are specified in terms of the verb colors and/or operational colors of a field, Type-5 equations, are specified in terms of the operational colors of several fields on the right hand side of the equation.

Type-5 equations are mostly used for specifying the compound conditional statements. Type-5 equations may be compared to Type-2 or Type-3 equations, since they are specified in terms of different fields, but they transform like Type-1 or Type-4 equations, since they do not require verb concatenations from user, during evaluation.

It may be noted that a Type-5 equation may be evaluated individually, or may be used in combination with another equation, where the Type-5 equation acts as a guard of the other equation.

3.6) Type-6 Equations: A set of methods may be composed, using a generalized composition operator denoted by the character '^', and such a composition of methods is called a process. Equations comprising of compositions of methods (processes), are referred to as Type-6 equations. These equations transform like Type-2 equations.

Since, a process definition can be larger than a simple equation, it may be a tedious practice, to store it in a Rules table. As a practical measure, the process definition may be stored in a static method of a class, and the class name and method name (strung together), may be stored in the rules table.

3.7) Generalized Type-1 and Type-2 Equations: In the above sections, Type-1 equations are said to consist of only addition and subtraction operations. However, there are a few other operations, which belong to this class, hence this behavior may be generalized as Equations, which are specified in terms of verb colors and/or operational colors of a field, and which result in a new (different) verb color and/or operational color of the same field, are called Type-1 equations.

For example, let us assume that it is required to compute the minimum of ordered quantity and the quantity in warehouse. Typically, this is the quantity, which is allocated for shipping, during the order allocation process. This may be described as a Type-1 equation, given below—
Part_qty.%v-allocated=min(Part_qty.%v-ordered, Part_qty.%v-wh);

In addition, due to the above definition, both Type-1 and Type-4 equations may be considered as of same type, and may be generically referred to as of Type-1.

Similarly, we may generalize the behavior of Type-2 equations as —

Equations, which are specified in terms of several field names with/without operational colors, and verb colors, and which result in a new (different) field name, with/without operational color and verb color, are called Type-2 equations.

Surprisingly, the above definition provides a basis for defining the equivalence of methods and rules, which is explained in the sub section 3.12; as "Method-Rule Equivalence".

In view of the above definition, Type-2, Type-3 and Type-6 equations may be considered as of same type, and may be generically referred to as of Type-2. The distinction between Type-2 and Type-3 equations is thin, however the distinction is maintained, in view of the non-commutative behavior of the division operator.

Type-5 equations, also fall into the scope of generalized Type-2 equations, however, it may be noted that Type-5 equations do not need verb concatenations during evaluation. In essence, a Type-5 equation is like a container of several Type-4 equations. Hence, Type-1 equations transform like Type-1 equations.

3.8) Field Specification in Equations: In the above sub sections, I have written equations in terms of fields. However, fields in expressions are specified using the KB parametric field specification. Fields specified on the RHS of a equation may use all variants of the KB fields, whereas fields specified on the LHS may be specified as given below.

A field may be specified on LHS, in equations, with a class name and helper verb as—
class-name.%h-helper-verb.field.%v-verb.%op-color;
class-name.%h-helper-verb.field.%op-color;

A field may be specified on LHS, in equations, with a class name and auxiliary verb as—
class-name.%a-aux-verb.field.%v-verb.%op-color;
class-name.%a-aux-verb.field.%op-color;

A field may be specified on LHS, in equations with just a class name as
class-name.field. %v-verb.%op-color;
class-name.field.%op-color;

When the class name in a LHS field, is specified with a helper verb then the equation or rule is most specific, and when it is specified with an auxiliary verb, it is quasi-specific, and when it is specified without a helper or auxiliary verb, it is least specific. While searching for rules, the equation evaluator looks for the most specific rule, and then proceeds towards least specific rule, before signaling an error.

3.9) Complex Equations: An equation is referred to as a complex equation, if the RHS expression, in turn has sub-expressions. Including an expression in another expression has some important consequences, which are detailed below.

If a Type-1 expression includes another pure Type-1 expression as a sub-expression, then the sub-expression (included) is described as field, with a verb and an optional operational color. In this case, the purity of the Type-1 expression is unaffected, and the Type-1 expression, can still be considered as a Type-1 expression.

If a Type-1 expression includes another Type-2 expression as a sub-expression, then the sub-expression (included) is described as a field, with an optional verb and an optional operational color. In this case, the purity of the Type-1 expression is affected, and the Type-1 expression, cannot be considered as a pure Type-1 expression, since the resultant complex expression requires input verbs for the enclosed Type-2 sub-expression. A verb may be included, for the field representing Type-2 expression, but it has no effect on the form of the expression structure, since a Type-2 equation form is determined solely by the field and the optional operational color.

If a Type-2 expression includes another Type-1 expression as a sub-expression, then the form of the sub-expression (included) must be fixed. In other words, a verb may not be assigned to the field representing a Type-1 sub expression during evaluation. This restriction arises from the fact that a Type-1 equation form is based on both the operational color and the verb, whereas the Type-2 equation form is based only on the operation color. The major reason behind this restriction is to keep the form of the expression tree constant, lest the field may receive a verb, during distribution, which can cause the expression tree to change dynamically.

If a Type-2 expression includes another Type-2 expression as a sub-expression, then the sub-expression (included) is described as field, with an optional operational color. A verb may be included, but it has no effect on the form of the expression structure, since a Type-2 equation form is determined solely by the field and the optional operational color.

It may be noted that a field is described using KB field specification, which is a composite specification, and the field may represent a sub-expression. The form of the sub-expression is based only on the field component of the KB field, operational colors, and/or its verbs. In other words, the helper/auxiliary/class verbs, have no influence on the form of the sub-expression.

To summarize the above as a working procedure, it may be stated that,
A KB field is a composite of a class name, field name and method id's.
All KB fields in all types of expressions may receive verbs for classes and method id's.
Field portion of KB fields may receive verbs, if the KB field is a Type-2 expression, irrespective of the type of the expression, where the field is specified.
Field portion of KB fields may receive verbs, if the KB fields are atomic, and are contained in a Type-2 expression.
Field portion of KB fields may not receive a verb, if KB field is a sub-expression of Type-1, irrespective of the type of the expression, where the KB field is specified.
Field portion of KB fields may not receive verbs, if the KB fields are atomic, and are contained in a Type-1 expression.

3.10) Verb Distribution Scheme—Manual: Evaluating a complex equation is not a trivial task, since the nested sub-expressions may require verbs, which must be supplied for evaluating the equation. Another aspect, which makes evaluating such equations a tedious task, is due to the fact that some of the nested sub-expressions may have been already evaluated previously, and the developer simply wants to reuse these values.

In order to handle the wide variety of possibilities, such as those described above, the following approach is adopted in evaluating equations. It may be noted that the approach is the same whether the equation is simple or complex, however the complex handling becomes obvious, if the RHS expression has sub-expressions.

The RHS expression is fully expanded, until all sub-expressions are identified, and the fields cannot be expanded any further. The expansion is carried out using the Depth First Tree Traversal algorithm, popularly known in data structures as DFT algorithm. Each sub-expression encountered is assigned a sequential integer number starting from 1. The number 0 identifies the top or root expression, which is the RHS expression with which we started.

It may be noted that a KB field is a composite, which is formed out of a class name, field and one or more method identifiers. Hence, the verb required for a KB field may be a compound verb, where the individual verbs are concatenated with a "_" character string. Type-1 sub-expressions described as fields, and atomic fields of Type-1 sub-expressions, are special cases, as the field component does not receive any verb during distribution, but the class and method identifiers, may receive verbs.

While specifying input verbs, the DFT sequence number of the sub-expression is appended to the start of the verb concatenation. This lets the user ignore sub-expressions, which are previously evaluated. If a top-level sub-expression is omitted, than all its child sub-expressions which require inputs are automatically omitted, and the expression evaluator (the process being described), merely moves over to the next sub-expression, which requires user inputs.

The following example illustrates the process.

Assume, f0=f1*f2*f7;
and, f2=f3*f4; f4=f5*f6; f7=f8*9;

In the above, we assume, that field's f1, f3, f5, f6, f8 and f9 are atomic. If we intend to evaluate f0, we have to specify verbs for all the atomic fields, unless field's f2, f4 and f7 are already available.

To evaluate the field f0, we need to specify a verb concatenation. Since f0, has two sub-expressions; we may have to specify verb concatenations for sub-expressions f2, f4 and f7. Thus, to evaluate the field f0, we may need multiple verb concatenations.

Each verb concatenation must specify the sequence number of the corresponding expression as determined by the DFT algorithm. In our example, field f2 is a sub-expression with DFT sequence number 1, and field f4 is also a sub-expression with DFT sequence number 2, and field f7 is a sub-expression with DFT sequence number 3.

The verb concatenation for evaluating an equation is specified with a "%V-" prefix, so that it can be distinguished from the LHS field verb, which is specified with a "%v-" prefix (if it exists).

We may write the verb concatenations as
%V-#0.verb_for_f1
%V-#1.verb_for_f3
%V-#2.verb_for_f5.verb_for_f6
%V-#3.verb for f8.verb_for_f9 or as—
%V-#0.verb_for_f1
%V-#3.verb_for_f8. verb_for f9

It may be noted that in the second case, the field f2, is assumed to be available due to previous evaluation. Since, the field f2 will be retrieved from context (temporary variables or objects), it is not necessary to evaluate field f4, which is a sub-expression of field f2.

The implementation of rule evaluation is quite simple; the evaluator merely generates a string of how the expressions are nested using parenthesis. The sub expressions of the expression are replaced by their respective DFT sequence numbers, which are obtained during the traversal of the expression using the DFT traversal algorithm. The resulting string is termed as "Expression Structure List".

It may be noted that the parentheses neatly describe the limits and scope of the sub-expression, which may be counted to skip over to the next sub-expression at the same level. Each opening parenthesis increases a counter called level, and each closing parenthesis decreases the level counter.

When a field is defined in the rules table, it is considered as an expression or sub-expression, and conversely, when a field is not defined in the rules table it is considered as atomic. This property is made use of in building the expression structure list.

In KB, each expression may have a type, such as Type-1, Type-2 etc. When a sub-expression is encountered while preparing the expression Structure list, the type of the expression is stored after the expression's sequence number in "[ ]". The position of the sub-expression within its parent expression is also stored, after the type of the expression.

The complete form of a sub-expression in the expression structure list may be described as—
sub-expression-DFT-sequence-number[kb-expression-type, position-num-in-parent-expression]

The complete form the expression structure is based on the nature of the expressions chosen. The expression structure for the example given above, is provided here, as an illustration.

```
0 ( 1 [2, 2] ( 2 [2, 2]), 3 [2, 3] ) .
a   b c d   e f g   h i j
``` where,
a=Depth-First-Traversal (DFT) sequence number of top level expression, represented by the field f0.
b=DFT sequence number of first sub-expression, which is field f2.
c=KB type of expression, defined by field f2, which is Type-2.
d=position of field f2 in its parent expression, field f0, which is 2.
e=DFT sequence number of second sub-expression, which is field f4.
f=KB type of expression, defined by field f4, which is Type-2.
g=position of field f4 in its parent expression, field f2, which is 2.
h=DFT sequence number of third sub-expression, which is field f7.
i=KB type of expression, defined by field f7, which is Type-2.
j=position of field f7 in its parent expression, field f0, which is 3.

The Expression structure list plays an important role in evaluating the expression. Since sub-expressions of an expression are already identified, and their positions are already stored in the expression structure list, the expression evaluator can easily identify sub-expressions. The most critical and useful role played by the expression structure list is in identifying, how an expression may be evaluated. The procedure adopted and the theory behind it, are described below.

When a sub-expression is encountered, it can be of Type-1 or Type-2. It may be noted that Type-1, Type4 and Type-5 are considered as Type-1, whereas Type-2, Type-3 and Type-6 are considered as Type-2.

When a field representing a Type-1 or Type-2 sub-expression is found in context, the value in the context is used, and the sub-expression and all its children in the expression structure list are skipped, from further processing.

When a field representing a Type-1 or Type-2 sub-expression is not found in context, then the DFT sequence number of the sub-expression is used to retrieve the input verb set of the sub-expression. The verbs of the input verb set are distributed to the fields of the sub-expression, and the evaluation of the sub-expression is started. It may be noted that this process is recursive, in nature.

Thus, the expression structure list plays a very important role in the evaluation of the expression.

Finally, it may be noted that the above scheme of representing an expression in terms of sub-expressions, using parenthesis, is not my invention, and is known in prior art (reference 5). However, I have added the KB equation type, and position number after each node (DFT sequence number), so that the resulting structure can provide more valuable information to the expression evaluator.

3.11) Verb Distribution Scheme—Automatic: The verb distribution scheme given above is quite complex, but has the greatest power in specifying the required form of the final expression.

Typically, during equation evaluation, the input verb concatenation is searched for the verbs, if the verbs are not found, then a table called Verb distribution Table is searched using the field name, its verbs, and operational colors.

FIG. 7 depicts the Verb distribution table. In the figure, the column 0701, contains the KB field name. The column 0702 contains the concatenation of verbs, which may be applied to the RHS of the equation, defined by the Kb field name 0701.

3.12) Method-Rule Equivalence: Methods may use fields described using KB field specification, as formal parameters, which implies, that resolving the formal parameters, is nothing but specifying the colors of the formal parameters. Hence, we may conclude that a method is nothing but a Generalized Type-2 expression.

The above conclusion allows us to use a method, wherever a Type-2 expression may be used, thus paving the way for specifying the equivalence of methods and rules.

The novelty of the equivalence mechanism described above is that, the method signature located in the class description is sufficient to describe the Type-2 expression, and the expression need not be specified in the KB rules table.

Since, KB expression evaluation is quite robust, and determines the location of the fields, and their noun forms, we could omit the exact specification of the parameters of the method, during invocation.

Thus, we may invoke a method, outside an equation as—
"pkg-name.class-name.%h-helper-verb.$$method-identifier.%V-verb-concatenations.@eval_method;

or, we may include a method invocation, within an expression as—
"pkg-name.class-name.%a-aux-verb.$$method-identifier;

As explained before, in the KB field specification section, the pkg-name comes in handy, and without this pkg-name, the equation evaluator must search all the collaboration objects to determine the package name of the class-name.

We may also invoke a method from a known object reference, as given below. In this case, the KB Translator searches for the method definition in the class name of the object.

$kb.obj-or-intf-ref.$$method-identifier.%V-verb-concatenations .@eval_method;

Finally, it may be noted that the return value of a method may be typecasted to a kb-field-spec as described in the Typecasting section.

3.13) The null verb: In order to evaluate a Type-2 sub-expression, the user must supply verbs for all fields, as a verb concatenation. If a field does not require a verb, or is verb-less, then the above scheme of distributing verbs blindly, will cause a problem. In such a case, the field may specify a null verb, to avoid receiving a verb.

Similarly, a method identifier, may require a verb, or may not require a verb. The null verb may be used to specify, that a verb is not required, by including it in the method identifier of the class definition.

The null verb may be specified as—"%v-null".

3.14) Process Invocation: As said before, a set of methods composed using the method composition operator '^', is called a process, which may be stored in the rules table, as a Type-6 equation. A structural rule (explained in a later section), may be assigned to the Type-6 equation.

The process may be invoked, almost like an equation, as shown below.
$kb-field-spec.%op-color.%V-verb-concatenations.@eval_process;

The KB Translator generates code for the process using the Type-6 equation, and the structural rule, in the Rules table.

3.15) A-Context Inheritance: Type-6 equations are translated into a process. A process is a part of a method, but is regarded as an independent unit, and hence it has its own A-context (E-context). A process may be compared to a block statement of oops languages like java, C++. In essence, one process cannot see the A-context of another process.

The KB Translator makes the A-context of the method available to the helper methods of the process. It is also important to note, that A-context is passed only to processes invoked from the method, but is never shared between methods.

The above scheme is referred to as A-context inheritance. Since, a process may invoke another process, the inheritance of A-context is recursive, and can be nested to many levels.

Within a process, the reference of the A-context, is added as the last entry to the ensemble of context vectors, (located in the collaboration parameter), before beginning the process, which is removed before exiting the process.

Equations embedded in a Type-6 equation use the A-context of the process. Equations, which are not directly or indirectly embedded in a Type-6 equation, or another equation, can create their own A-context. Sub-expressions share the A-context created by a top-level expression (usually the root), or a process specification.

3.16) Special Colors: Often it is necessary to convert a field from one representation to another. The field may be a primitive data type such as an integer or a complex data type such as a date or an expression made up of primitives or objects. Since conversion (formatting) is heavily used in data processing, a special color scheme is provided to simplify the specification of the conversion methods. These special colors are prefixed with "%x-" prefix.

For example, Tran_date.%x-YYMMDD, implies date in YYMMDD format. The mapping of the color to the method is provided in a table, which is described in FIG. 8, as Special color Table.

The Special color Table contains five columns, where—
column 0801 contains the special color,
column 0802 contains the object name,
column 0803 contains the method of the object to be invoked, column 0804 contains a flag (Y/N), which specifies if the method is a static method or non static method, and column 0805 contains the return type (oops) of the method.

It may be noted that columns 0804, and 0805 may be omitted, as they can be obtained by searching the class descriptions.

Typically, the special color table FIG. 8, is searched with the special color name, and the row is obtained. The evaluation of the field comprises of generating code, so that the object specified in column 0802, is created with the value of the field, if the column 0804 (static method), contains a 'N'. Subsequently, code is generated to invoke the method specified in column 0803. If the column 0804, contains an 'Y', then code is generated to invoke the method specified in column 0803, directly with the value of the field, for which the special color is specified.

3.17) Constant Colors: Another useful feature in equation evaluation is the ability to specify the constancy of a verb color. By using this feature a verb color of another field or another instance of the same field may be assigned to the current field. This feature is implemented by including a constant color tag in all the field names under consideration. The constant color is usually specified with "%c-" prefix as "%c-color-tag", and applies only to the verb color.

For example, a constant color may be specified as—
f1.%c-ABC*f2.%c-ABC;

where, f1, and f2 are two fields, and %c-ABC is a constant color.

When a verb is assigned to the field f1, it is stored in an internal table along with the constant color tag %c-ABC. When the later specification of %c-ABC, is encountered for field f2, the system merely looks up the internal table for constant colors and retrieves the verb color stored previously.

3.18) Functions of Constant colors: The Constancy of the color explained before, may be viewed as a function, where a color is mapped back to itself. In a more general sense, a predefined function may map a set of colors to another set of colors, and such a function is referred to as "Constant color function".

A constant color function may be specified as—
f1.%c-ABC*f2.%c-XYZ[T:fx(%c-ABC)];

where, f1, and f2 are two fields, and %c-ABC is constant color, just as above.

The new addition is the constant color function specified as "fx(%c-ABC)", within "[ ]". The specification "T:" within the "[ ]" simply means that "fx" is a function and takes as input a constant color tag. Function "fx" is often referred to as the tag function, since it operates on a color tag.

The function "fx" is predefined by the developer, and maps a set of verb colors to another set of verb colors.

FIG. 9, describes the Constant color mapping table. In the figure, the column 0901, contains the constant color function name. The column 0902, contains the constant color value, which is being mapped. The column 0903, contains the target or mapped constant color value.

Let us assume, that the constant color function "fx" maps a verb, "%v-ordered" to "%v-shipped", and that the verb distribution has assigned a verb "%v-ordered" to field "f1". In view of this information, we can rewrite the above equation as—
f1.%v-ordered*f2[T:fx(%v-ordered)]; or
f1.%v-ordered*f2.%v-shipped;

It may be noted that the field "f2", can specify a constant color tag on its own, like "%c-XYZ", which may be used by some other field as a constant color, or in a constant color function (tag function).

3.19) Constancy of the Source: Constancy of the source, is another relation that may be specified for fields in an expression. The constancy of source may be specified in the same way as the constancy of the color, but with a prefix "%s-".

For example, constancy of source, may be specified as—
f1.%s-ABC*f2.%s-ABC;

If the field "f1", after appending a verb is located in an object (referred to as source), say "s1", then the field "f2" along with its verb, must be located in the same object "s1".

3.20) Functions of Constant Sources: The Constancy of the source explained above, may also be viewed as a function. Hence, we can define functions on constant sources, much like the tag functions defined on constant colors. The syntax for specifying a function on a constant source is same as the syntax for a constant color.

A constant source function allows us to specify the following—
f1.%s-ABC*f2.%s-XYZ[T:fx(%s-ABC)];

where, f1, and f2 are two fields, and %s-ABC is a constant source specification.

The new addition is the constant source function specified as "fx(%s-ABC)", within "[ ]". The specification "T:" within the "[ ]" simply means that "fx" is a function, and takes as input a constant source tag. Function "fx" is often referred to as the tag function, since it operates on a tag.

The function "fx" is predefined by the developer, and maps a set of sources to another set of sources.

FIG. 10, describes the Constant-source mapping table. In the figure, the column 1001, contains the constant source function name. The column 1002, contains the constant source value, which is being mapped. The column 1003, contains the target or mapped constant source value.

It may be noted that the field "f2", can specify a constant source tag on its own, like "%s-XYZ", which may be used by some other field as a constant source, or in a constant source function (tag function).

3.21) Specialized vs Generalized Equations: An equation may be made out of fields, where the class-names of the fields are specified with predefined auxiliary verbs. Omitting the auxiliary verbs for the class-names make the equations more generalized.

Generalized equations imply that both auxiliary verbs and regular verbs must be specified in order to evaluate the equation.

In a Specialized equation the auxiliary verbs are prespecified. This may imply that the form of the equation is already fixed, and hence the equation has only a few specific uses. However, in reality, specialized equations are quite useful. It may be noted that the auxiliary verbs conceptualize navigation paths, and hence specialized equations are said to address structures, which are pseudo isontorphic. Each auxiliary verb may be considered as a branch of an abstract structure, which contains the fields.

4) Advanced KB Concepts: The previous sections on "Basic KB concepts", and "Intermediate KB concepts", may be further extended, and these are called Advanced KB concepts. The advanced concepts are described below.

4.1) Structural Rules: A Structural rule describes an important property of methods. Specifically, it describes whether, a method in a sequence of methods, is processing a single entity or multiple entities.

Assume that A, and B are two objects. Let m1, and m2 be their respective methods. In view of the above, several process structures may be created based on the aspects described below.

Each method has two options for processing, in that, it may process just one entity, or may process several entities.

The methods A.m1, and B.m2 may be completely unrelated or related to each other.

In order to describe the various possible process structures, I have created a novel mechanism, which encloses a method and its related methods, in parenthesis, when a repetition of processing is desired. The procedure is recursive and the resulting "process structure" may be regarded as a structural rule.

Using the scheme described above, we could easily write several structural rules (process structures) as given below.

Case—1: A.m1 and B.m2 are unrelated to each other.
(A.m1, B.m2)
(A.m1, (B.m2))
((A.m1), B.m2)
((A.m1), (B.m2))

Case—2: A.m1 and B.m2 are related to each other. In other words, for each A.m1, B.m2 has to be executed.
((A.m1, B.m2))
((A.m1, (B.m2)))

Although the structural rules are quite descriptive, a little practice may be required in reading the structural rule descriptions. The required practice can be acquired immediately, by reading the expanded descriptions, of a few structural rules. For the sake of convenience, I have provided the expansions of the structural rules given under case-2 as described below.

```
For example, ( ( A.m1, B.m2 ) ) may be expanded as -
int ret_Am1 = STATUS_OK;
while ( ret_Am1 == STATUS_OK)
{
    ret_Am1 = A.m1 ( ..... ):
    if ( ret_Am1 < 0 ) throw exception ...
    if ( ret_Am1 == 0 ) break;
    int ret_Bm2 = B.m2 ( ..... );
    if ( ret_Bm2 < 0 ) throw exception ...
}
Similarly, ( ( A.m1, ( B.m2 ) ) ) may be expanded as -
int ret_Am1 = STATUS_OK;
while ( ret_Am1 == STATUS_OK)
{
    ret_Am1 = A.m1 ( ..... ):
    if ( ret_Am1 < 0 ) throw exception ...
    if ( ret_Am1 == 0 ) break;
    int ret_Bm2 = STATUS_OK;
    while ( ret_Bm2 == STATUS_OK )
    {
        ret_Bm2 = B.m2 ( ..... );
        if ( ret_Bm2 < 0 ) throw exception ...
        if ( ret_Bm2 == 0 ) break;
    }
}
```

The only drawback in the structural rule specification is that it is very verbose. It can be made very compact by assigning a sequence number to each of the methods. This allows us to rewrite the structural rules given below as—
((A.m1, B.m2))≡((1, 2))
((A.m1, (B.m2)))≡((1, (2)))

A structural rule specification may include, negation, conditional blocks, continue and break commands. These commands may be specified by including special characters before or after the sequence number of the method. The scheme is explained below, with an example.

Let us assume a structural rule specified as—((1, (2, 3, 4, 5 ), 6, 7)). By choosing sequence number 3, the commands may be described as—
3?=>if (3) continue;
3#=>if (3) break;
!3?=>if (!3) continue;
!3#=>if (!3) break;
3?/4/=>if (3) then 4;
!3?/4/=>if (!3) then 4;
3?/4/5/=>if (3) then 4; else 5;
!3?/4/5/=>if (!3) then 4; else 5;

Thus, with a tiny command set, a very modest process structure may be specified by the structural rule.

Finally, it may be noted that a sequence number in a structural rule, need not always imply a method, and it may represent a rule or equation. Typically, only the sequence numbers, which are assigned or prefixed with the opening parenthesis, and start a control structure have to be methods.

4.2) Collaboration Cycles & Structural Rules: Structural rules described above may be applied to collaboration order as described below.

A collaboration order is usually enclosed in a set of parenthesis called top-level parenthesis, which are considered as a cover, and may be discarded.

Besides, the top-level parenthesis, if a set of parenthesis is found anywhere else in the collaboration order, then the method immediately following the opening parenthesis is considered to be processing multiple entities, within a control structure (started by it), and the methods following it till the matching ending parenthesis is found are considered to be within the control structure. It may be noted that the procedure recursive in nature, and hence the definition must be viewed within the framework of recursive processing behavior.

Each collaboration cycle may optionally specify a structural rule (please refer to FIGS. 06/06A), and this completes the description of the cycle execution order.

The structural rules described above, solve the problem of 1:1, 1:n, n:1, and n:n specification between the collaboration methods. It may be noted that the collaboration objects may be used to encapsulate database rows, hence the relationships between the database entities may be described as structural rules. Besides databases, the relationships between a very large number of other types of data sources may also be described by means of structural rules.

4.3) Storage & Access Rules Storage and access rules of KB have a strong similarity with the Type-6 equations, since storage access in oops (prior art), is via methods. Before jumping into the thick of details, I would like to explain a few details on oops, so that the discussion is both enjoyable, as well as understandable. Starting from C++, oops technology introduced a concept called "generic types" or templates. Even the popular java technology is about to release a version, with support for "generic types". A beta version of java (ver 1.5) with support for generic types is already available.

Using the popular (easy to use and read), java language syntax, we could write a small example using generic types as—

LinkedList<Integer> list=new LinkedList<Integer>( );
list.add(new Integer(0));
Integer i=list.get(0);

In the example, the linked list is holding objects of type "Integer". We could modify the above example, to store other types, such as a "Book", in the linked list. Hence, we could as well write, LinkedList<Book> list=new LinkedList<Book>( );

The most important aspect of generic types is that, we can be sure of the data type, we are storing in a data structure, which is often referred to as a collection.

Now, I will move out of prior art, and dive into KB. The main issue of concern is, how to select a particular book from a collection. This would be a trivial problem, if we could specify what book we want to select. It may be noted that in a rule or equation, we cannot fix or send the parameters, since a rule or equation, has wide applicability.

With respect to the above linked list example, we could say, that the problem is equivalent to retrieving an object called book, from the linked list, using a key. Another variant of the problem is the ability to search the linked list, and sort the resulting list in some order, and then traverse the linked list in that order.

In view of the above considerations, I have concluded, that the object "Book", must specify its keys, and sort orders. As per the design specifications of KB, the keys and sort orders are described as methods.

In KB, an object may provide methods called Keyed index or K-index methods, and S-index or Sequential index methods. The method names could be arbitrary, however the method identifiers must be named as—

$$KB_Kindex_nnn and $$KB_Sindex_nnn.

The K-index methods accept the key fields and a reference of the collection, as parameters. The method compares the key values received with each object in the collection, and then returns the reference of the object, which has the same key values.

The S-index methods accept the key fields and a reference of the collection, as parameters. The method searches the collection using the keys, sorts the result in a pre-defined order. The new-sorted copy of the collection is returned to the caller.

In addition, both the K-index and S-index methods, accept a reference of a vector, as its first parameter, so that the method may return the index values of the entries, which have the key values specified. In case of K-index methods, the vector will contain only one entry. It may be noted that this feature is optional, and when a null is sent for the reference of the vector, it implies that the caller is not interested in entry indexes. Since, an S-index method returns a collection, which in all probability will be traversed, the index numbers of the original collection, may seem redundant. However, it may be noted, that the index numbers of the original collection say A1, from which a collection A2 is created may be useful, if A1 is associated with a collection such as B1, so that A2 and B1 may be associated using the original index numbers of A1. Thus, the original index numbers, serve to suppoit a feature called associated arrays or collections.

It may be noted that the object must implement the K-index and S-index methods as static or class methods, so that they are accessible without instantiating an object of the class.

Thus, when the KB Translator sees a method invocation as—

LinkedList<Book>.%a-first.$$KB_Kindex_001 it retrieves the class definition of Book, and from the signature of the method $$KB_Kindex_001, it identifies the parameters, and generates code to invoke the method with the parameters and the reference of the collection. The translation of a S-index call is same as that of the K-index.

Typically, K-index and S-index methods are used in process specifications or Type-6 equations. It may be noted that even though the S-index method returns a collection, it does not imply a traversal. The traversal specification comes from the structural rule. In other words a "for" loop around a collection returned by a S-index method will be generated, only when there is corresponding structural rule specification.

4.4) Navigation Index Maintenance: The navigation index maintenance is an important task. To refresh the concepts, it was explained before, that an auxiliary verb maps to a navigation path, and the path may contain arrays, or iteratable structures. In order to access the path, navigation indexes are required, for every array or iteratable structure, within the path.

The navigation index maintenance has two sub tasks.
  Accessing the navigation node, and navigation index vectors contained in the collaboration object.
  Storing an index value for an array or iteratable structure within a path.

The first task, is trivial, and consists of casting the collaboration object reference to the INvidx interface reference, and then calling the methods getNvnodeVector( ), and getNvidxVector( ), which will return the desired vectors.

The second task, is simple, but messy, since the dft-seq-number of the class or node within the collaboration object must be stored in the navigation vector.

It is important to note that although the first task is trivial, it cannot be hand coded easily, since the field may be located in any object of the collaboration. Hand coding, implies hard coding, and is not possible in generic rule processing.

In view of the above, a special kb-command called @eval-nvidx, is provided. This command may be applied to the K-index method or the S-index method. The KB Translator automatically generates the necessary code to store the dft-seq-number of the node or class described as an array, or iteratable structure, and the index value, in the navigation vectors of the collaboration object.

4.5) Exit command: A special KB command called exit command is provided by the KB system, in order to terminate processing, in an orderly manner. The exit command comes in handy, whenever, it is required to terminate processing abruptly, or conditionally.

The exit command, may be specified as shown below.
$kb.@exit;

5) KB Translator: The KB translator is a tool supplied by the KB system to translate applications (objects/methods) using KB statements to host language equivalents. A detailed description of the functions performed by the KB translator is provided below.

- 5.1) Translation of Object descriptions: The KB translator may be used to translate the object descriptions written in KB syntax to object descriptions in oops syntax. The process is depicted in FIG. 14.
- 5.2) Translation of Collaboration Methods: The KB translator may be used for translating the collaboration methods, which comprises of most of the aspects detailed above. The KB Translator may be invoked with the collaboration descriptor written as an XML document. The process is depicted in FIG. 15.

The KB translator parses the KB collaboration descriptor document, and translates each of the methods in cycle order for each of the cycles, until all collaboration cycles are covered.

Translating a collaboration method comprises of the following tasks.

- 5.2.1) Packaging: Packaging the translated code in a form for easier retrieval and usability, is a significant task. The following explains the forces, which influence packaging.

As explained before, a collaboration method may have a different representations or forms, when translated with different collaboration descriptors. Besides, a common collaboration method called from different cycles of a single collaboration descriptor, may also have different representations or forms. It may be noted that the form of the collaboration method may even change, when the order of the objects in the collaboration sequence changes. In general, the form of a collaboration method changes, when the collaboration descriptor, or cycle number or cycle order number changes.

In oops, a method is tied quite rigidly to the object. Hence, we cannot store each form of the translated collaboration method separately, in the same object, as there can be several forms of the method. Secondly, we need a mechanism to access all the different forms of the collaboration method, in a generic manner. These are referred to as the concerns or issues of packaging, which are addressed in the implementation scheme presented below.

The implementation scheme is quite simple, and may be paraphrased as "Instead of storing the entire collaboration method separately, we only store the code generated for KB statements in a separate place, and refer to them in a generic manner".

For each collaboration method, a helper class is created, which stores the code generated for the KB statements. Typically, the helper class is created in the same package or directory as that of the class containing the collaboration method, being translated.

For each KB statement, in the collaboration method being translated, a separate method is created in the helper class.

The name of the helper class is the name of the collaboration object's class, plus, the name of the collaboration method, plus, the name of the collaboration descriptor, plus, the cycle number, plus the cycle order number.

Thus, if "ABC" is the name of the collaboration class, and "m1", is the collaboration method name, and if XYZ is the collaboration descriptor name, and 3 is the cycle number and 2 is the cycle order number, then the helper class name can be given as, ABC_m1_XYZ_3_2.

As explained before, the code generated for each KB statement is stored as a method, within the helper class. The name of the method in the helper class corresponds to the kb helper tag. The kb helper tag is described in the KB Helper tag sub-section (1.20).

It may be noted that the parameter types of a helper method, corresponding to a particular KB statement, in any of the various helper classes remains constant, and the return type also remains constant, even though the code within the helper method can change, due to changes in the collaboration descriptor, or cycle number or cycle order number.

From the above, we can conclude that an interface definition can be written, for the methods of the helper class. Since, there can be many helper classes (for a collaboration method), all these can be accessed generically, using the interface definition.

Thus, if "ABC" is the collaboration class, and "m1" is the collaboration method, then "IABC_m1" is the interface for accessing the methods of the helper classes (which correspond to KB statements).

The concerns or issues, that influence packaging translated code described above, are now addressed, as we can have only one form of the collaboration method in the collaboration class, and it can access the helper classes (due to several collaboration descriptors), generically.

- 5.2.2) Identification KB statements are quite easy to identify, since they all have the "@kb-command" tag, somewhere within the statement. Besides this, all KB statements are prefixed with the KB tag "$kb", which in turn may contain the helper tag to uniquely identify the statement. Thus, it is fairly easy to identify a KB statement.

Besides KB statements, collaboration methods encountered during the processing must be identified. The question why KB Translator must bother to identify the collaboration methods is quite justified, and the answer lies in the fact that global temporary variables created by these second and higher levels of collaboration methods must be stored in the right order. The right order is considered as the order in which the collaboration methods are encountered.

For example, if a collaboration method "m1", calls another collaboration method "m2", then the statements in "m1" which are located after the call to "m2", must be able to see the global temporary variables created by "m2".

The identification of collaboration method invocation, is fairly simple, and consists of identifying a statement, which has the KB tag "$kb" as prefix, but no KB commands any where in the statement. Thus, the default KB statement is a collaboration method call. It may be noted that the KB Translator can also identify the collaboration methods, from the type of the first parameter in the method signature. If the type of the first parameter in a method signature is "Clb_Param", then the method is considered as a collaboration method.

After translating a collaboration method invocation, if it is invoked via KB command @eval_method, or after identifying a collaboration method invocation via oops technique, the KB translator calls itself recursively, with the name of the collaboration method, encountered during the translation or identification.

Now, I will describe a special situation, which the KB Translator handles during the translation, which may be referred to as, retranslation of the collaboration method. After translating a KB statement, the KB translator encloses the KB statement, and the code generated, within special comment lines, in order to identify the KB statement later. This is necessary since, the collaboration method may be translated again, and in such a case, only the helper class will be generated, as the collaboration method is already translated. It may be noted that a collaboration method say "C.m3" may be called from different collaboration methods, say "A.m1", and "B.m2". During the first translation of "C.m3", code will be generated, and helper class will be created. During the second translation, there is no need to regenerate "C.m3", only a new helper class will be created. However, during the second translation, the KB statements are in commented state, and the KB translator will identify the KB statements based on the special comment lines it created above and below the translated KB statement, and the code generated for it. The code generated for "C.m3" will switch to the appropriate helper classes, at run-time, based on the collaboration parameter it receives.

An important corollary of the above scheme, is that T-context variables will be created again for each call of C.m3, whereas A-context will be created just once, since A-context symbol table will be recreated when the method is retranslated.

5.2.3) Translation: The translation process is dependent upon the type of the KB statement. The following describes the translation process for the various types of KB statements.

5.2.3.1) Translation of KB Temporary Variables: The KB translator translates, KB temporary variables created during the processing, and builds the symbol table. Besides, code is generated to determine the state based noun and to store the value in the value table, of the A/T-context.

5.2.3.2) Translation of set methods: The KB translator provides translation support for the set methods, since it is strongly recommended to use the set method on KB field specification, when the field has state based nouns. As explained above, the KB translator takes a clue from this call, and generates code to and refresh previously stored values in the Temporary Variable arrays, if they have the same noun color.

The usage of set method using KB syntax is optional, if the fields does not support state based nouns.

5.2.3.3) Context Searching: In the default mode of processing, when a field is encountered, it is searched in the A-context, T-context and then the object context. But if a field has state based nouns, then some of this searching must happen at run time, since the nouns are dependent upon object states, and an object state is not known until run time. This can create a lot of load or burden at run time, and to reduce the load the following scheme is employed.

To reduce searching time in A/T-context, the code generator, pre generates a vector of integers, which identify the index of the context, and the index of the entry, where the filed may be found. This vector is called the Temporary Variable view vector. This is possible, since we know the fields stored in the Temporary variable Arrays via symbol tables, maintained by the KB Translator. Similarly, collaboration object references, where the field may be found, are stored in a vector, called the Collaboration Object View.

If the KB field is specified with a noun, the context searching proceeds by searching the A/T-contexts, and the object context.

If the KB field is specified without a noun, then the nouns defined by the collaboration objects, for the field, are used to search the A/T-contexts, in collaboration traversal order. If the nouns determined by the collaboration objects are not found in A/T-contexts, then the noun color (applicable field), is determined by the last collaboration object, where the field is located.

The context searching is illustrated with an example given below. Let us assume that A, and B are two objects with a common field f1. C is a third object without the field f1. A, B are in some initial state, and noun color for field f1, as determined by their initial states is %n-N1, %n-N2 respectively. C is also in some initial state, which is irrelevant to this discussion. We will further assume that an expression is being evaluated from a method in C, which referred to field f1.

Let A, B, C be the collaboration sequence, then C, B, A is the collaboration traversal sequence. It is further assumed that A-context is empty, and T-context has—f1.%n-N1; Now, if we were to search for the field f1 from a method in C, then the approach would be as follows.

Get first collaboration object.

This would be Object C, since the collaboration traversal sequence is C, B, A.

Object C does not have field f1. Object is skipped.

Get next collaboration object.

This would be Object B.

Object B has field f1. Its noun color based on B's initial state is %n-N2.

Append noun color %n-N2 to field f1, and search T-context for field f1, with noun color %n-N2.

This results in a no find.

Get next collaboration object.

This would be Object A.

Object A has field f1. Its noun color based on A's initial state is %n-N1.

Append noun color %n-N1 to field f1, and search T-context for field f1, with noun color %n-N1.

This results in a find, and the corresponding temporary variable is retrieved from the temporary variable array.

For argument sake, let us assume that the T-context is empty. In this case, the search in T-context would have failed, and would continue as described below.

Get first collaboration object.
This would be Object C, since the collaboration traversal sequence is C, B, A.
Object C does not have field f1. Object is skipped.
Get next collaboration object.
This would be Object B.
Object B has field f1. The field is chosen as the find, and its noun color is %n-N2.

5.2.3.4) Translation of KB Equations: This is one of the core functions of the KB translator. Equation translation comprises of many steps, like determining the form of the equation, identifying the fields of the equation, and evaluating the equation. Equation evaluation is accomplished by generating code for the equation.

5.2.3.5) Translation of Method Invocations: This is another core function of the KB translator. Method invocation comprises of determining the verb forms of the parameters of the method, and invoking the method. It may be noted that a method signature may be considered as a Type-2 KB expression, where the method identifier acts as the LHS of the equation, and the parameters of the method act as the RHS of the equation.

5.2.3.6) Translation of Process Invocations: The translation of process invocations is same as translation of method invocations, and equations, except that there can be a plurality of equations and method invocations in a process invocation. In addition, a process may be structured by a structural rule.

5.2.3.7) Translation of Navigation Index command: The KB Translator provides necessary translation support for the navigation index maintenance. This was already explained in the sub-section "Navigation Index Maintenance" (4.4).

5.2.3.8) Translation of the exit command: The exit command is translated into a return statement, or a "return ret_val" statement. The developer must store value to be returned in a temporary variable called "ret_val".

5.3) Generating the Client: The KB Translator can optionally generate the client, from the Collaboration descriptor. The process is described in FIG. 13.

5.4) Notes on Translation: The KB Translator described in this invention, is a highly simplified translator. The simple KB Translator helps to bring the flavor of KB concepts to the forefront, lest these could get buried in the complexity of the Translator. However, it is possible to design/use more powerful translators for translating KB statements.

6) Description of the KB System: The KB system has several parts, and FIG. 12, depicts the KB system 1201, along with a client 1205.

The KB system 1201, contains the KB translator 1202, the KB Tables 1203, and KB run time 1204. The parts of the KB system are described below.

6.1) Client of KB: The KB Client 1205, is the user of KB Services. Typically, the client is generated by the KB translator based on a collaboration descriptor, and invokes methods on collaboration objects, to accomplish the purpose of the application.

6.2) KB Translator: It may be noted that the KB Translator 1202, is a huge part of the KB system, hence it was described above, independently, in section 5.

6.3) KB Tables: The Kb system utilizes several tables, most of which are already described. The rules table FIG. 11, is the most important table, and contains the following fields.

Field (1101): Name of the result field or left hand side of the equation.
Exp (1102): An expression, or right hand side of the equation.
Type (1103): Type of the equation.
Cond (1104): A condition guarding the equation.
Label (1105): A string for storing related information.
The field 1101, represents the LHS of an equation, and is associated with an expression 1102. Each equation may be of a specific type (Type-1 thru Type-6), and the type of the equation is stored in the type field 1103.
Each equation may be optionally guarded by a condition 1104. A condition is a relational or logical equation, which is also stored in the same rule table. The condition name 1104 specified in an equation is nothing but the field name 1101 of a condition equation, specified in the rules table. The label 1105, is additional store, and is used for storing structural rules.

6.4) KB Runtime: The KB runtime 1204, contains several modules (run time objects), which provide the necessary support for the code generated by the KB Translator.

Operation—FIGS. 12 thru 16.

The operation of the KB system is divided into 2 sections. The first section describes the KB Translator, and the second section describes the other parts of the KB System (FIG. 12).

1) Operation of the KB Translator: The operation of the KB translator is described below.

In what follows a few snippets of code are shown, to illuminate the implementation process. It may be noted that there are two types of code snippets, the first being the translator code, which the translator executes during its working, and the second being the code generated by the translator. To enhance the clarity of the presentation, the translator working code is shown in regular font, whereas the code generated by the translator is shown in bold font.

1.1) Translation of Object Descriptions: The KB Translator may be used for translating the class descriptions (object descriptions) written in KB syntax to new class descriptions in oops syntax. During this translation, the verbs and user-defined nouns specified on fields are discarded, and the verbs and nouns are attached to their respective field names using the underscore '_' character. The new file is stored in the same relative path as that of the original, and is accessible via the same package name. Typically, the file name containing the object description is prefixed with "KB_" string, and the new translated file name, omits the prefix.

For example, if a verb and user defined noun are specified for a field as—
original-field-name.%v-verb.%u-noun;
then it is translated as—
original-field-name_vverb_unoun;
Typically, the class descriptions written in KB style, prefix the class name with a "$KB" tag. Upon translation the translator creates a class description without the "$KB" prefix.
Method identifiers in front of methods are removed.
Method parameters are replaced by their oops equivalents, using the same convention described above for fields. The type of the method parameters are determined by searching the class descriptions.

Conceptual classes are removed from the object descriptions. It may be noted that if the conceptual classes or method identifiers are referred to by some rule or equation, then the original (un-translated) version of the object description will be searched, to locate the specified entity.

1.2) Translation of Collaboration Methods: The KB translator begins by parsing the collaboration descriptor, and by creating a collaboration descriptor object, as described in Appendix-13.

A new T-Context object is created, which consists of an empty symbol table (FIG. 4), and value table (FIG. 5). A new State-Noun mapping table called working State-Noun mapping table, is created.

The cycles vector, contained in the collaboration descriptor object, created above, is traversed from cycle-0, and the collaboration methods of each cycle are translated in cycle order.

1.2.1) Packaging: Code is generated in the collaboration method to retrieve the collaboration descriptor name, cycle number and cycle order number from the collaboration parameter received by it, and to construct the helper class name, by concatenating these fields to the collaboration class name and collaboration method name.

The loading of the helper class dynamically is tricky, and requires support of the host language. The Java Language platform provides such a support. The loading of the helper class, for the example described in the description sub-section "packaging" (5.2.1), may be given in Java language as—

```
return-type m1 (Clb_Parm clb_parm, other parms of method )
{
    // KB CODE FOR LOADING HELPER CLASS - BEGIN
    // create collaboration method name
    string cobj_method_name = "ABC" + "_" + "m1";
    // create helper class name
    string helper_class_name =    cobj_method_name + "_" +
                                  clb_parm.cdesc_id + "_" +
                                  clb_parm.cycle_num + "_" +
                                  clb_parm.cycle_order_num;
    // load the helper class
    Class c = Class.forName ( helper_class_name );
    // get the helper class interface
    IABC_m1 kb_m1 = (IABC_m1) c.newInstance():
    // KB CODE FOR LOADING HELPER CLASS - END
    // KB statement - 1 (example)
    kb_m1.statement_1( parms );
    - - -
    - - - other code of the method m1
    - - -
    // KB statement - 2 (example)
    kb_m1.statement_2( parms );
}
```

In addition packaging consists of, creating an empty helper class (ABC_m1_XYZ_3_2), in the package (directory), of the collaboration class. Please refer to the sub-section 5.2.1.

creating an empty Interface definition (IABC_m1), in the same package with the concatenation of collaboration class name and method name, with an additional 'I' character as a prefix.

which will be filled in subsequent phases of the translation.

1.2.2) Identification: The identification of KB statements is quite simple, as reiterated several times before. If the.collaboration method is being translated first time, then the KB statements are commented and replaced with host language code, to implement the KB statement. However, if the method is revisited again then the KB Translator proceeds, by reading the KB statements previously commented by it. For this purpose the KB Translator adds a special comment line above and below the KB statement, which is commented, in order to recognize the statement again.

1.2.2.1) The collaboration method is read as a character stream, and the stream is searched for the presence of the token "$kb" (KB tag). In order to limit the description, we will assume that we know how to identify the start and end of the method, which of course is prior art.

1.2.2.2) When a KB tag is found within the character stream of the method, the sentinel of the statement (semicolon) ';' is located. Now, whatever that lies between the KB tag ("$kb") and the sentinel (';'), is the KB statement.

1.2.2.3) In the next step, a check is performed for the presence of KB commands listed below.

@eval_avar
@reval_avar
@eval_tvar
@reval_tvar
@eval_eqt
@eval_method
@eval_process
@eval_nvidx
@exit 1.2.2.4) If any of the KB commands listed above are found, then the statement is a pure KB statement.

If the kb-command is @eval_avar or @reval_evar or @eval_tvar or @reval_tvar, then the KB translator determines the type of "Temporary variable creation" by checking if the kb-command is located within '<' and '>', characters.

The statement is translated as described in the next sub-section named Translation (1.2.3).

1.2.2.5) If none of the KB commands are found in the KB statement then we can conclude that the KB statement is a method call, and the method call is invoking a KB collaboration method. It may be noted that the KB Translator can also identify the collaboration methods, from the type of the first parameter in the method signature. If the type of the first parameter in a method signature is "Clb_Parm", then the method is considered as a collaboration method.

In either case, the KB Translator, comments the line, and adds a new code line which is same as the replaced line, but without the "$kb" tag. Special comment lines are added to identify the statement in a later translation.

After the above simple translation, the KB Translator calls itself recursively, with the class name and method name of the collaboration method identified in this step.

The Translator also calls itself recursively, if the method invoked, via @eval_method command, is a collaboration method.

1.2.3) Translation: The Translation of the KB statements is as described below.

1.2.3.1) Translation of KB Temporary Variables: As described previously, a KB temporary variable may be created via the typecast mechanism as shown below.

<$kb-field-spec.@kb-command>oops-dt var-name=value;

where, the KB command can be @eval_avar/ @eval_tvar or @reval_avar/@reval_tvar.

In this case, the statement is commented and a copy of the statement without the $kb-field-spec, and kb-command, is created in the users method.

If the $kb-field-spec contains a helper tag, it is retrieved from the $kb-field-spec.

A call is generated to invoke a method identified by the helper tag (retrieved from the "$kb-field-spec"), using the helper class interface created above. It may be noted that the method identified by the helper tag does not exist at this point, and it will be created subsequently.

The code generated is better illustrated by an example, and let us assume a temporary variable is created as shown below. We will further assume, that it is the first KB statement, the KB Translator encountered, during the translation of a collaboration method, named "m1", within a collaboration object of class named "ABC".

```
<$kb_Stmt1.Order_Header.qty.%h-first.@eval_tvar>
    int qty = t_qty;
The code generated in this case would be as follows -
// KB TRANSLATOR - BEGIN : #0001
// <$kb_Stmt1.Order_Header.%h-first.qty.@eval_tvar>
//     int qty = t_qty;
int qty = t_qty;
IABC_m1.Stmt1 (
    clb_parm,
    "$kb_Stmt1.Order_Header.%h-first.qty.
    @eval_tvar",
    qty);
// KB TRANSLATOR - END : #0001
```

It may be noted that "IABC_m1" is the interface for accessing the helper class methods. The reader is requested to refer back to the sub-section "Packaging" (1.2.1), where an empty interface and an empty helper class were created, as a result of initiating the translation of the collaboration method.

Immediately after translating the KB statement, the KB translator adds the following method signature, to the helper class interface definition "IABC_m1".

int Stmt1 (Clb_Parm clb_parm, string kb_field, int value);

In addition, an empty method with the above signature is also added to the helper class created in the "Packaging" sub-section (1.2.1), as a result of translating the KB Statement. In our example (sub-section 5.2.1 of description/1.2.1 of operation), the collaboration descriptor name is "XYZ", cycle number is '3', and the cycle order number is '2', and the helper class name is "ABC_m1_XYZ_3_2".

The KB Translator then proceeds to generate code for the Temporary variable creation, in the helper method "Stmt1", using the algorithm described in Appendix-12, as the "Algorithm for creating the Temporary Variable".

It may be noted that the helper tag "Stmt1" may be omitted, from the "$kb" tag specification. In this case, the statement number is used for creating the method name as in "Method_000 1".

The procedure described here, for generating the call to the helper method and for creating the empty helper method, and interface entry, is the same for all types of KB commands. Hence, this procedure will not be repeated again for other types of KB commands, except that the signature of the method call generated will be specified, as the signature may vary across different types of KB commands.

1.2.3.2) Translation of set Methods: The set method call is parsed and the kb-field-spec is extracted. This consists of removing the value part, which may be identified as "(value )" sub-string, and the "set" prefix in front of the field name. The value part is stored for later use.

Each object of the collaboration sequence is traversed in reverse order, in a "for" loop, and the navigation path is determined by calling the algorithm described in Appendix-6. The "for" loop is terminated when a valid (non-null), path to field is found. If a valid path is not found, then an error is generated, as the object could not be located.

The verb and the user defined noun, if specified, in the KB field specification are appended to the field name using underscore '_' characters.

The navigation path, the field name, and the value part extracted above, allow us translate the "set" method in KB field format, to a "set" method of oops method.

After the above processing, the KB Translator generates a call to invoke a helper class method. The helper class method code generated is based on the presence or absence of the KB commands.

In case, @eval_tvar/@eval_avar, or @reval_tvar/ @reval_avar kb command, is specified along with the set statement, the helper class method code is generated using the algorithm described in Appendix-12, as the "Algorithm for creating the Temporary Variable".

In the absence of any KB commands, and if the field has state based nouns, the helper class method will contain code for notifying the A/T-contexts about the KB field being set. In this case, the code generated is as given in Step 9 of the Appendix-12.

1.2.3.3) Context searching: When a field is encountered, it is searched in the A-context, T-context and then the object context. The exact process is described by means of the algorithms given in appendices 10/11, as "Algorithms for context searching without/with noun".

1.2.3.4) Translation of KB equations: As explained in the description section, an equation may be invoked, as— oops-data-type var=$kb-field-spec.%V-verb-concatenations.@eval_eqt;

In response to the above KB statement, the KB Translator generates a helper method call in the collaboration method as given below.

helper_intf.helper-method-name (clb_parm, "$kb-field-spec.%V-verb-concatenations.@eval_eqt");

It may be noted that the procedure for generating the helper method call was described previously in "The Translation of Temporary Variables" sub-section (1.2.3.1).

The helper method is generated by translating the KB equation as described in the "Algorithm for Evaluating the Equation", given in Appendix-2.

1.2.3.5) Translation of Method Invocations: As explained in the description section, a method may be invoked just like an expression, as— oops-data-type var=$kb-field-spec.%V-verb-concatenations.@eval_method;

In response to the above KB statement, the KB Translator generates a helper method call in the collaboration method as given below.

helper_intf.helper-method-name (clb_parm, "$kb-field-spec.%V-verb-concatenations.@eval_method");

It may be noted that the procedure for generating the helper method call was described previously in "The Translation of Temporary Variables" sub-section (1.2.3.1).

The helper method is generated by translating the method call as described in the "Algorithm for Evaluating the Equation", given in Appendix-2.

1.2.3.6) Translation of Process Invocations: The translation of process invocations is quite similar to method invocations, except that there may be several methods or equations, in a process. In addition the methods of a process may be structured by a structural rule.

In view of the above, the helper method, where the code is usually stored will itself turn into a sort of driver. The code for each method or equation invocation is stored in a method name, which is obtained by adding a suffix, to the helper method name. The suffix is the sequence number of the method or equation, in the process (Type-6 equation) definition. Even though all these methods will be stored in the helper class, only the driver will be entered into the helper class interface.

A process may be invoked just like an expression, as— oops-data-type var=$kb-field-spec.%V-verb-concatenations.@eval_process;

In response to the above KB statement, the KB Translator generates a helper method call in the collaboration method as given below.

helper_intf.helper-method-name (clb_parm, "$kb-field-spec.%V-verb-concatenations.@eval_process");

The application of the structural rule is already detailed in the description section. Hence, this task is omitted, in the operation section.

An important task, in the code generation of a process invocation is described below.

The helper method (driver) of the process, creates a new A-context for storing temporary variables, which is entered into the A/T contexts of clb_parm, before beginning the process, and is removed before exiting the process. Thus, nested process invocations can view the A-contexts of their parent processes.

1.2.3.7) Translation of Navigation Index Command: The navigation index command (@eval_nvidx), is specified on K-index or S-index methods. The K-index or S-index method invocations are translated just like any other method invocation as described above. In addition, when a navigation index kb-command is specified, the code generated by the KB Translator, may be given as—

```
// get navigation index interface
// Note : cobj__ref identifies the collaboration object
// which contains the collection processed by K-index or // S-
index methods.
INvidx nv__intf = (INvidx) cobj-ref;
// get navigation node and index vectors
Vector nvnode = nv__intf.getNvnodeVector( );
Vector nvidx = nv__intf.getNvidxVector( );
// check if node is already present in navigation vector
int idx = nvnode.getindex ( dft-seq-num-of-node );
// if node num is already stored, replace, else add;
if ( idx == -1 )
{
    nvnode.add ( dft-seq-num-of-node );
    nvidx.add ( K/S-index-value );
}
else
{
    nvidx.replace ( idx, K/S-index-value );
}
```

1.2.3.8) Translation of Exit Command: The Translation of the exit command is quite simple, and may be given as shown below.

```
// KB Translator - house keeping code
 - - -
 - - -
// code for KB exit command
return; or
return ret__val;
```

The house keeping code, typically includes, removing the A-context added to the contexts vector in clb_parm, and may be given as—

// KB TRANSALTOR—HOUSE KEEPING CODE-EXIT clb_parm.contexts.removeLast( );

1.2.4) End of Translation of a Method: At the end of translation of a collaboration method, the symbol table and value table of the A-context are stored in the package name, where the collaboration method's class was defined.

It may be noted that the data of the A-context value table, is stored in code form, in a helper method called "load_Acontext", within a helper class, whose name is determined by concatenating the collaboration object's class, and the collaboration method name. This helper class is called common helper class as it does not contain the collaboration descriptor id, cycle number and cycle order number.

The code for the "load_Acontext" method, may be depicted as shown below, and contains add entry statements to a vector received as a parameter.

```
void load__Acontext ( Vector a__context )
{
    ValTable__Entry entry__1 = new ValTable__Entry( ... );
    ValTable__Entry entry__2 = new ValTable__Entry( ... );
    .
    .
    ValTable__Entry entry__n = new ValTable__Entry( ... );
    a__context.add ( entry__1 );
    a__context.add ( entry__2 );
    .
    .
    a__context.add ( entry__n );
}
```

Code is generated, at the top of the collaboration method, to load the value table, as shown below.

// create vector for A-context value table
Vector A_context=new Vector ( );
// load A-context value table
common_helper_class.load_Acontext (A_context);

A special entry is stored in T-context to indicate the end of current method. Typically, the value of field 0402 (collaboration object id), in Symbol Table is set to −100. Similarly, the value of field 0505 (type of applicable noun), is set to '@', implying that the entry is a control record.

1.2.5) End of Translation of the Collaboration Descriptor: At the end of translation of all methods of the collaboration descriptor, the symbol table and value table of the T-context are stored in the package (directory), of APPL tag, specified in the collaboration descriptor. The working State-Noun table is also stored in this directory.

It may be noted that the data of the T-context value table, is stored in code form, in a helper method called "load_Tcontext", within a helper class, whose name is determined by concatenating the collaboration descriptor name and the string "_Tables".

The code for the "load_Tcontext" method, may be depicted as shown below, and contains add entry statements to a vector received as a parameter.

```
void load__Tcontext (Vector t__context)
{
    ValTable__Entry entry__1 = new ValTable__Entry( ... );
    ValTable__Entry entry__2 = new ValTable__Entry( ... );
    ValTable__Entry entry__n = new ValTable__Entry( ... );
    t__context.add ( entry__1 );
    t__context.add ( entry__2 );
    .
    .
    t__context.add ( entry__n );
}
```

1.3) Generating the Client: The generation of the client consists of generating code for creating the collaboration objects and invoking initialization methods (cycle-0), and invoking methods of the collaboration objects (for cycles greater than 0). Each cycle other than cycle-0 may be structured by a structural rule.

Code is generated, in the client, to load the value table, of the T-context, as shown below.

// create vector for T-context value table
Vector T_context=new Vector ( );
load T-context value table
clb_helper_class.load_Tcontext (T_context);

where, the helper class name obtained by concatenating the collaboration descriptor name with the string-"_Tables". The working State-Noun table is loaded in a similar fashion.

The code generated for client is described in template form in Appendix-14.

2) Operation of the KB System: The operation of each part of the KB system is provided below.

2.1) Client of KB: 1205: The client loads the T-context and the working State-Noun table, during initialization. It then invokes the methods specified in the collaboration descriptor cycles, in cycle order. FIG. 16 depicts the client's run time operation.

2.2) KB Translator: 1202: The operation of the KB Translator was already described above, in section-1.

2.3) KB Tables: 1203: The KB tables are static entities. Tables, which are stored in text form, may be operated upon by text editors. Tables, stored as SQL tables on data bases, may be operated upon by the well-known SQL commands, defined by the ISO SQL standard.

The KB tables, which require user maintenance, may be summarized as

| | |
|---|---|
| State-Noun table | FIG.-1. |
| Indirect conceptual class table | FIG.-2. |
| Auxiliary Verb tables | FIG.-3. |
| Verb Distribution table | FIG.-7. |
| Special color table | FIG.-8. |
| Constant color table | FIG.-9. |
| Constant source table | FIG.-10. |
| Rules table | FIG.-11. |

2.4) KB Runtime: 1204: The KB runtime supports the code generated by the KB Translator. It may be noted that the code generated by the KB Translator, is quite similar in most cases, as there are only a finite number of underlying mechanisms for accessing the fields. To limit code generation, the KB Run-time provides several methods, which perform most of these repetitive tasks. The code generated by the KB Translator merely calls the appropriate run-time method. A few runtime methods, of high importance (Context Searching), are described below in greater detail.

2.4.1) kb.rt.txs.srhTArray1: This method searches the Temporary variable arrays, for the KB field name and a noun. The procedure is described in the algorithm given in Appendix-11. The code is given in Appendix-15.

2.4.2) kb.rt.txs.srhTarray2: This method searches the Temporary variable arrays, for the KB field name and a parametric noun. The procedure is described in the algorithm given in Appendix-11. The code is given in Appendix-15.

2.4.3) kb.rt.txs.srhCobj1: This method searches the object context, for the Kb field name and a noun. The procedure is described in the algorithm given in Appendix-11. The code is given in Appendix-15.

2.4.4) kb.rt.txs.srhCobj2: This method searches the object context, for the Kb field name and a parametric noun. The procedure is described in the algorithm given in Appendix-11. The code is given in Appendix-15.

2.4.5) kb.rt.txs.srhContext: This method searches the Temporary variable array, and the object context for the Kb field name. The procedure is described in the algorithm given in Appendix-10. The code is given in Appendix-15.

CONCLUSION, RAMIFICATIONS, AND SCOPE

My previous invention CPR (prior art), has capabilities to represent the variances of a field, via conceptual fields, even though CPR lacks the color concept. The biggest difference between CPR and KB in this regard is that, in KB, fields of equations or method parameters can be specified as the invariant part of the field, so that the variant portion of the field may be added later as color (or extension). In other words, KB can manufacture the field name from separate parts.

Another big difference between CPR and KB, is that KB can specify, its own view or order of the collaboration objects as collaboration sequence, which need not be the order in which the methods of the objects are executed. In contrast, CPR is stuck with the default order, and can see the fields only in the order of execution.

The KB system, has a few unmatched features, for example, KB can assign and detect state based noun colors, and can identify the form of a field, automatically. KB can distinguish the usage of a field via auxiliary verb colors or navigation paths. In addition, in KB, selecting a particular instance of a field from an array or collection is highly automated. Another important and very useful feature of KB, is the conceptual class, which can finely subdivide subsets of a field's representation into groups, and in some cases, may even be used to group multiple fields.

Type-1 equations described in this invention, do not receive verb colors, and this may imply that Type-2 equations contained within Type-1 equations can only have a singular form, if automatic distribution is sought. To overcome this limitation, another type of color called, verb locator (prefix "%1-"), may be specified for Type-1 equations. The verb locator color may be distributed like a verb color, but behaves like an operational color, in the sense it only identifies the form of the sub-expressions, and does not affect or participate in the application context.

The CPR system (prior art), can invoke methods automatically. The current invention KB, can also invoke methods automatically, and is far superior to CPR, in determining the applicable parameters of the method, from the fields of the objects, and temporary variables.

The KB system has advanced the conceptual representation technique, to a level, where an entire process or task (mini-method), may be described in a generic manner. A big advantage of KB over prior art, is that it is readily applicable for converting natural language descriptions of procedures, into host language code.

The method identifiers of this invention may be used to create conceptual interfaces, which contain just the method identifier, and omit the return type and parameters. Conceptual interfaces created in such a manner, maybe used to access containers, in a generic manner. It maybe noted that the method signatures could be different, yet they may be considered alike. Method identifiers follow the same syntax as conceptual classes. and hence can specify an order in which the object may be selected.

Method identifiers may also be considered as fields of an object, and may be assigned state based nouns just like fields. I believe, that this would create a mechanism, which has a flavor, but is more sophisticated than the "Receptor Mechanism", of Milner's π-calculus (reference 8).

Type-6 equations, which are abstract definitions of a process (using KB syntax), compare quite well to an UML collaboration diagram (reference 3). As the reader may notice, KB is equipped to generate better code, than any UML tool, known in prior art. As the complexity, of the application increases, UML can only generate a shell, leaving a lot for the developer to fill up. On the contrary, KB can nicely drill down into lower levels, and can generate even equations. In my view, structural rules, and storage access rules of KB, provide an excellent backbone, for writing abstract process definitions. Hence, KB can easily address code generation requirements of complex applications.

HTML pages may use KB field names (with some modifications), as field tags. These fields can be easily retrieved from the request object, and may be used to trigger an application.

Web Services (reference 6), may be viewed as methods on an application server. Since, KB can detect the parameters and invoke the method, a Web service may be invoked immediately after discovery. It may be noted that this is possible only on host language platforms, which provide Just-in-time compilation feature.

The principles and the mechanisms of the KB System, described above may be employed in various object-oriented languages like C++, Java, and various non-object oriented languages like C, Fortran, and Cobol. The scope of KB is quite extensive and is applicable to a very large number of programming languages currently known or which may appear in future.

Finally, the names of the interfaces, classes, modules, table names and many other specificities, described in this document are merely illustrations, and may not be construed as limitations, and an implementer may modify such entities, according to the constraints imposed by the environment, where the invention (KB) or any part of it, may be used. The description and the operation of the invention were also constrained, by the vast number of permutations and combinations of the underlying mechanisms of the invention. Hence, this application may be viewed in terms of the underlying mechanisms of the invention; and not merely upon the specificities of the permutations and combinations of the underlying mechanisms, chosen for presenting the invention.

REFERENCES

The following references are incorporated by references, into the present application:

1) The Java Programming Language: Third Edition Ken Arnold/James Gosling/David Holmes: Addison Wesley: ISBN 81-7808-148-2.
2) Conceptual Process Redactor (CPR): Pending Patent at USPTO, bearing the number 10/319167, dated Dec. 14, 2002.
3) The Unified Modeling Language (UML) User guide: Tenth Indian Reprint, 2003 Grady Booch/James Rumbaugh/Ivar Jacobson: Addison Wesley: ISBN 81-7808-169-5.
4) Learning XML: First Indian Reprint, 2001 Erik T Ray: O'Reiley: ISBN 81-7366-314-9.
5) Lisp for Micros: First Publication, 1984 Oakley Steve: Butterworth & co, England: ISBN 0-408-01442 -3.
6) Java Web Services Programming: First Edition, 2003 Rashim Mosha/VV Preetham: Weiley Publications Inc: ISBN 81-265-0360-2.

7) Coloured Petri Nets: Kurt Jensen: Computer Science Department University of Aarhus: http://wvw.ida.liu.se/~TDDC01/forelasningar/Old/tddc01-9b-colored-petri-nets-thumb4.pdf
8) An object calculus for asynchronous communications: Kohei Honda, and Mario Tokoro: Proc. The fifth European conference on object oriented programming, LNCS, July 1991 Springer Verlag. Revised in August 1991.
9) Mastering Regular Expressions: 2nd edition (Jul. 15, 2002): Jeffrey, E. F. Friedi: O'Reilly & Associates: ISBN: 0596002890

Appendix-1

Algorithm for Searching the Rules Table: The algorithm for searching the rules table is described below.

The algorithm receives a KB field as input parameter, and returns a row set of the applicable equation.
1) The verb, operational, and helper/auxiliary verb colors of the input KB field are extracted, as described below.
   1.1) The input KB field is searched for the "% v-" pattern. If the pattern is located, then a sub string of the input KB field is retrieved starting from the position of the "% v-" pattern till the next "%" pattern or the end of the KB field. The resulting sub string is the verb color.
   1.2) The operational color "%" in the input KB field is retrieved from the KB field, in a similar manner.
   1.3) The helper/auxiliary verb color in the input KB field is retrieved from the KB field, in a similar manner.
2) The class name and field name contained in the input KB field are retrieved. The verb, operational, helper/auxiliary verb colors obtained in Step1, are concatenated to the class name, and field name of the input KB field, and various representations of the input KB field name are created as explained below.
   The helper verb, if present, is a compound verb, and may be converted into an auxiliary verb, by removing the class verb (the second individual verb in the compound verb). It may be noted that the helper/auxiliary verb is applied to the class name of the input KB field, and the verb with "% v-" prefix is applied to the field name.
   In view of the above, it may be stated, that 3 verbs (helper/auxiliary/none), are applicable to the class name, and 2 verbs (verb/none), are applicable to the field name.
   Hence, the total number of representations of the field is 6, which may be given as
   1) class-name.% h-helper-verb.field.% v-verb.% op-color;
   2) class-name.% h-helper-verb.field.% op-color;
   3) class-name.% a-auxilary-verb.field.% v-verb.% op-color;
   4) class-name.% a-auxilary-verb.field.% op-color;
   5) class-name.field.% v-verb.% op-color;
   6) class-name.field.% op-color;
   The applicable representations are dependent upon the verb specified for the class name (helper/auxiliary/none). If a helper verb is specified, then all the above 6, are possible representations. If an auxiliary verb is specified, then only 4 representations (3 thru 6), are applicable. If none are specified, then only 2 representations (5 thru 6) are applicable.
   In other words, the equation evaluator tries to identify the equation, from the most specific form, and moves towards most general form, before raising an exception.
3) Each of the applicable representations of the input field, determined above, is searched in the rules table as described-below. At end, step 4 is performed.
   3.1) A SQL query given below is executed to obtain the applicable equation for the input field.
   Select * from KB_RULES_TBL where (field=input-field-name)
   3.2) If the resulting row set is not empty, the algorithm terminates, and the row set is used as the applicable equation for evaluating the input field. It may be noted that at most one equation must be found for the input field, and it is the developer's responsibility to supply a unique field name, by including operational colors if necessary.
4) If none of the applicable representations of the input field are found in the rules table, then the procedure is terminated with an error code.

Appendix-2

Algorithm for Evaluating the Equation: The algorithm for evaluating an equation is described below.

Typically, this algorithm is implemented as a method, which receives the collaboration parameter, a level parameter, a KB field name, the DFT sequence number of the expression/sub-expression, and an expression structure list string. These are called the main parameters.

Since, equation evaluation is recursive in nature, this method may call itself recursively several times, during the evaluation of the equation. The top most level of the recursive call is referred to as level-0, and subsequent levels are referred to as level-1.

In addition to the main parameters described above, the method also uses a flag called gen_code flag, to control code generation, a flag called method translation, and a code_file to store the generated code, and a stack called eqt_parms to store partial results.

When the method is invoked at top-level (level-0 or first-time), the DFT sequence number is sent as zero, the expression structure list string is sent as null, the eqt_parms stack is sent as null, and the method translation flag is sent as false.

An equation may be guarded by another equation. Hence, it is possible that this method will again invoke itself in level-0 to evaluate the guard equation.

A new instance of a context called E-context, is created before the rule is invoked, to store typecasts, specified in the equation. The E-context works just like the A-context, and is added to the vector of contexts in the collaboration parameter before beginning the equation processing, and is removed before the exiting the equation processing. However, context creation has several possibilities, hence it is not included in this algorithm. This algorithm, is more or less generic, and may be used for equation, method, and process evaluations.

The final result of the equation is stored in A-context using algorithm-12, during which a noun may be assigned to the result, using State-Noun mappings.
1) The KB field name received as input is parsed, and the following steps are performed.
   1.1) The KB field name is broken down into constituents like package-name, class-name, field-name, and colors. These are referred to later as input package-name, input class-name, and input field-name.
   1.2) If a "$$" sub-string is found, in the input field name, and if the method translation flag is set to true, then the field name specified is a method identifier. A sequence of method identifiers may be present, and the last method identifier is considered as the applicable method identifier.
      In this case, the KB class description of the input class-name, located in the directory specified by the input package name is searched for the first method-id, and the method signature is retrieved. The procedure is repeated, with the return type of the method, until the signature of the last method identifier is obtained.

It is possible to omit the package-name, in this case, the KB Translator searches the auxiliary verb tables (FIG. 03), of all the collaboration objects for the classname, and auxiliary verb, and obtains the navigation paths. Using these navigation paths, and the class descriptions of the classes in the paths, the package name of the input class name may be obtained.

It may be noted that the method parameters in the method signature act as a Type-2 expression. An equivalent Type-2 expression is constructed by including the generalized composition operator, '^' character, between the method parameters.

1.3) If the "$$" sub-string is not found in the input field name or if the method translation flag is set to false, then the KB field name is used to retrieve the applicable equation, by invoking the method described in Appendix-1.

2) If level parameter is zero (top-most level of recursion), then the following steps are performed.

2.1) The RHS of the applicable equation is processed by the algorithm described in Appendix-3, which is the "algorithm for determining the expression structure list", and the expression structure list of the RHS expression is obtained.

2.2) A stack called "eqt_parms" stack is created to store partial results.

2.3) If the code file is received as null, a new text file will be created, to store the code generated.

2.4) The DFT sequence number of the current sub-expression is set as 0.

3) The sub-expressions within the current expression are identified, by making use of the DFT sequence number of the current expression, and the expression structure list. The process is described in Appendix-4 as the algorithm for "determining the sub-expressions of a given expression".

The information regarding the sub-expressions of the current expression, obtained above is stored in a vector, which is referred to as the sub-expression-info vector. Each element of the sub-expression-info vector has the following form. <DFT-sequence-number, KB-equation-type, position-num-in-parent-expression>

4) The column values of the equation row corresponding to the current sub-expression, are retrieved into like named variables, which are LHS field, exp, type, cond, label. It may be noted that the column names and their usages are described in the description section of this document. In what follows, "field" variable means, a copy of the value contained in the column named "field", of the current equation row, in temporary storage.

If the equation is obtained from a method signature, then the variables are set as described below.
field=method-id;
type=Type-2;
cond=null; label=null;
exp=fields of method signature separated by '^' character (generalized composition)

5) Type-4 or Type-5 equations, which contain relational or logical expressions, may not be governed by conditions. In other words, nested conditions are not allowed, however, a conditional expression may refer to other conditional expressions. In view of the above, the cond variable is set to null, if type variable is '4' or '5'. This restriction is to simplify the illustration. Equation evaluation is prior art, hence only a few schemes, which exemplify KB features are selected.

5.1) If the cond variable is not null, then the algorithm calls itself recursively, with the cond variable as the input field name. The other parms are sent as described below.
clb_parm of level-0 is resent to this call.
A zero is sent for the Level parm.
A zero is sent as the DFT sequence number.
A null is sent as the expression structure list string.
The gen_code flag received from user (first level-0 call), is resent to this level-0 call.
Method translation flag is set to false.
The code_file created during first level-0 call is sent to this call.
The eqt_parms stack is sent as null, to this call.
It may be noted that equations specified in cond field are guard equations, and these equations can be complex equations, but cannot accept any verb concatenations.
If the call returns with a negative result, then the procedure is terminated with an error code, as the guard condition could not be evaluated.

6) A vector called constant source vector is created. Each entry of the constant source vector, when created will contain a constant source tag, and a collaboration object id, which is referred as constant source id.

7) The following steps are performed as a part of the processing of the exp variable.

7.1) Each field name in the current sub-expression (exp variable), is replaced by dummy parameter names "parm__1" thru "parm_n". The field names of the current sub-expression are saved in an array called the exp field array. After this transformation, the sub-expression is converted into a skeleton expression, containing fields "parm__1" thru "parm__n".

7.1.1) In case of simple arithmetic equations, the skeleton may look like parm__1+parm__2;

7.1.2) In case of method parameters, the skeleton would be generated as parm__1^parm__2^ . . . ^parm_n.

7.1.3) A field may be an atomic object or an object expression, and in either case, it may specify a method or a sequence of methods. Since, each method is considered as an expression, we may have a sequence of expressions juxtaposed, when method calls are specified.

In view of the above, the field (atomic or expression), and each of the methods, are assigned dummy fields, which are sequentially numbered.

For example, a method call may be translated as—
parm__3.parm__4( );
In case of multiple methods, we may have—
parm__3.parm__4( ).parm__5( );

8) The DFT-sequence number of the sub-expression is used to search the input verb set, and the applicable verb set is identified. If a verb set could not be identified, in the input verb sets, then the following steps are performed.

8.1) The verb distribution table is searched with the LHS field and its verbs, and the applicable verb set is identified.

8.2) If the LHS field and its verbs are not found in the verb distribution table, then control is transferred to Step 9.

8.3) The verbs in the verb set are distributed to the fields as described in "The algorithm for distributing the verbs", given in appendix-5.

9) Each of the field names of the current sub-expression is subjected to the following processing.

9.1) The sub-expression-info vector (created in step 3), is searched for the position number of the current field. If a match is found, in the sub-expression-info vector, then the current field is a sub-expression; else it is an atomic field.

9.2) A temporary variable called "constant source id" is created, and set to −1.

9.3) If a constant source tag is defined for the field, then the constant source vector created in Step 6, is searched for the constant source tag of the field.

If the constant source tag is found in the constant source vector, then the value of the "constant source id" is copied from the vector to the temporary variable created in step 9.2.

If the constant source tag is not found in the constant source vector, then the value of the "constant source id" temporary variable created in step 9.2, is set to −100. (Please refer to appendixes-10/11).

It may be noted that constant source functions may be implemented at this time, by searching the constant source mapping table.

9.4) The context (temporary variables and objects), are searched for the current field. It may be noted that all colors, excepting the verb, helper/auxiliary verb and noun colors, are removed from the field name, before this search. Method identifiers (if present), are also removed from the filed name.

9.4.1) If the field is atomic, and the field is found in context, then code is generated for accessing the field. Context searching is accomplished by making use of the algorithms described in Appendices 10/11.

The Gen_code flag, and "constant source id" temporary variable created above, are passed to the methods of these algorithms.

After the context search, the constant source tag and id, are saved in the constant source vector, if the constant source id has valid values (>=0).

9.4.2) If the field is atomic, and the field is not found in context, an error is generated, and the procedure is terminated with an error code.

9.4.3) If the field is a sub-expression, and if the field is found in the context, then code is generated for accessing the field. Context searching is accomplished by making use of the algorithms described in Appendices 10/11.

The Gen_code flag, and "constant source id" temporary variable created above, are passed to the methods of these algorithms.

After the context search, the constant source tag and id, are saved in the constant source vector, if the constant source id has valid values (>=0).

9.4.4) If the field is a sub-expression, and if the field is not found in the context, then the method calls itself recursively with the current field name, the DFT sequence number of the sub-expression represented by the field, and the expression structure list. The level parameter is set to 1, during this call. The method translation flag is sent as false. The Gen_code flag, eqt_parms stack, and code_file parameter of current invocation are sent to the next invocation.

9.4.5) If the field has method identifiers, then for each method identifier, the algorithm calls itself recursively, with the new field name, obtained by concatenating the field name, method identifiers, which are to the left of the current method id (already processed), and the current method id. The method identifiers to the right of the current method identifier, are ignored. The method translation flag is sent as true, to the recursive calls.

10) If the gen_code parameter received is false, then the control is returned to the caller, with a positive return code, else code is generated as described below.

11) Each field of the current sub-expression stored in the Exp field array, is examined on how it may be generated, by traversing the array in a "for" loop, in reverse order. The index of the "for" loop is named as "idx". At end, Step 12, is performed.

It may be noted that code is already generated in Step 9, for accessing the fields, if they are atomic. In this step the field values are simply retrieved from the stack if they are produced by a sub-expression. In addition, both atomic, and non-atomic fields may be processed further, if a special operational color is specified for the field.

11.1) If the field is atomic, and the special operational color with "% x-" prefix is not specified for the field, then the code is already generated by algorithms 10/11 as—
oops-data-type parm_idx=field-value;
where, idx, is the index of the for loop.

11.2) If the field is a sub-expression, then a previous recursive call of the method, would have created the field on the eqt_parms stack. The reason behind this step would become clearer as we progress to step 14.

In this case, the code generated may be given, as—
oops_dt parm_idx=eqt_parms.remove( );
where, eqt_parms is a stack, which is created at the beginning of the method.

The code shown here is a simplified version, since usually typecasting to the fields data type is required.

Assuming java language, a more exact version of the above maybe given for integer data type as—
int parm_idx=((Integer) eqt_parms.remove( )).intValue( );

The same scheme is employed to generate code, if the fields data type belongs to other primitive data types like float, char, double.

Since, methods are sub-expressions, the parameters of the method exist as a result vector, on the eqt_parms stack. In this case, the code generated may be given as—
Vector parm_idx=(Vector) eqt_parms.remove( );

11.3) If the special color with "% x-" prefix is specified for the field, then the Special color Table FIG.08 is searched for the special color specified with the "% x-" prefix. The object name 0802, method name 0803, static flag 0804, and ret type 0805 are obtained form the table.

---

If the static flag 0804 is 'N', the code generated may be given as -
{
    object_name obj = new object_name(parm_idx);
    parm_idx = obj.method_name( );
}

---

If the static flag 0804 is 'Y', the code generated may be given as—
parm_idx=object_name.method_name(parm_idx);

12) After, generating the code for all the fields in the expression, the equation is generated from the skeleton obtained by replacing the field names with the dummy parameter names, parm1, thru parm_n. (Please refer to Step 7).

The skeleton can be of three types, and each of these types is explained below.

12.1) The skeleton may be formed from an arithmetic/relational/logical equation, which does not contain method invocations. This is the simplest of all the cases.

Since, the parm values are already generated, the equation may be generated as, shown in the example, given below.

int result=parm_1+parm_2;

12.2) The skeleton may be formed from the parameters of a method. In this case, the skeleton would look like— parm_1^parm_2^ . . . ^parm_n;

In this case, the result would be a vector, and the parms and their oops data types, are saved in the result vector, as shown below.

```
// create vectors to store result, and result value
Vector result = new Vector( );
Vector result_val = new Vector( );
// add values of the parms to the result_val vector
result_val.add ( parm_1_value );
result_val.add ( parm_2_value );
     .
     .
     .
result_val.add ( parm_n_value );
// save result val and result type vectors in result
result.add ( "method_name" );
result.add ( result_val );
```

12.3) The skeleton may be formed from an equation, which contains method invocations. In this case, each method invocation is translated from the corresponding result vector (stored in eqt_parms stack), created during the method translation.

It may be noted that since translation is a recursive process, method invocations which are sub-expressions, will be translated prior to the expression in which they reside. Hence, a result vector of the method invocation exists, by the time the equation is translated, and consists of the parm values, and the method name, as detailed in the above step 12.2.

Hence, a method invocation, which is represented in the skeleton form as— int result=parm_1.parm_2( );

will be translated as— int result=parm_1.method-name (parm-21, . . . parm-2n);

The method_name and the parm-21 thru parm-2n are retrieved from the vector represented by the parm_2, which is created when the method is translated as a sub-expression.

13) In the next step, code is generated to convert the result, into an object. The sample code given below, illustrates the scheme, in java language, when the result is an "int" data type.

Object result_obj=(Object) new Integer(result);

14) In the next step, code is generated to save the result in the equation parms stack as shown below.

eqt_parms.add(result_obj);

15) In the next step, code is generated to retrieve the final result, as explained below.

15.1) If the level is equal to zero and the top-level field's equation type is equal to '4', or '5', then the result is retrieved into a Boolean variable whose name is same as the condition name. This may be described as— bool cond_name=eqt_parms.remove( );

15.2) If level is equal to zero, and the top-level field's equation type is not equal to '4', or '5', then code is generated to retrieve the result from the eqt_parms stack. If the equation is guarded by a condition, then a conditional statement is also generated.

The code generated may be given in java language as described below, when the data type of the result is "int", and when the field is guarded by a condition name "cond_name".

int result;
if (cond_name)
result=((Integer) eqt_parms.remove( )).intValue( );

The same scheme is employed, when the data type of the result belongs to other data types such as float, char, String.

The code file created in Step 2, is closed.

16) The method returns to the caller with a positive return code.

Appendix-3

Algorithm for determining the Expression Structure List string: The algorithm for determining the expression structure list string is described below. The algorithm is implemented as a method, which receives the following parameters.

The expression on the right hand side (RHS) of the equation to be evaluated, as a string.

A reference of a string called the expression structure list string, which will contain the expression structure list at the end of the method. Typically, the invoker of this method creates a string to hold the expression structure list and sets its contents to null. The reference of the string is passed to this method.

The method is recursive in nature and may call itself many times during the processing. To facilitate recursive processing, the method receives a parameter called level. The top-level invocation must send a zero, for the level parameter. When the method calls itself, it sends a 1, for the level parameter.

The DFT sequence number of the current (sub) expression is also received as a parameter. The top-level invocation will send a zero, for this parameter. When the method calls itself, it sends the DFT sequence number of the current sub-expression as a parameter.

1) If the level parameter is zero, then the following initializations are performed.

1.1) The string "0" is concatenated to the expression structure list string. This merely indicates the top-level DFT sequence number.

1.2) The DFT sequence number parameter is initialized to zero.

2) A temporary variable called number of sub-expressions is created to store the number of sub-expressions encountered within the current (sub) expression. The number of sub-expressions variable is set to zero.

3) The RHS expression string is parsed into tokens, and the field names are stored in an array called the Exp field array. The operators between the fields are discarded. Method identifiers are segregated and stored as separate tokens.

4) For each of the fields of the Exp field array, the following steps are performed. At end the Step 5, is performed.

During the traversal of the Exp field array an index is maintained to identify the field's position within the RHS expression. When the field is a method identifier, the position index is set to −1.

4.1) When the field is a method identifier, the signature of the method is obtained, and an RHS expression is formed using the parameters of the method, and the generalized composition operator '^'. The RHS expression is saved for future use, and the type of the expression is stored as Type-2. The control is transferred to Step 4.4.
4.2) The rules table is searched for the field name. Please refer to Algorithm-1, on the procedure for searching the rules table.
If the field name is not found in the rules table, then the field is an atomic field. In this case, the control is transferred to Step 4, and the next field name in the Exp field array is processed.
4.3) If the field name is found in the rules table (please see the above step), then it is a sub-expression, and the following steps are performed in this case. The RHS expression of the current field is saved for future use.
4.4) The expression structure list string is updated as described below.
    4.4.1) The DFT sequence number is increased by 1.
    4.4.2) The number of sub-expressions temporary variable is increased by 1.
    4.4.3) If the number of sub-expressions temporary variable is equal to 1, then the string "(" is concatenated to the expression structure list string.
    4.4.4) If the number of sub-expressions temporary variable is greater than 1, then the string "," is concatenated to the expression structure list string.
    4.4.5) The DFT sequence number is converted to string form, and the resulting string is appended to the expression structure list string.
    4.4.6) A string is created with the KB expression type of the field, and the field's position in the exp field array, as shown below. "[kb-expression-type position-of-field-in-parent-expression]".
The resulting string is appended to the expression structure list string.
    4.4.7) The method calls itself recursively, with the RHS expression of the current field name, the expression structure list string, and the DFT sequence number. The level parameter is sent as 1, to prevent re-initialization.
5) If the number of sub-expressions temporary variable is greater than zero, a closing parenthesis in string form ")", is appended to the expression structure list string.
The method returns to the caller with a positive return code.

Appendix-4

Algorithm for determining the sub-Expressions of a given Expression The algorithm for determining the sub-expressions of a given expression is described below.
The algorithm is implemented as a method, which receives the expression structure list string, and the DFT sequence number of the expression for which sub-expressions are sought as parameters.
1) A vector called sub-expression-info vector is created. Each element of the sub-expression-info vector contains an object called sub-expression-info object. The sub-expression-info object has three fields, which are, DFT sequence number, KB expression type, position number of field in parent expression.
2) The DFT sequence number received as an input parameter is converted into string form.
3) The DFT sequence number in string form is searched in the expression structure list string.
    3.1) If the DFT sequence number is not found in the expression structure list string, the method terminates with an error code or throws an exception.
    3.2) If the DFT sequence number is found in the expression structure list string, then the first character position after the DFT sequence number string is obtained. This position is called the initial position.
4) A temporary variable called parenthesis counter is created, which is set to 0. A temporary variable called current position is created, and is set to the initial position obtained in Step 3.2.
5) The expression structure list string is parsed from the current position. Each character is subjected to the following processing steps. At end control is transferred to Step 6.
    5.1) The white space characters are filtered out. If a white space character is encountered then the control is transferred to Step 5, and parsing is continued from the next character.
    5.2) If the parenthesis counter is equal to 0, and if the current character is a comma character ',', then the processing terminates and control is transferred to Step 6.
    5.3) If the parenthesis counter is equal to −1, then the processing terminates and control is transferred to Step 6.
    5.4) If the parenthesis counter is equal to 1, and if the current character is a digit '0' thru '9', then the following steps are performed.
        5.4.1) The current digit and any digits following it are read. The digit sequence represents the DFT sequence number of a sub-expression.
        5.4.2) The reading of characters is continued, and the kb-expression type, and the position in parent expression within the "[ ]" delimiters are retrieved.
        5.4.3) A new copy of the sub-expression-info object is created, and the DFT sequence number, KB expression type, position number of field in parent expression created above, are stored in the sub-expression-info object.
        5.4.4) The sub-expression-info object is added to the sub-expression info vector.
        5.4.5) The control is transferred to the Step 5.
    5.5) If a opening parenthesis '(' character is found, the parenthesis counter is incremented by 1. The control is transferred to Step 5, and parsing is continued from the next character.
    5.6) If a closing parenthesis ')' character is found, the parenthesis counter is decremented by 1. The control is transferred to Step 5, and parsing is continued from the next character.
6) The sub-expression-info vector created in Step 1, is returned to the caller. It may be noted that this vector may be empty, implying that there are no sub-expressions within the current (sub) expression.

Appendix-5

Algorithm for Distributing the verb colors:
The algorithm for distributing the verb colors is described below.
The method implementing the algorithm, receives an array of field names, referred to as input field names, and a concatenation of verbs as primary inputs. In addition, the parent expression type, and the sub-expression info vector of the parent expression (in which the input fields reside), are also sent as parameters.
It may be noted that verbs are distributed for both atomic and non-atomic fields.

1) The following steps are performed as a part of initialization.
   1.1) The concatenation of verbs received as input parameter, is broken down into individual verbs, and a vector called input verb vector is created.
   1.2) A constant color vector is created to store the constant colors encountered in the equation.
   1.3) A flag called Verb indicator is created, and is initialized to 'I'. The valid values and their meanings, of this flag, are as given below.
      I: Verb is in input concatenation.
      C: Constant verb.
      N: No verb color.
2) For each of the field names in the array of field names received, the following steps are performed. At end control is transferred to Step 3.
   2.1) The field name is parsed, and is broken down into tokens representitig
   The class name, field name without any colors,
   Colors by category (like, verb color, operational color)
   Optional functions specified within "[ ]"
      2.1.1) A new local field name object is created. The class name, field name without any colors, the array of individual colors by category, and the optional function specification are stored in the new local field object.
      This is a temporary object for holding the constituents of the current input field name.
   2.2) The position of the field name is searched in the sub-expression info vector and the type of the sub-expression represented by the field, if it is a sub-expression, is determined. This search also enables us to determine, if the field is atomic, when the field is not found in the sub-expression info vector received as an input parameter.
   2.3) The form of the field is determined by comparing with the parametric forms of the KB field specification, which could be form-1, form-2 or form-3.
   2.4) A field may require zero or more verbs, depending upon its specification. A counter called number of verbs required is created, and set to zero. The number of verbs required is computed as explained below.
      2.4.1) If only a class name is specified with no verbs, and,
         2.4.1.1) If the form of the KB field is either 1 or 3, then both auxiliary verb and class verb are required. The number of verbs required counter is incremented by 2.
         2.4.1.2) If the form of the KB field is 2, then only auxiliary verb color is required. The number of verbs required counter is incremented by 1.
      2.4.2) If a class name is specified with an auxiliary verb, and,
         2.4.2.1) If the form of the KB field is either 1 or 3, then only class verb is required. The number of verbs required counter is incremented by 1.
         2.4.2.2) If the form of the KB field is 2, then no increment is required to the number of verbs required counter.
      2.4.3) The type of the expression represented by the field is checked to determine, the number of verbs required.
         2.4.3.1) If the field is a Generalized Type-2 sub-expression, or, if the field is atomic, but the type of the parent expression is a Type-2 sub-expression, then the number of verbs required counter is incremented by 1. The verb indicator flag is set to 'I'.
         2.4.3.2) If the field is a Generalized Type-1 sub-expression, or, if the field is atomic, but the type of the parent expression is a Type-1 sub-expression, then no increment is required for the number of verbs required counter. The verb indicator flag is set to 'N'.
         2.4.3.3) If the field has a constant color function, or a constant color, which already exists in the constant color vector, then no increment is required for the number of verbs required counter. The verb indicator flag is set to 'C'.
      2.4.4) For each method identifier specified, the number of verbs required counter is incremented by 1, if the method identifier has not specified a null verb in its class description.
   2.5) If a function is specified within the "[ ]", and if the target tag of the function is a constant color tag (specified with a % c -prefix), then the following steps are performed.
      2.5.1) The constant color tag specified within the constant color function is retrieved.
      2.5.2) The constant color tag is searched in the constant color vector, and the corresponding verb is retrieved.
      2.5.3) If the above search in step 2.5.2 fails, the procedure is terminated, and an error code is returned to the caller.
      2.5.4) The constant color function name, and the verb associated with the constant color tag are searched in the constant color-mapping table (FIG. 09), and the target verb is retrieved.
      2.5.5) If the above search in step 2.5.4 fails, the procedure is terminated, and an error code is returned to the caller.
      2.5.6) The target verb obtained in Step 2.5.4 is appended to the field in the field names vector, received as input. The verb indicator flag is set to 'C'. The control is transferred to Step 2.7.
   2.6) If the field name has a constant color tag (specified by % c- prefix), then the following steps are performed.
      2.6.1) The constant color vector is searched for the constant color tag.
      2.6.2) If the constant color tag is found in the constant color vector, the corresponding verb is retrieved from the constant color vector, and is appended to the field in the field names vector, received as input. The verb indicator flag is set to 'C'. The control is transferred to Step 2.7.
   2.7) If a field requires zero verbs, then control is transferred to step 2.10.
   2.8) The verb located at the index corresponding to the instance number of the field is retrieved, from the input verb vector.
   2.9) It may be noted that the verb could be a compound verb. The individual verbs of the compound verb are added to the filed name, in exactly the same order, as they are determined. Please refer to step 2.4.
   2.10) If the field has a constant color tag, then the constant color tag and the verb are2 added to the constant color vector, and the constant color tag is removed from the field.
   2.11) The control is transferred to Step 2.
3) The procedure is terminated with a successful return code.

Appendix-6

Algorithm for Determining the Field Info:

The algorithm for determining the Field Info is described below.

The algorithm receives the collaboration parameter, the kb-field-spec (for which the Field_info is sought), the class name of a collaboration object, and its id (cobj_id), and the reference of a working State-Noun mapping table. Typically, the KB field spec contains the class name, helper verb, field name, verb and noun. Similarly, the name of the collaboration object contains a class name, helper verb, and an optional noun.

The algorithm determines the navigation path, the path to the container of the field, the path to the noun container, the path to the field, the form of the KB field specification, the fixed noun, and the type of the applicable noun. These values, along with the input kb field name, and input collaboration object id, are collectively referred to as, "Field Info". The method returns an object of type "Field_info", which contains the above mentioned fields. The values and the corresponding meanings of the "type of applicable noun", are listed below.

U: User defined noun
C: State-based noun defined by Container
F: State based noun defined by field (in this case the field is an object)
X: No nouns 1) The method begins by performing the following initialization.
   1.1) A new "Field_Info" object is created, and the navigation path, path to container, path to noun container, path to field, fixed noun, are set to null.
   1.2) The type of applicable noun is set to 'X'.
   1.3) The kb field specification is parsed, and the form of the field is identified. It maybe noted that the form can have values, 1, 2, or 3.
   1.4) The collaboration object id, and the KB field name, received as inputs, are stored in the "Field_Info" object.
2) The $kb-field-spec received as input is parsed, and the class-name, helper verb, field-name, verb, noun and kb-command are retrieved.
   2.1) If a user defined noun is specified, then it is saved in the fixed noun field of "Field_Info" object, type of applicable noun field in the "Field_Info" object, is set to 'U'.
3) The auxiliary verb table (FIG.03), of the collaboration object is searched for the class-name and auxiliary verb of the $kb-field-spec, and the navigation path to the field is retrieved. In case of a no find, the following step is performed.
   3.1) If the class name of the KB field matches the class name of the collaboration object, and the helper verb of the KB field matches the helper verb of the collaboration object, then, the top-level collaboration object will be chosen as a match. In this case, the navigation path would be null. However, this entry (collaboration object name), will be treated as if it was found in a KB object description. A special flag is set to indicate that the KB field matched a collaboration object.
4) If either of the above searches are successful, then the following steps are performed.
   4.1) If the form of the kb field specification is either 1 or 3, then the last object in the navigation path, physically contains the field represented by the class name specified in the $kb-field-spec. The class descriptions in the navigation path are traversed starting from the class name of the collaboration object, and the full class name of the "class name" specified in the KB field (KB class) is obtained. Similarly, the full class name of the field is also retrieved. It may be noted that the class name could be a conceptual class, and is translated to its oops equivalent by looking up the KB class description.

The "Field_info" object is updated as described below.
   navigation path field is set to navigation path obtained above.
   path to container is set to "navigation path+field name representing the KB class with verb".
   path to field is set to "path of container+field with verb".
   4.2) If the form of the kb field specification is 2, then the container resides in the navigation path. In this case, the full class name of the last object in the navigation path is retrieved, if the navigation path is not null. Similarly, the full class name of the "class name" specified in the KB field (KB class), is also retrieved. It may be noted that the class name could be a conceptual class, and is translated to its oops equivalent by looking up the KB class description.

The "Field_info" object is updated as described below.
   navigation path field is set to navigation path obtained above.
   path to container is set to navigation path.
   path to field is set to "path of container+field name representing the KB class with verb".
   If the special flag of step 3.1 is set, indicating that the KB field matched a collaboration object, then,
   the navigation path would be null.
   path to container is set to "clb_parm".
   path to field is set to "cobj_ref [cobj_id received as input parameter]".
   4.3) If type of applicable noun is 'U', and the if the path to the field has a fixed noun, in the KB class description, then the noun on the field in the class description must match the user defined noun in the KB field. If the nouns do not match, the navigation path, path to the container, and the path to the field are set to null.
   4.4) If the type of applicable noun is 'X', and if the path of the field in the KB class description, has a fixed noun, then the type of applicable noun is set to 'U'. The noun in the path of the field is saved in the "Field_Info" object.
5) If the path to field is null, then the method terminates and returns the "Field_Info" object to the caller.
6) The field may represent an object, and the object may support State-Noun mappings for itself. The following steps are performed to determine the State-Noun mappings.
   6.1) The State-Noun mapping table is searched for the object State-Noun mappings with the class-name of the field, and the class-name of the field (for the field-name).
   6.2) If State-Noun mappings are not found, then control is transferred to step 7.
   6.3) If State-Noun mappings are found, and if the reference of the working State-Noun mapping table received as an input parameter has a non-null value, then the State-Noun mappings of the field are copied to the working State-Noun mapping table.
   6.4) The "Field_info" object is updated as described below.
   path to noun container is set to path of field name.
   if type of applicable noun is 'X', then type of applicable noun is set to 'F'.
   The method terminates, and returns the "Field_info" object to the caller.
7) The field may not support state based nouns, for itself. In this step, we will search if the container (if it is not null), supports state based nouns for the field. It may be noted that in this case, the field could be a primitive field, or a full-fledged object.

7.1) The State-Noun mapping table is searched with the class-name of the container, and the field-name.
7.2) If State-Noun mappings are not found, then control is transferred to step 8.
7.3) If State-Noun mappings are found, and if the reference of the working State-Noun mapping table received as an input parameter has a non-null value, then these are copied to the working State-Noun mapping table.
7.4) The "Field_info" object is updated as described below.
path to noun container is set to path of container.
if type of applicable noun is 'X', then type of applicable noun is set to 'C'.
The method terminates, and returns the "Field_info" object to the caller.
8) The method terminates, and returns the "Field_info" object to the caller. It may be noted that in this case, the initial value (null), will be sent for path of noun container.

Appendix-7

Algorithm for Determining the Applicable Noun:
The algorithm for determining the applicable noun is described below.
The algorithm is implemented as a method, which receives a reference of the object, the class name of the object, and the field name, for which the applicable noun is sought. In addition, the reference of the working State-Noun table is also received as a parameter.
1) The oops interface for state information is obtained by typecasting the reference of the object with the oops interface name IState, as described below.
IState ist_ref=(IState) obj_ref;
2) The state and the sub-state of the object are obtained by invoking methods, "getState", and "getSubState", provided by the oops interface IState. The process is described below.
String state=ist_ref.getState( );
String sub_state=ist_ref.getSubState( );
3) The working State-Noun mapping table is searched with the class name, field name, and the state, sub-state strings obtained in Step 2.
3.1) If the search is successful, then the corresponding noun is retrieved, and is returned to the caller, as the applicable noun for the object and field, received as inputs. Typically, the absolute level number of the noun is also retrieved, and these are wrapped in a suitable wrapper, and returned to the caller as an object.
3.2) If the search fails, a null is returned to the caller.

Appendix-8

Algorithm for Creating the Temporary variable view vector:
The algorithm for creating the Temporary variable view vector is described below. It may be noted that this algorithm can handle both A-context and T-context Temporary variables.
The scope of a temporary variable is one or more A-contexts, and the T-context. All the A-contexts, and T-context are stored as vectors in a vector, and are identified by the index of the encapsulating vector. The default order of storage is T-context and A-contexts, and the default order of traversal is reverse of storage, and may be given as A-contexts, and finally T-context. The KB Translator creates and maintains the encapsulating vector, which is stored in the collaboration parameter (of translation time).
The algorithm is implemented as a method, which receives the field name, and the collaboration parameter. These are called the main parameters of the method. Besides the main parameters, the algorithm receives the index of A/T-context in its encapsulating vector, output View_vector, and "Gen_code" flag as secondary parameters.
The index of the A/T-context identifies the context, from which the Symbol_Table is retrieved. The view vector is the output vector, to which the temporary variable entry index values will be added. It may be noted that the KB Translator calls this method with the index number, of each of the A/T-contexts, and the outputs are collected in the View_vector.
The Gen_code, flag may be set as 'N', or 'Y'. If a 'N', is specified, the method returns after adding indices found, to the View_vector. If a 'Y' is specified, code is generated using the values in the View_Vector. Typically, the KB Translator, sets the value of this flag to 'Y', when the last context is being processed.
The algorithm utilizes an object called Temporary variable view Info, which contains the index of the A/T-context in its encapsulating context vector, and the index of the field entry with in the context (symbol/value table).
It may be noted that the context reorder color of the field ("% z-" prefix), may specify, how the T-context may be searched, as explained in the description subsection (2.10).
1) The following steps are performed as a part of the initialization.
1.1) An empty vector called KB field names vector is created. The KB field name received as input is added to the KB field names vector.
2) If the KB field name does not contain a conceptual class, then the control is transferred to Step 4.
3) If the KB field name contains a conceptual class, then the conceptual-class mapping table is searched, with the conceptual class. If the conceptual class is found in the conceptual-class mapping table (FIG.02), then all the associated conceptual classes are retrieved. The field name contained in the KB field is added to the conceptual classes found above, and the resulting KB fields are added to the KB field names vector created in step 1. It may be noted that the initial entry made in the KB field names vector in step 1.1 is removed.
4) For each KB field name in the KB field names vector, the following steps are performed. At end, the control is transferred to Step 5.
4.1) If A-context is being processed, then the field name (0401), and collaboration object id (0402), of the symbol table, are searched in reverse order, with the KB field name and the collaboration object id of the client (from where the context searching request has emanated). It may be noted that the client collaboration id is available in the collaboration parameter. At end, the control is transferred to Step 4.
4.2) If T-context is being processed, and if the context reorder color has "% z-X", sub string, then the field name (0401), of the symbol table, is searched from bottom to top, with just the KB field name. At end, the control is transferred to Step 4.
4.3) If T-context is being processed, then the collaboration sequence is traversed in reverse order, and for each collaboration object, the following steps are performed. At end, the control is transferred to Step 4.
4.3.1) If the context reorder color has "% z-U", sub string, then the field name (0401), and collaboration object id (0402), of the symbol table, are searched with the KB field name and the collaboration object id, of the current collaboration object. At end, the control is transferred to Step 4.3.
4.3.2) If the context reorder color has "% z-V", sub string, then the field name (0401), and collaboration object id (0403), of the symbol table, are searched with the KB field name and the collaboration object id, of the current collaboration object. At end, the control is transferred to Step 4.3.

If any entries are found during the above searching, then a new copy of the Temporary variable view info object is created, for each of the entries. The index of A/T-context in its encapsulating vector, and the index where the field is found, in the symbol table, are saved in the Temporary variable view info object.

The Temporary variable view info object is added to the top of the View_Vector.

It may be noted that if the field has a conceptual class, then during this search, each part of the conceptual class is compared with each part of the conceptual class in the Temporary variable array.

5) If the Gen_code parameter is received as 'N', then the method terminates normally.

6) If the Gen_code parameter is received as 'Y', then the method generates the following code in the users application.

Vector t_array_view={entries of Temporary variable view Info vector separated by commas};

It may be noted that each entry of the Temporary variable view Info vector, is in turn composed of two indexes, and these indexes are represented as if they are an array of two index values.

Appendix-9

Algorithm for Creating the Collaboration objects View:

The algorithm for creating the Collaboration objects view is described below.

The algorithm is implemented as a method, which receives the KB field name, collaboration parameter, and a Gen_code flag as parameters. In addition, this method receives a parameter called constant source, which identifies a collaboration object id.

1) The following steps are performed as a part of the initialization.

1.1) An empty vector called collaboration view info (CV_Info) vector is created. Each collaboration view info vector element, is in turn an object, called the "Field_Info" object, which will be created and returned by the method of appendix-6.

1.2) An empty vector called KB field names vector is created. The KB field name received as input is added to the KB field names vector.

2) If the KB field name does not contain a conceptual class, then the control is transferred to Step 4.

3) If the KB field name contains a conceptual class, then the conceptual-class mapping table is searched, with the conceptual class. If the conceptual class is found in the conceptual-class mapping table (FIG.02), then all the associated conceptual classes are retrieved. The field name contained in the KB field is added to the conceptual classes found above, and the resulting fields are added to the KB field names vector created in step 1. It may be noted that the initial entry made in the KB field names vector in step 1.2 is removed.

4) If the constant source parameter received as input has valid values (>=0), then the collaboration sequence is set as the constant source. This would limit the search to the constant source received as input.

5) For each KB field name in the KB field names vector, the following steps are performed. At end, the control is transferred to Step 6.

5.1) The collaboration sequence is traversed in reverse order, and for each collaboration object, the following steps are performed. At end the control is transferred to Step 5.

5.1.1) The KB field name, and the class name of the current collaboration object are passed as parameters to the method defined in appendix-6, as "The algorithm for determining the Field_Info". If Gen-code flag is 'N', the reference of the working state-noun table is sent as null, else the reference contained in collaboration parameter is sent to the method of appendix-6.

5.1.2) If a valid path to field is found in the Field_info object returned from the method call of Step 5.1.1, then the Field_Info object, is added to the top of the collaboration view info vector.

6) If the Gen_code flag received as a parameter is 'N', then the method returns the collaboration view info vector to the caller.

7) If the Gen_code flag received as a parameter is 'Y', then the method generates the collaboration view vector, and associated vectors, in the users application, as explained below.

7.1) The following strings are created, as a part of initialization.

"Vector cobj_view={";
"Vector noun_cntnr_ref={";
"Vector noun_cntnr_class_names={";
"Vector field_names={";
"Vector fixed_nouns={";

7.2) For each element of the collaboration view info vector created above, the following steps are performed. At end control is transferred to Step 7.3.

7.2.1) The Field_Info object, in the vector element is retrieved.

7.2.2) The collaboration view vector, and associated vectors, are created as explained below.

7.2.2.1) The path of the container in the Field_Info object, is appended to the "cobj_view", vector string.

7.2.2.2) The path to the noun container in the Field_Info object, is appended to the noun container ref vector string definition.

7.2.2.3) If the path to the noun container is not null, then, the class name of the noun container in the Field_Info object, is appended to the noun container class names vector string definition, else, the class name of the container in the Field_Info object, is appended to the noun container class names vector string definition If class name of noun container is "Clb_Parm", it is replaced with the collaboration descriptor name.

7.2.2.4) If path to container is equal to path to noun container, or, the path to noun container is null, then the field name (without path), is appended to the field names vector.

If path to noun container is not null, and, path to container is not equal to path to noun container, then, the class name of the field is appended to the field names vector.

7.2.2.5) If type of applicable noun is 'F', or 'C', or 'X', then a null is appended to fixed noun vector.

If type of applicable noun is 'U', then, the fixed noun in Field_Info object is appended to the fixed nouns vector.

7.2.2.6) The control is transferred to Step 7.2.

7.3) The collaboration view vector string, the noun container ref string, the noun container class vector string, and the field names vector string, are copied to the user application.

It may appear as if, we are storing a navigation path, which is a string, in a vector, which is referred to as the collaboration view vector. It may be noted that, since KB Translator is a code generator, it is just handing off an object reference, as a navigation path, to the host language compiler. The host language compiler will resolve the navigation path to an object reference.

If any of the above paths, have arrays or iterable structures, then they may be resolved, using the current index value, stored in the navigation vectors of the collaboration object.

7.4) The algorithm terminates and returns the collaboration view info vector, to the caller.

Appendix-10

Algorithm for Searching the Context when a field is specified without a Noun:

The algorithm for searching the context is described below.

The algorithm receives the collaboration parameter (which contains the reference of the A/T-context ensemble vector, the reference of the collaboration objects), and the kb field name. In addition, a parameter called constant source, which contains a collaboration object id, and the name of a field into which the field's value must be copied, are also received as input.

It may be noted that this algorithm generates code to access the field, and the value of the field is copied into a field name, which is received as an input parameter. Typically, algorithm-2 (equation evaluation), calls this method, with the skeleton field names, which can have values "parm_1" thru "parm_n". In this algorithm, it is assumed that the field name received as input is, "parm_x".

The algorithm described in appendix 8, for "creating the temporary variable view", is executed, prior to the execution of this algorithm, and the temporary variable view, is obtained. Specifically, the A/T-contexts in the ensemble of contexts, located in the collaboration parameter as a vector, are traversed in reverse order, and for each context the algorithm in appendix-8 is invoked, using the specifications of the algorithm. Incidentally, if context is reordering of A/T-contexts is sought, it may be implemented here.

The algorithm described in appendix 9, for "creating the collaboration object view", is executed, prior to the execution of this algorithm, and the collaboration object view, is obtained. The constant source parameter received as input, is passed to the method of algorithm-9.

The constant source parameter received as input can have the following values, and meanings.

-1: Ignore constant source parameter
-100: Determine constant source
>=0: Use the constant source received as input.

If the constant source parameter received as input has a value of -100, then the collaboration object id, where the field would be found, if the Temporary variables context (A/T-context) is empty, is determined. The new value is copied into the constant source parameter, and passed back to the caller (typically the equation evaluator of appendix-2).

The conditions encountered in the algorithm are summarized below for simplifying the understanding of the process.

| Case No. | Temporary variables view Vector | Collaboration objects view vector | Collaboration Sequence | Context |
|---|---|---|---|---|
| 1 | Empty | Empty | Non-Empty | No applicable context. |
| 2 | Empty | Non-Empty | Non-Empty | Last object of collaboration view will be used. |
| 3 | Non-Empty | Empty | N/A | Last Temporary variable in view vector, will be used. |
| 4 | Non-Empty | Non-Empty | Non-Empty | Search Temporary variables view with nouns, determined by collaboration view objects. If none are found, this case is same as case-2. |

1) If case number is equal to 1, then the KB Translator raises an exception.

2) If case number is equal to 2, then the last object in the collaboration objects view vector will be used, to access the field. It may be noted that Cobj_view created by algorithm-9 contains the container reference. Hence, code is generated to access the field as— cobj_view [cobj_view.size( )].field-name;

The collaboration object id, is copied to the constant source parameter received as input, if constant source parameter has a value of -1 00.

3) If case number is equal to 3, then the last temporary variable in the Temporary variable view vector, is selected.

4) If case number is equal to 4, then the following code is generated by the KB Translator—

T_View_Info t_idx = kb.rt.txs.srhContext( clb_parm, t_array_view,
 noun_cntnr_ref,
 noun_cntnr_class_names,
 field_names,
 fixed_nouns);

The code for accessing the field, may be generated as—

Vector context = clb_parm.contexts.get ( t_idx.ctx_idx );
ValTable_Entry val_entry =
 (ValTable_entry) context.get ( t_idx.entry_idx );
parm_x = val_entry.value;

The operation performed by the above code may be described as given below.

4.1) The collaboration objects view vector created by the translator in algorithm-9, is traversed, in reverse order, starting from the last object, and the next collaboration object reference is retrieved. The reference of the next applicable collaboration object is referred to as the current object. At end, the control is transferred to Step 4.4.

4.2) If the fixed noun is null, then the noun is determined for the current collaboration object, using the noun container reference, the oops class name of the noun container, and the field name, located in the associated vectors, which are pre-generated by algorithm-9.

4.3) The Temporary variable view vector, is searched for the field name and the noun identified in the above step. If the field is an object, the noun portion would be null, and has to determined, based on the state of the object or its container. It may be noted that the Temporary variable array stores the value of the field as well as the reference of its container, for this purpose.

4.3.1) If an entry is found, then the field is chosen as the applicable field. Since, this processing is in a loop, the control breaks out of the loop. The control is transferred to Step 5.

4.3.2) If an entry is not found, then the control is transferred to Step 4.1, and the next collaboration object, in the collaboration objects vector view, is selected.

4.4) If no entries are found during the above search, then the processing is same as case-2, and the last object in the collaboration objects view vector will be used, to access the field. It may be noted that Cobj_view created by algorithm-9 contains the container reference. Hence, code is generated to access the field as cobj_view [cobj_view.size( )].field-name;

5) The procedure is terminated.

Appendix-11

Algorithm for Searching the Context, when a field is specified with a Noun:

The algorithm for searching the context is described below.

The algorithm receives the collaboration parameter (which contains the reference of the A/T-context ensemble vector, the reference of the collaboration objects), and the KB field name. In addition, a parameter called constant source, which contains a collaboration object id, and the name of a field into which the field's value must be copied, are also received as input.

It may be noted that this algorithm generates code to access the field, such that the value of the field is copied into a field name, which is received as an input parameter. Typically, algorithm-2 (equation evaluation), calls this method, with the skeleton field names, which can have values "parm_1" thru "parm_n". In this algorithm, it is assumed that the field name received as input is, "parm_x".

The algorithm described in appendix 8, for "creating the temporary variable view", is executed, prior to the execution of this algorithm, and the temporary variable view, is obtained. Specifically, the A/T-contexts in the ensemble of contexts, located in the collaboration parameter as a vector, are traversed in reverse order, and for each context the algorithm in appendix-8 is invoked, using the specifications of the algorithm. Incidentally, if context is reordering of A/T-contexts is sought, it may be implemented here.

The algorithm described in appendix 9, for "creating the collaboration object view", is executed, prior to the execution of this algorithm (without the noun in the KB field), and the collaboration object view, is obtained. The constant source parameter received as input, is passed to the method of algorithm-9.

The constant source parameter received as input can have the following values, and meanings.
 −1: Ignore constant source parameter
 −100: Determine constant source
 >=0: Use the constant source received as input.

If the constant source parameter received as input has a value of −100, then the collaboration object id, where the field would be found, if the Temporary variables context (A/T-context) is empty, is determined. The new value is copied into the constant source parameter, and passed back to the caller (typically equation evaluator of appendix-2).

1) The processing for searching the context, is dependent upon the type of the noun.
  1.1) If the type of noun is non parametric, Step 2, is performed.
  1.2) If the type of noun is parametric, then Step 3 is performed.

2) The Temporary variable arrays, and the collaboration objects are searched in order, as described below.
  2.1) The Temporary variable view vector created by algorithm-8, is searched for the noun. In this case, the following code is generated by the KB Translator—

T_view_Info t_idx = kb.rt.txs.srhTArray1 ( clb_parm, t_array_view, noun );

The code for accessing the field, may be generated as

Vector context = clb.parm.contexts.get ( t_idx.ctx_idx );
ValTable_Entry val_entry =
    (ValTable_Entry) context.get ( t_idx.entry_idx );
oops-dt parm_x = val_entry.value;

The operation performed by the above code may be described as given below.
  2.1.1) The Temporary variable view vector is searched for the field name & noun. At end, control is transferred to step 2.2.
    If the field is an object, the noun portion would be null, and has to determined, based on the state of the object or its container. It may be noted that the Temporary variable view vector stores the value of the field as well as the reference of its container, and the type of noun for this purpose.
  2.1.2) If the noun is found, then the corresponding temporary variable is chosen as the applicable field. The method terminates and returns to the caller.
  2.2) The Cobj_view, created by the algorithm-9, is searched for the noun. In this case, the following code is generated by the KB Translator— int cv_idx = kb.rt.txs.srhCobj1 (    clb_parm, noun_cntnr_ref,
                                     noun_cntnr_class_names,
                                     field_names,
                                     fixed_nouns, noun );

The code for accessing the field, may be generated as—
oops-dt parm_x=cobj_view [cv_idx].field-name;
The operation performed by the above code may be described as given below.
  2.2.1) For each entry of the collaboration view vector, the following steps are performed. At end, an exception or a run-time error is generated, if the field could not be located.
    2.2.1.1) The fixed noun, the reference of the noun container, the corresponding noun container class name, and the field name are retrieved from the respective vectors generated by the method of algorithm-9.

2.2.1.2) If the fixed noun is null, then the applicable noun is determined by calling the method described in appendix-7 as the "Algorithm to determine the applicable noun". If fixed noun is non null, then it is the applicable noun.

2.2.1.3) The applicable noun is compared with the noun received as the input.

2.2.1.4) If the applicable noun matches the input noun, then the index is used to access the container ref of the field in the "Cobj_view" vector. Hence, code is generated to access the applicable field as— cobj_view [cv-idx].field-name;

The collaboration object id, is copied to the constant source parameter, if the constant source parameter received is −100. The method terminates and returns to the caller.

3) The Temporary variable arrays, and the collaboration objects are searched in order, as described below. It may be noted that code is generated to search both Temporary variable arrays, as well as collaboration objects, before determining the index.

3.1) The Temporary variable view vector created by algorithm-8, is traversed and the absolute level numbers of all the nouns are retrieved, and stored in a vector. The following code is generated by the KB Translator—

```
Vector noun_levels = new Vector( );
int status = kb.rt.txs.srhTArray2 ( clb_parm,  t_array_view,
                                    pnoun, noun_levels );
```

The operation performed by the above code may be described as given below.

All the temporary variable entries of the field are traversed and the absolute level number of the noun, and the index of the context, along with the index of the entry, are stored in the noun levels vector.

3.2) The object context in the cobj_view, is traversed, and the absolute level numbers of the nouns are obtained. The following code is generated by the KB Translator—

```
T_view_Info idx = kb.rt.txs.srhCobj2 (  clb_parm, noun_cntnr_ref,
                                        noun_cntnr_class_names,
                                        field_names,
                                        fixed_nouns, pnoun,
                                        noun_levels );
```

The operation performed by the above code may be described as given below.

All the collaboration objects in the cobj_view, are traversed, and the absolute level numbers of the nouns, and cobj_view indexes are determined and stored in the noun levels vector, created in step 3.1.

It may be noted that the noun_levels vector is storing the absolute level number of the noun, and the T_View_info object in case of temporary variables, or the Cobj_View index in case of collaboration objects. Since, T_View_Info object contains two indexes, the Cobj_view index may be stored in it twice, but as negative numbers to distinguish from temporary variable array indexes.

The vector is then sorted on the absolute level numbers. The parametric noun is used as an index, to select an entry of the sorted vector. If the parametric index is greater than the number of entries, then the last entry is chosen.

The code for accessing the field, is as given in Steps 2.1, or 2.2, depending on whether the entry is found in Temporary variable view vector, or collaboration object view vector.

Appendix-12

Algorithm for Temporary Variable Creation:

The algorithm for creating a Temporary variable is described below. The algorithm is implemented as a method, which receives the collaboration parameter (which contains the collaboration sequence, and a reference of the working State-Noun mapping table), the $kb-field-spec, and the value of the temporary field.

1) The $kb-field-spec received as input is parsed, and the class-name, helper verb, field-name, verb, noun and kb-command are retrieved.

1.1) A temporary variable called symtable_index, is created and is set to −1.

2) The $kb-field-spec without the kb-command is searched in the Temporary variable array, using the algorithm specified in Appendix-8.

2.1) If no entries are found for the $kb-field-spec in the Temporary variable array, and if the KB command is specified as @reval_xxxx, then the KB command is set to @eval_xxxx.

2.2) The index of the last entry, where the field is found in Temporary variable array, is stored in the temporary variable symtable_index. It may be noted that the algorithm described in Appendix-8, will return all entries of the field in the Temporary Variable array, we need only the last entry (most recent entry) of the vector.

3) The KB Translator holds the following info, in its temporary store. The noun-container-ref, field-name, class-name-of-noun-container, and noun-value are set to null. The absolute-level-number-of-noun is set to −1. The type-of-applicable-noun is set to 'X'.

4) Each object of the collaboration sequence is traversed in reverse order, and the following steps are performed. At end, the collaboration object id in Field_Info object (returned by algorithm-6), is set to −1, and the control is transferred to Step 7.

4.1) The algorithm for determining the "Field_Info", is invoked by calling the method described in appendix-6.

4.2) If a valid path to field is found, then control is transferred to Step 5, else control is transferred to Step 4.

5) The following steps are performed.

5.1) noun-container-ref, of Step-3, is set as "path to noun container ref" of Field_info.

5.2) If path to noun container of Field_Info is not null, then, the class name of noun container is stored in temporary store of Step 3, else, the class name of container is stored as class name of noun container.

5.2.1) If the class name of the noun container is "Clb_Parm", then it is replaced with the collaboration descriptor id, contained in collaboration parameter received as input.

5.3) If path to container is equal to path to noun container, or path to noun container is null, then, the field name contained in the path to field is stored in the temporary store of Step 3.

If path to container is not equal to path to noun container, and, path to noun container is not equal to null, then, the class name of the field is saved as field name, in the temporary store of Step 3.

5.4) The type of applicable noun in temporary store of Step3, is updated with the type of applicable noun in Field_Info.

5.5) If type of applicable noun in Field_Info is 'U", then the noun value in temporary store of Step 3, is updated with the fixed noun value contained in Field_Info object.

6) If the type-of-applicable-noun is 'U', then the absolute-level-number-of-noun is obtained by searching the State_Noun mapping table, with the class-name-of-noun-container, field-name, and fixed noun. The state and sub-state fields are set to null during this search.

7) If the kb-command string is @eval_xxxx, then the $kb-field-spec, is stored as a new entry, in the Symbol Table of the Context, else control is transferred to Step 8. The index of the entry, is saved in symtable_index. It may be noted that the collaboration object id of the clb_parm is stored in field 0402 of the symbol table, and the collaboration object id of the Field_Info of Step 4, is stored in 0403, of the symbol table.

8) The noun and the value of the Temporary variable represented by $kb_field-spec are saved in the ValTable of the Context, at the index location identified by symtable_index. The code generated is as given below.

---

Object value = kb.rt.converttoObj ( var-name );
Noun_Info noun_info = kb.rt.rts.setContext ( clb_parm, ctx_index,
            symtable_index,
            value,
            noun_value,
            absolute_level_
            number_of_noun,
            type-of-applicable-noun,
            noun-container-ref,
            field-name,
            class-name-of-
            noun-container );

---

The return type Noun_Info, of the method call, contains the noun value, and the absolute level number of the noun.

If the type of applicable noun is "C", then the setContext method, will determine the noun, and absolute level number of noun, based on the state of the object, and will store it in the ValTable of the Context.

If the type of applicable noun is "F" (the oops class name of the field represents an object), then, the noun value is set as null. In this case, the noun and absolute level number of noun will be determined at usage time. It is important to note, that at usage time, the field value (0501), will be used for determining the noun, and not the noun container (0502).

9) If the type of applicable noun is 'C', then the following steps are performed.

9.1) The A-contexts in contexts vector of collaboration parameter, and T-context, are searched with the KB field name and the collaboration object id of Field_Info (obtained in Step 4), and the indexes of all entries, where the field name (0401) matches the KB field name, and the collaboration object id (0403), matches the collaboration object id, are retrieved.

If the collaboration object id, obtained from Step 4, has a negative value (−1), then. the control is transferred to Step 10.

9.2) Code is generated to store the indexes of the above entries in a vector, as described in Algorithm-8 (last step).

---

Vector t_array_view = { entries of Temporary variable view Info vector separated by commas };

---

9.3) The KB Translator then generates code to update the old values in A/T-contexts for the field, with the new value, via the method call shown below.

--- kb.rt.rts.updContext ( clb_parm, t_array_view,
            new_value, noun_info.noun );

---

The operation of the code may be described as given below.

Each entry of the t_array_view is traversed, and the noun value is compared with the input noun (determined in Step 8). If the noun values match, the old value in Value Table entry, is updated with the new value.

10) The method terminates, and returns to caller.

Appendix-13

Parsing of Collaboration descriptor: The collaboration descriptor document written in XML is parsed by a commercially available XML parser, and a collaboration descriptor object is created. The Collaboration descriptor object and the CycleEntry objects, which are obtained by parsing the collaboration descriptor XML document may be given as shown below.

---

```
class CDesc
{
    string cdesc_id;
    string appl_name;
    string pkg_name;
    Vector cobj_class_names;
    Vector cycles;
    Vector structural_rules;
}
```

---

It may be noted that the vector cycles, described above, contains cycle objects. Each cycle object is in turn a vector, and contains "CycleEntry" objects.

---

```
class CycleEntry
{
    int    cobj_id;
    int    cobj_order;
    string cobj_name;
    string cobj_method;
    int [ ] cseq;
    int [ ] icseq;
}
```

The code utilized for parsing the collaboration descriptor document may be given as // parse and create collaboration descriptor object CDesc
cdesc=kb.rt.txs.parse ("collaboration descriptor.xml");

Appendix-14

Code Generated for Client: The code generated for client is described as a template, in ASCII format, in the accompanying CD-Rom disc.

Appendix-15

The KB Runtime: A few methods of the KB runtime, related to context searching, are provided in ASCII format, in the accompanying CD-Rom disc.

Appendix-16

The Code Listings on CD-Rom The details of the code listings, in the accompanying CD-Rom discs are provided below. The files are in IBM/PC ASCII format, and are readable in MS-DOS, Windows 98 operating systems, and may be readable in Windows-NT/2000 operating systems.

| File name | Size | Modification Date/Time | Creation Date/Time |
|---|---|---|---|
| Patent_Code\Client Template (Appendix - 14).txt | 3,659 | Jul. 11, 2004 7:51p | Jul. 12, 2004 9:45:51 AM |
| Patent_Code\kb\rt\txs.java | 12,721 | Jul. 11, 2004 7:26p | Jul. 12, 2004 9:45:53 AM |
| Patent_Code\kb\rt\Noun_Info.java | 382 | Jul. 09, 2004 11:22a | Jul. 12, 2004 9:45:53 AM |
| Patent_Code\kb\rt\SrhCtx_retval.java | 368 | Jul. 09, 2004 10:31a | Jul. 12, 2004 9:45:53 AM |
| Patent_Code\kb\rt\Clb_Parm.java | 1,859 | Jul. 11, 2004 7:18p | Jul. 12, 2004 9:45:54 AM |
| Patent_Code\kb\rt\ValTable_Entry.java | 793 | Jul. 09, 2004 12:42p | Jul. 12, 2004 9:45:54 AM |
| Patent_Code\kb\rt\T_View_Info.java | 249 | Jul. 09, 2004 10:29a | Jul. 12, 2004 9:45:54 AM |
| Patent_Code\kb\rt\rts.java | 2,142 | Jul. 11, 2004 7:00p | Jul. 12, 2004 9:45:54 AM |
| Patent_Code\kb\rt\IState.java | 116 | Jul. 09, 2004 12:16p | Jul. 12, 2004 9:45:54 AM |
| Patent_Code\kb\rt\patent info.txt | 188 | Jul. 11, 2004 2:55p | Jul. 12, 2004 9:45:54 AM |

What is claimed is:

1. A method executed by one or more processors, for processing static or dynamic information, contained locally or remotely on one or more processor readable storage devices, wherein, fields which represent an atomic entity, or an object or a structure, are adorned with special attributes called colors, which imply variations, and a special type of entity called conceptual class, which is a sequence of tags separated by dot characters, and implies, a logical grouping of fields, and wherein, rules or equations, are represented using special field names called Knowledge Base System (KB) fields, which are a sequence of class names and field names, and are adorned with said colors, and wherein, said class names of said KB fields may be represented by said conceptual classes, such that, said KB fields in said rules are parametric with respect to said colors and said conceptual classes, and may be specialized based on application requirement, and wherein, preparation of said static or dynamic information comprises:

a) assigning a type of color called verb color, to fields in object descriptions, which implies a role or operation, in which the fields are participating;

b) assigning a type of color called noun color, to fields in object descriptions which implies a form or representation or value;

c) assigning verb color, to KB fields in said rules, which implies said KB field participating in role or operation, represented by said verb is sought in the equation or rule;

d) assigning noun color, to KB fields in said rules, which implies said KB field having form or representation or value, represented by said noun is sought, in the equation or role;

e) assigning a type of color called operational color to said KB fields, which identifies a form of the equation represented by said KB fields;

f) associating temporary variables created during processing, with said KB fields, and assigning noun color to said temporary variables based on state of the object, or on the event or situation, which caused the creation of the said temporary variables;

g) representing arithmetic, relational and logical equations, as KB rules, such that fields of said equations are parametric to said verb/noun/operational colors;

h) assigning a type called Type-1, to KB rules, whenever the verb colors and operational colors of a field, are transformed into a verb color and/or operational color of the same field;

i) assigning a type called Type-2, to KB rules, whenever several fields with operational colors and optional verb colors are transformed into a new field, with an optional operational color and verb color;

j) assigning a type called Type-3, to KB rules, whenever several fields with operational colors and optional verb colors are transformed into a new field, with an optional operational color and verb color, wherein the operators of the rule are limited to division;

k) assigning a type called Type-4, to KB rules, whenever the verb colors and operational colors of a field, are transformed into a verb color and/or operational color of the same field, wherein the operators of the rule are limited to a class of operators called relational or logical operators;

l) assigning a type called Type-5, to KB rules, whenever several fields with operational colors and optional verb colors are transformed into a new field, with an optional operational color and verb color, wherein the operators of the rule are limited to a class of operators called logical operators;

m) representing a sequence of rules, which may be equations or methods, as a process;

n) imposing a structural rule upon equations and methods of said process, such that subsets of said equations and methods are enclosed in loop or decision control structures;

o) assigning a type called Type-6 to KB rules, whenever KB rules of Type-1 thru Type-6, or methods are composed under a generalized composition, and are optionally structured by an instance of said structural rule;

p) representing method signatures of method descriptions contained in said static and dynamic information, as rules, wherein formal parameters of methods are represented using said KB fields, and are parametric with respect to said colors;

q) assigning a sequence number to every iteratable structure within an object, wherein said sequence number matches a depth-first-traversal sequence number of the iteratable structure within the object, when only the iteratable structures are traversed;

r) associating a navigation path of an object, selected from a plurality of navigation paths, and the depth-first-traversal sequence number of the iteratable structures, within the navigation path, with one type of color, called auxiliary verb color, such that said KB fields may be accessed using the navigation path associated with said auxiliary verb color;

s) assigning a type of color to said KB fields of rules called constant source color, which implies that the current field, is located in the same object instance as that of a previous field; and t) assigning a type of color to said KB fields of rules called special color, which implies that the color may be mapped to a static or non-static method of an object, which accepts the field as input and produces a predefined type of output.

2. The method of claim 1, further comprises:

a) Creating an application context, based upon a set of objects called collaboration objects or O-context, and the temporary variables created during processing, wherein, the temporary variables may be called A-context, and limited to the life time of the method or process which created them, or may be called T-context; and may exist throughout the life time of the application, and wherein, the application context may be formed by selecting any of A-context, T-context, and O-context, and permuting the selecting in any order, as specified by a type of color called context-reorder, of the said KB field, or by selecting the A-context, T-context, and O-context, as default context order, when the said context-reorder color is omitted;

b) Saving temporary variables created during processing, in said A-context or said T-context, along with said noun of said KB field with which the temporary variable is associated;

c) Selecting any proper subset of objects of the said collaboration objects, and permuting the selected objects to form an order called collaboration sequence, such that said O-context is ordered according to said collaboration sequence, and entries of A-context and T-context are also ordered according to said collaboration sequence;

d) Searching the said application context, for the said KB field, as determined by the said context reorder color of the said KB field, whenever said type of color called noun color is specified for the said KB field, or said O-context has higher precedence than said A-context and T-context;

e) Searching the said application context, for the said KB field, by determining the noun color of the said KB field, based on the state of the object where the said KB field is located, and then searching the A-context and T-context, for the said KB field, and the noun color, whenever a noun color is omitted for the said KB field, and the said context re-order specification is also omitted or has either A-context or T-context ahead of O-context;

f) Searching the application context for all noun forms of the said KB field and sorting the resulting list and selecting the applicable noun form by an index called the parametric noun of the said KB field;

g) Evaluating said rules or equations, specified in said method descriptions, which may optionally include method or process invocations, by assigning or distributing applicable verb colors to said KB fields in said rules or equations, whenever said KB fields are parametric with respect to said verb colors, wherein said distribution of verbs is a recursive process with respect to sub-expressions contained in the main equation, and wherein said applicable verb colors may be specified as concatenations, with , the dft-sequence number of the said sub-expression as a prefix, or may be read off from a predefined table;

h) Evaluating method invocations specified explicitly, in method descriptions, by distributing applicable verb colors to the parameters of the method, wherein said distribution of verbs is a recursive process with respect to sub-expressions contained in the expression formed from the parameters of the method, and wherein said applicable verb colors may be specified as concatenations, with the dft-sequence number of the said sub-expression as a prefix, or may be read off from a predefined table;

i) Evaluating process invocations specified explicitly, in method descriptions, by distributing applicable verb colors to said KB fields of the process, wherein said distribution of verbs is a recursive process with respect to sub-expressions contained in the equation, and wherein said applicable verb colors may be specified as concatenations, with the dft-sequence number of the said sub-expression as a prefix, or may be read off from a predefined table;

j) Parsing an input specification called collaboration descriptor, which comprises of a plurality of objects called collaboration objects, and a plurality of methods of said collaboration objects, called collaboration methods, which are organized as cycles, wherein,
said KB rules and statements contained in said collaboration methods, are translated to equivalent target host language statements, and are packaged as helper classes and methods, and code is generated within the said collaboration methods to invoke the said helper methods;

k) Parsing the said collaboration descriptor, for generating an application program called client program, which acts as a driver for invoking the collaboration methods specified in the collaboration descriptor, wherein,
the execution of the said generated code as said client program and said helper classes is supported by KB run-time modules, which are derived from the operational procedures of the specification.

3. A system, stored in a non-transitory computer readable medium, called Knowledge Base System (KB), including computer usable program code for processing static or dynamic information, wherein, fields which represent an atomic entity, or an object or a structure, are adorned with special attributes called colors, which imply variations, and a special type of entity called conceptual class, which is a sequence of tags separated by dot characters, and implies, a logical grouping of fields, and wherein,
fields of rules or equations are represented using special field names called KB fields, which are a sequence of class names and field names, and are adorned with said colors, and wherein, said class names of said KB fields may be represented by said conceptual classes, such that said KB fields in said rules are parametric with respect to said colors and said conceptual classes, and may be specialized based on application requirement, comprises:
- a) A tool called KB translator, Means for translating—said field descriptions, utilizing said colors and said conceptual classes, which are contained in said collaboration object descriptions, and, said rules in method descriptions, wherein said rules contain uniquely identifiable tags called KB prefixes and commands, to equivalent statements of a predetermined host language;
- b) A plurality of tables called KB tables, Means for storing—predefined configurations and associations, of said colors and said conceptual classes;
- c) A plurality of modules called KB Runtime, Means for supporting code generated by said KB Translator, for said rules, for a predefined host language;
- d) Means for storing State-Noun mappings of said fields of said objects in a predefined table called State-Noun mapping table;
- e) Means for storing State-Noun mappings of said fields specified in said rules, in a predefined table called working State-Noun mapping table;
- f) Means for storing conceptual class mappings in a table called Indirect Conceptual class table;
- g) Means for storing navigation paths of an object, and an array of sequence numbers, made up of depth first traversal sequence numbers of iteratable structures within the object, and the associated auxiliary verb colors;
- h) Means for storing the KB field names associated with temporary variables, and the collaboration object id, in whose method the temporary variable is created, in a table called the Symbol table;
- i) Means for storing the value of the temporary variable, the noun value, the reference of the object, which can determine the noun, called noun container, the class name of the said noun container, the field name, in a table called the value table;
- j) Means for storing the associations between the verb on the left hand side of the equation, with the verbs on the right hand side of the equation, in a table called the verb distribution table;
- k) Means for storing the association between said special color and an object and method, along with its return type, in a table called the special color table;
- l) Means for storing the association between said constant color function and the value of the verb, from which the said constant color function maps, and the value of the verb, to which the said constant color function maps, as a table called the constant color table;
- m) Means for storing the association between said constant source function and the value of the source, from which the said constant source function maps, and the value of the source, to which the said constant source function maps, as a table called the constant source table;
- n) Means for storing the association between the field specified on the left hand side of the equation and the expression specified on the right hand side of the equation, along with an identifier called the type of the equation, an optional conditional equation, called the guard, and an optional structural rule, in a table called the rules table.

4. The system of claim 3, further comprises:
- a) means for assigning a type of color called verb color, to said fields in object descriptions, which implies a role or operation, in which the field is participating;
- b) means for assigning a type of color called noun color, to said fields in object descriptions, which implies a form or representation or value;
- c) means for assigning a type of color called verb color, to said KB fields in said rules, which implies said KB field participating in role or operation, represented by said verb is sought in the equation or rule;
- d) means for assigning a type of color called noun color, to said KB fields in said rules, which implies said KB field having form or representation or value, represented by said noun is sought, in the equation or role;
- e) means for assigning a type of color called operational color to said KB fields, which identifies a form of the equation represented by said KB field;
- f) means for assigning a type of color to said KB fields of rules called auxiliary verb color, which implies a usage of the field, wherein, said auxiliary verb color, is associated with a navigation path, of a known object reference, and an array of sequence numbers, made up of Depth First Traversal sequence numbers of iteratable structures within the object;
- g) means for assigning a type of color to said KB fields of rules called constant color, which implies that the verb color of another field or another instance of the same field, has to be copied to the current field;
- h) means for assigning a type of color to said KB fields of rules called constant source color, which implies that the current field, is to be located in the same object instance as that of a previous field;
- i) means for assigning a type of color to said KB fields of rules called special color, which implies that the color may be mapped to a static or non-static method of an object, which accepts the field as input and produces a predefined type of output;
- j) means for assigning a type of color to said KB fields of rules called context reorder color, which defines an ordering over the application context.

5. The system of claim 3, further comprises:
- a) means for creating and storing a type of rule or equation, called Type-1 equation, wherein, the verb colors and operational colors of a field, are transformed into a verb color and/or operational color of the same field;
- b) means for creating and storing a type of rule or equation, called Type-2 equation, wherein, several fields with operational colors and optional verb colors are transformed into a new field, with an optional operational color and verb color;
- c) means for creating and storing a type of rule or equation, called Type-3 equation, wherein, several fields with operational colors and optional verb colors are transformed into a new field, with an optional operational color and verb color, wherein the operators of the equation are limited to division;
- d) means for creating and storing a type of rule or equation, called Type-4 equation, wherein, the verb colors and operational colors of a field, are transformed into a verb color and/or operational color of the same field, wherein the operators of the equation are limited to a class of operators called relational or logical operators;

e) means for creating and storing a type of rule or equation, called Type-5 equation, wherein, several fields with operational colors and optional verb colors are transformed into a new field, with an optional operational color and verb color, wherein the operators of the equation are limited to a class of operators called logical operators;

f) means for creating an equivalence between methods and rules, by assigning a unique identifier called method identifier to said methods, such that the parameters of the methods are composed under a general composition, and result in a new field due to the composition, as in a Type-2 rule or equation;

g) means for creating and storing a type of rule, called structural rule, whereby a sub set of methods or KB rules, which are specified within a set of parenthesis are enclosed in loops structures, such that the first method enclosed in parenthesis, is programmed to process multiple rows or records or entities, and the methods and/or equations following it till the ending parenthesis are considered to be included in the said loop control structure;

h) means for creating and storing a type of rule or equation, called Type-6 equation, wherein, rules of type-1 thru Type-6, or methods, are composed under a generalized composition, and are optionally structured by an instance of said structural rule;

i) means for creating and storing a type of rule called K-index rule, whereby a collection of elements are searched by invoking a predefined method of the element, and the index where the element is found is saved in a vector called the navigation index vector;

j) means for creating and storing a type of rule called S-index rule, whereby a collection of elements are searched by invoking a predefined method of the element, and the index where the element is found is saved in a vector called the navigation index vector.

6. The system of claim 3, further comprises:
a) means for receiving as input, an XML document called collaboration descriptor, wherein—
a set of objects called collaboration objects, are described, such that the chronological sequence number of the collaboration objects called collaboration object id, may be used for uniquely identifying the objects, and wherein,
each collaboration object provides a table called the auxiliary verb table, which contains the associations of the auxiliary verbs and navigation paths, and wherein,
each collaboration object creates and provides access to a set of vectors for navigation node and navigation index vectors, and wherein,
a set of methods on said collaboration objects, are organized as groups, called collaboration cycles, such that each collaboration method is uniquely identifiable with a pair of numbers called cycle number and cycle order number, and wherein,
each said collaboration cycle may be structured by said structural rule, and wherein,
each collaboration method may specify, any valid permutation of a subset of said collaboration objects, as its view of said application context, called collaboration sequence, such that, said KB fields contained in said rules invoked from said collaboration methods, may be searched in the said collaboration sequence;

b) means for analyzing said rules embedded in said collaboration methods, and identifying said KB commands;

c) means for translating said KB commands, wherein said KB commands in said collaboration method, are commented out after translation, and are replaced by method calls to helper methods in a helper class, and wherein, said helper method in said helper class is invoked via an interface, which is a collection of method signatures, such that the generated method invocation is generic over a set of helper methods, which may exist in plurality for any of said KB commands, whenever, the said collaboration method being translated exists in different collaboration descriptors, or cycles or cycle orders.

7. The system of claim 3, further comprises:
a) means for storing instances of temporary variables, as said application context, wherein said temporary variable instance may be stored in a type of application context called A-context, or T-context or both, whereby the lifetime of the temporary variable instance is limited to the lifetime of the method, when it is stored in the said A-context, and exists throughout the lifetime of the application, when it is stored in said T-context;

b) means for invoking equations, methods, and processes;

c) means for storing current index values and the dft-sequence number of iteratable structures contained in objects, in a vector called navigation vector, created by said object, during its construction, such that whenever said iteratable structures are found in said navigation paths of the object, they may be resolved by accessing said navigation vector using said dft-sequence number, said current index value of said iteratable structures, stored in said navigation vector;

d) means for storing the collaboration descriptor id, the collaboration cycle number, the collaboration cycle order number, the collaboration object name, the method name, the reference of the vector containing the A-context/T-context vectors, the reference of the working State-Noun table, and the reference of the collaboration objects vector (in default collaboration sequence), the collaboration sequence and the invisible collaboration sequence, and the collaboration object id, of the client, as a special structure called the collaboration parm, which is passed as a formal parameter to collaboration methods.

8. The system of claim 3, further comprises:
a) means for analyzing said KB command, for storing temporary variables, and determining if the said temporary variable is to be stored in said A-context or said T-context as fresh copy or replace an entry previously stored in either said A-context or said T-context;

b) means for analyzing the said KB field associated with said temporary variable, and determining, if said KB field is specified with said user defined type of noun;

c) means for storing said user noun and setting, said container reference, said class name of container, said field name, as null, and said type of applicable noun as user defined noun, in said value table, of either said A-context or T-context, depending on said KB command, when said user defined noun is specified in said KB field associated with said temporary variable definition;

d) means for searching for the said KB field with which the said temporary variable is associated in said T-context, or A-context(s) and identifying the said collaboration object, which contains the said KB field;

e) means for determining if the said field component of the said KB field supports said state based nouns, by searching the said State-Noun mapping table, with the class name of said field component of said KB field;

f) means for determining if the said container component of the said KB field supports said state based nouns, by searching the said State-Noun mapping table, with the class name of said container and said field name;

g) means for copying the State-Noun mappings of said KB field to said working State-Noun table, for easier retrieval, when either the said field component of said Kb field or said container of said KB field support state based nouns;

h) means for storing said field reference, as noun container, and said class name of field, as both class name of noun container and field name, and said noun value as null, and said type of noun as field determined, in said value table, of either said A-context or said T-context, depending upon said KB command, when said field supports state based nouns;

i) means for storing said container reference, as noun container, and said class name of container, as class name of noun container, and field name as field name, and said noun value as null, and said type of noun as container determined, in said value table of said A-context or said T-context, depending upon said KB command, when said container of field supports state based nouns;

j) means for generating code, which when executed at run-time, determines the applicable noun, based on container reference, said container class name, and said field name, and State-Noun mappings of said working State-Noun table, and the current state and sub-state of said container reference;

k) means for updating other instances of said KB field having identical noun color, as that of said KB field, with the said temporary value, such that all instances of said KB field having similar noun color across all the A-context(s) and T-context, have the same value, and such that, at any given instance of time, the said KB field value depicts the last value the said KB field took for the noun color.

9. The system of claim 3, further comprises:

a) means for searching the rules table, with the said KB field, and retrieving the applicable equation from the rules table;

b) means for creating an equivalent KB expression by composing the parameters of the last method identifier specified in the said KB field, with an operator called the generalized composition operator;

c) means for determining the equation structure, by—
Looking up the Rules table, and replacing each field, which is found in the rules table, with the depth-first-traversal sequence number of the sub-expression, in the expression tree, along with the type of the equation, and the position of the sub-expression within its parent expression, and
enclosing all sub-expressions found, within a set of parenthesis, and
repeating the same procedure recursively, until, the entire equation structure is traversed;

d) means for generating a skeleton expression for the right hand side expression of the equation, by replacing field names with dummy field names;

e) means for retrieving the applicable verb set, from said verb distribution table;

f) means for retrieving the applicable verb set from the user input, using the depth-first-traversal sequence number of the expression in the expression tree, g) means for distributing the verbs to the fields of the equation, and resolving the constant colors;

h) means for searching the context, and retrieving the field from context, if the field is found in context;

i) means for skipping all sub-expression, if a field, which is a sub-expression, is found in context;

j) Repeating the procedure, recursively, if the field is not found in context, and is a sub-expression;

k) means for storing the result of a sub-expression on a stack, for later retrieval;

l) means for generating the code for evaluating the sub-expression, if all its fields are evaluated, using the skeleton expression;

m) means for invoking the method represented by the equivalent sub expression;

n) means for repeating, the procedure described above, until the final result is obtained.

10. The system of claim 3, further comprises:

a) means for searching the A-contexts, and the T-context in the contexts vector of the collaboration parameter, for the field name, whereby, code is generated, to store the results of the search as a vector called Temporary Variable View vector, in the user's application;

b) means for searching each of the collaboration objects in the collaboration traversal sequence, for the field name, whereby, code is generated to store the results of the search as—
references of the containers of the field, as a vector called, Collaboration objects View vector,
references of the noun containers, as an associate vector of said Collaboration objects View vector,
class names of the noun containers, as an associate vector of said Collaboration objects View vector,
field names, as an associate vector of Collaboration objects View vector;

c) means for generating code, such that the generated code when executed at runtime, will search the Temporary Variable View vector, followed by the Collaboration objects View vector, when the KB field is specified with a noun;

d) means for generating code, when a parametric noun is specified, whereby the generated code when executed at runtime, will invoke predetermined KB runtime methods, such that the generated code,
Stores the absolute noun levels of all the entries of the Temporary Variable View vector, and the Collaboration objects View vector, in a new vector called the noun levels vector, and sorts, the said noun levels vector, on absolute noun level, and selects, the entry identified by the parametric noun, as the result of the context search, which can be a temporary variable or a field of a collaboration object;

e) means for generating code, whereby the generated code when executed at runtime, will select the field from the last collaboration object, when the collaboration objects are traversed in collaboration traversal order, whenever, a noun is not specified in the KB field, and when the said Temporary Variable View vector is empty, and the said Collaboration object View vector is empty;

f) means for generating code, whereby the generated code when executed at runtime, will select the field from the last entry of the Collaboration objects View vector, whenever, a noun is not specified in the KB field, and when the Temporary Variable View vector is empty, and the Collaboration objects View vector is not empty;

g) means for generating code, whereby the generated code when executed at runtime, will select the field from the last entry of the Temporary Variable View vector, whenever, a noun is not specified in the KB field, and when the Temporary Variable View vector is not empty, and the Collaboration objects View vector is empty;

h) means for generating code, whereby the generated code will invoke the KB runtime methods, whenever, a noun is not specified in the KB field, and when the Temporary Variable View vector is not empty, and the Collaboration objects View vector is not empty, such that the generated code, Traverses each of the collaboration objects in the Collaboration objects View vector, and determines the noun of the field, by looking up the State-Noun mapping table, using the noun container, class name of the noun container, and field name vectors associated with the Collaboration objects View vector, and then, searches the Temporary Variable View vector for the noun, and selects the Temporary Variable View vector entry where a matching noun is found, and when the search fails, the generated code, selects the field, from the last entry of the Collaboration objects View vector.

11. The system of claim 3, further comprises:
a) means for translating method invocations, by invoking said KB Translator, as if they were equations, wherein said KB Translator is capable of translating equations containing method invocations.

12. The system of claim 3, further comprises:
a) means for translating said process invocations, by invoking said KB Translator, as if they were a stream of said equations and said method invocations, further structured by said structural rule, wherein said KB translator is capable of translating individual instances of said equations and said method invocations;
b) means for storing the generated code of said equations and said method invocations as said helper methods, which are structured by said structural rule, wherein said process structure generated by the said structural rule, is also stored as a helper method, and acts as the driver of the said helper methods generated for containing the code of said equations and said method invocations;
c) means for generating code to produce a client program, for invoking said collaboration methods contained in said collaboration descriptor, previously translated to as helper methods.

\* \* \* \* \*